United States Patent
Wick et al.

(10) Patent No.: US 10,083,484 B2
(45) Date of Patent: Sep. 25, 2018

(54) ROTATING ACCOUNTS FOR TRANSFERS

(71) Applicant: VISA INTERNATIONAL SERVICE ASSOCIATION, San Francisco, CA (US)

(72) Inventors: Matthew Wick, Foster City, CA (US); George Perry, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 701 days.

(21) Appl. No.: 14/534,970

(22) Filed: Nov. 6, 2014

(65) Prior Publication Data

US 2015/0127530 A1     May 7, 2015

Related U.S. Application Data

(60) Provisional application No. 61/900,701, filed on Nov. 6, 2013.

(51) Int. Cl.
| | |
|---|---|
| G06Q 40/00 | (2012.01) |
| G06Q 40/02 | (2012.01) |
| G06Q 20/10 | (2012.01) |
| G06Q 20/32 | (2012.01) |
| G06Q 20/40 | (2012.01) |

(52) U.S. Cl.
CPC ............ *G06Q 40/02* (2013.01); *G06Q 20/10* (2013.01); *G06Q 20/3223* (2013.01); *G06Q 20/40145* (2013.01)

(58) Field of Classification Search
CPC ........ G06Q 30/04; G06Q 40/02; G06Q 20/10; G06Q 20/3223; G06Q 20/40145

USPC ...................................................... 705/35–40
See application file for complete search history.

(56) References Cited

U.S. PATENT DOCUMENTS

| | | | | |
|---|---|---|---|---|
| 5,825,003 | A * | 10/1998 | Jennings ................. | G06Q 20/02 235/379 |
| 7,546,266 | B2 * | 6/2009 | Beirne .................... | G06Q 20/04 705/37 |
| 7,657,849 | B2 | 2/2010 | Chaudhri et al. | |
| 7,792,748 | B1 * | 9/2010 | Ebersole ................ | G06Q 40/00 235/379 |
| 8,046,721 | B2 | 10/2011 | Chaudhri et al. | |
| 8,224,747 | B2 * | 7/2012 | Kumar .................... | G06F 9/547 705/26.41 |
| D675,639 | S | 2/2013 | Anzures et al. | |
| 2004/0039702 | A1* | 2/2004 | Blair ...................... | G06Q 20/10 705/43 |
| 2006/0022032 | A1* | 2/2006 | Fillinger ............... | G06Q 20/108 235/379 |
| 2011/0201408 | A1* | 8/2011 | Gagner .................. | G06Q 20/04 463/25 |
| 2011/0237301 | A1* | 9/2011 | Patel ...................... | G06Q 20/32 455/566 |
| 2014/0067654 | A1* | 3/2014 | Hanson ................. | G06Q 20/108 705/39 |
| 2014/0279415 | A1* | 9/2014 | Hazam ................... | G06Q 20/10 705/39 |

\* cited by examiner

*Primary Examiner* — Edward J Baird
(74) *Attorney, Agent, or Firm* — Loeb & Loeb LLP

(57) ABSTRACT

A system and method may create a user interface where a first account may be lined up in relation to a second account and a transfer may move value from the first account to the second account.

28 Claims, 96 Drawing Sheets

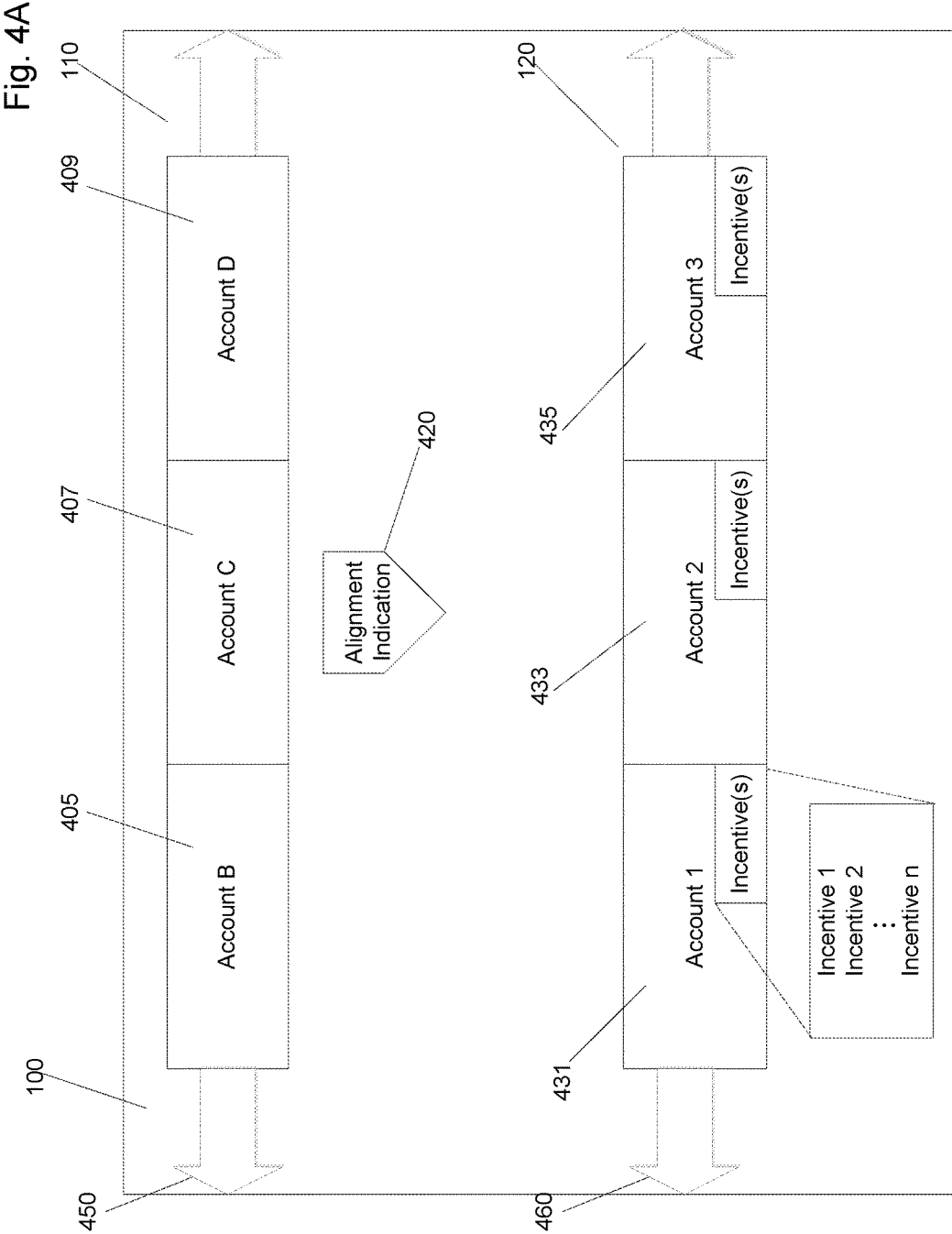

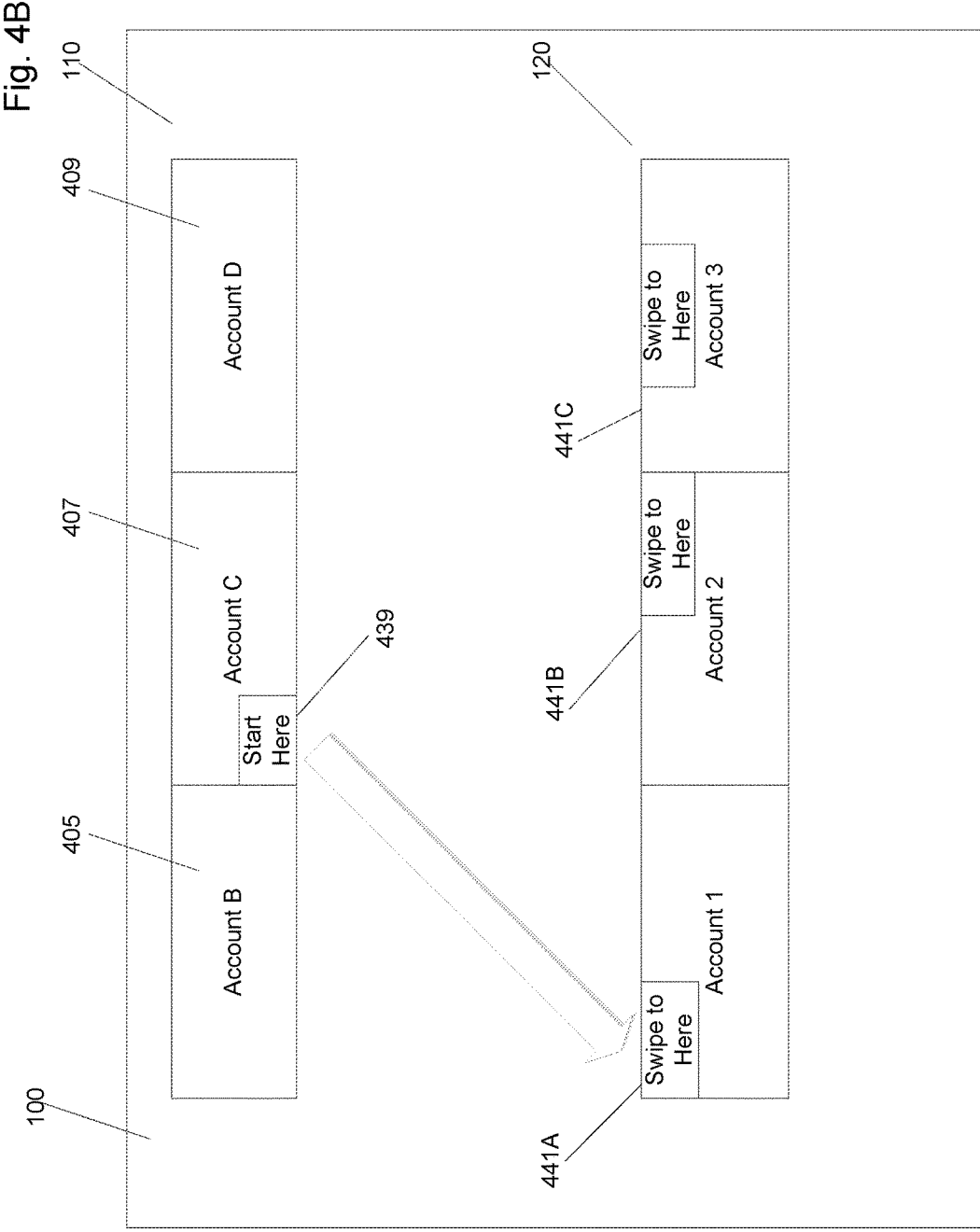

Add Card (Optional) — Add Card

| Nickname | Card nickname |
|---|---|
| Card # | Card number |
| Exp Date | MM/YY |
| CVV2 | 123 |
| Address | Billing address |
| City | City |
| State | State |
| Zip Code | 5 digit code |

Skip This Step

Back  Add Card

| Nickname | My Prepaid Card |
| --- | --- |
| Card # | 1234 5678 9012 3456 |

| Exp Date | 06/15 | CVV2 | ••• | ? |
| --- | --- | --- | --- | --- |

| Address | 123 Waverly Lane |
| --- | --- |
| City | Los Angeles |
| State | CA |
| Zip Code | 90001 |

Fig. 64

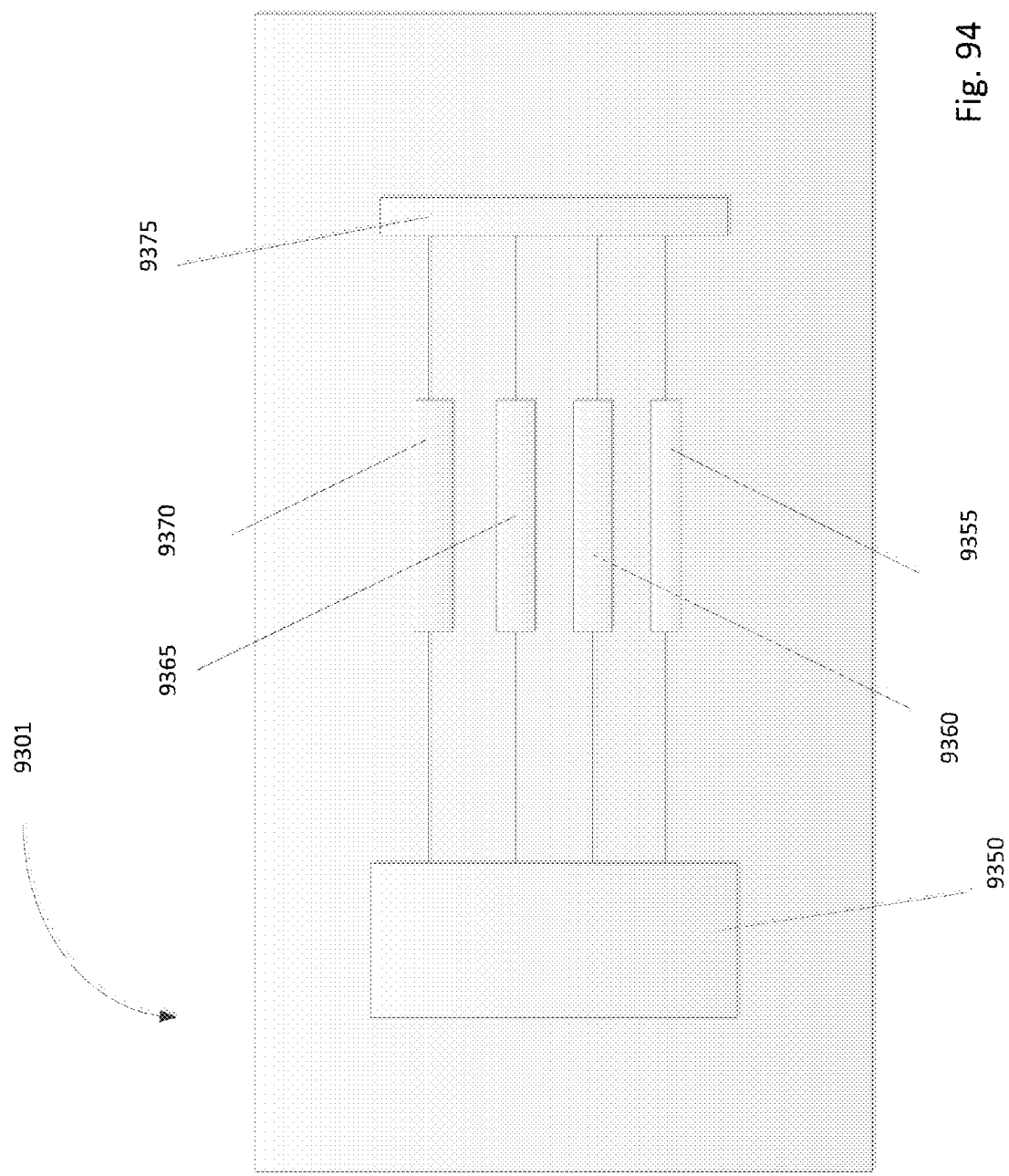

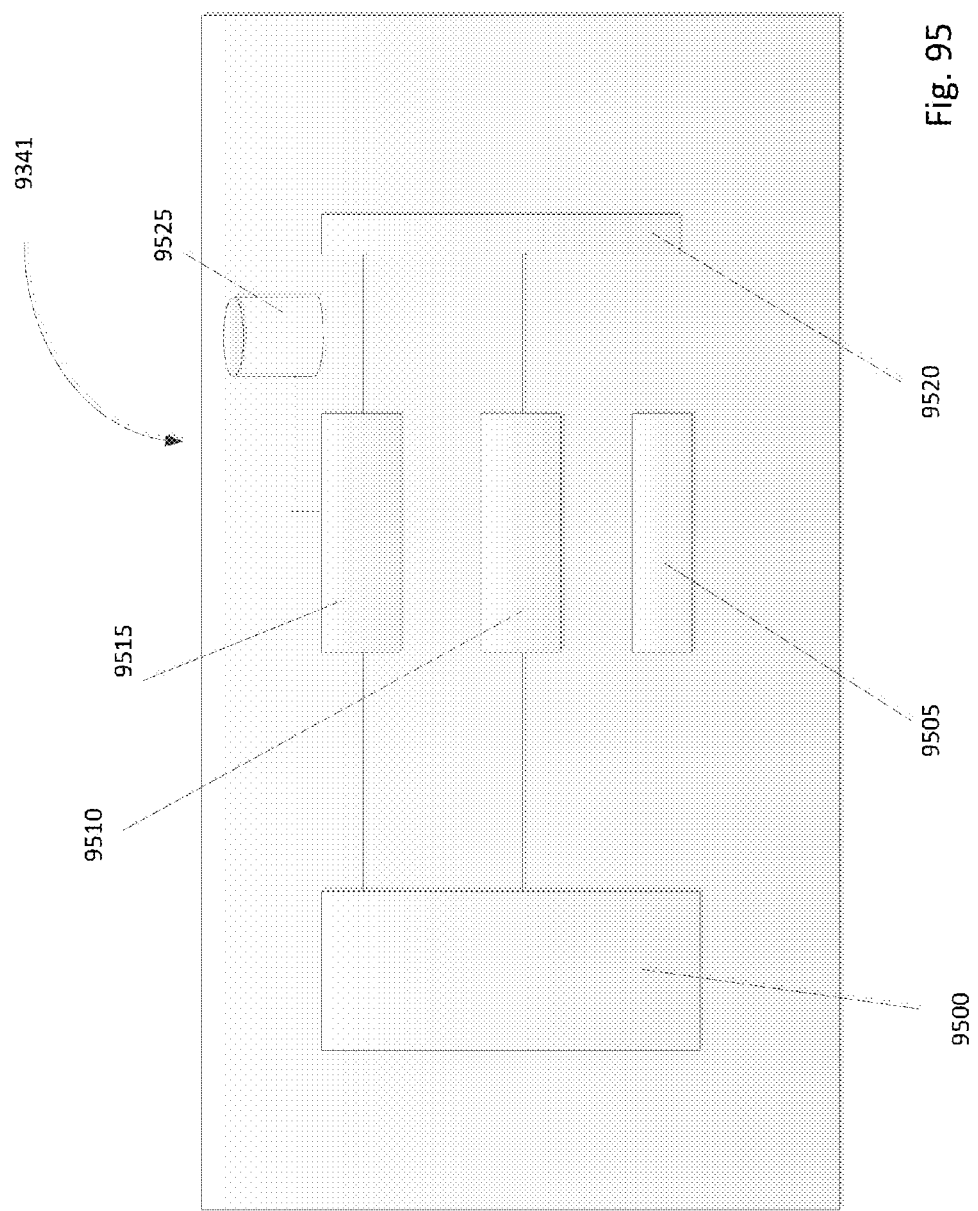

ROTATING ACCOUNTS FOR TRANSFERS

CROSS-REFERENCE TO RELATED APPLICATIONS

This application claims the benefit of, and priority to, U.S. Provisional Patent Application Ser. No. 61/900,701, titled "Rotating Accounts for Transfers," filed Nov. 6, 2013, the content of which is incorporated herein by reference in its entirety.

BACKGROUND

Users often have multiple accounts that contain a variety of values. The values can be debit values or credit values, can be of different currencies and even contain non-currency values. Transferring values from one account to another account has often entailed significant complexity involving account numbers, routing numbers, passwords, etc. Further, it often has been a challenge to identify which account is which and whether the accounts were set up to send and receive value.

Even if the accounts were set up for transfers, the physical mechanism for making the transfer was difficult.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A system and method for effectuating transfers between accounts is disclosed. The system may create an interface which makes transferring funds easier. A first account may be lined up in relation to a second account and the transfer may move value from the first account to the second account. More specifically, a user may line up a first account and a second account and may transfer value from the first account to the second account (or vice versa) with an affirmation movement. An available balance may be displayed after the transfer and if there were any additional fees for the transfer. A creation and sign on process using a mobile device is also described.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIGS. 4A-B illustrate a rotating transfer display;
FIG. 18 illustrates a display for selecting security questions;
FIG. 19 illustrates a display for entering security questions;
FIG. 30 illustrates a display for entering security questions.

FIG. 52 illustrates an entry display for adding a card;

FIG. 64 illustrates adding data for a card from a manage card display;

FIG. 94 illustrates computer system that implements the various embodiments of the method; and FIG. 95 illustrates a portable computer system that implements the various embodiments of the method.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

Specification

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
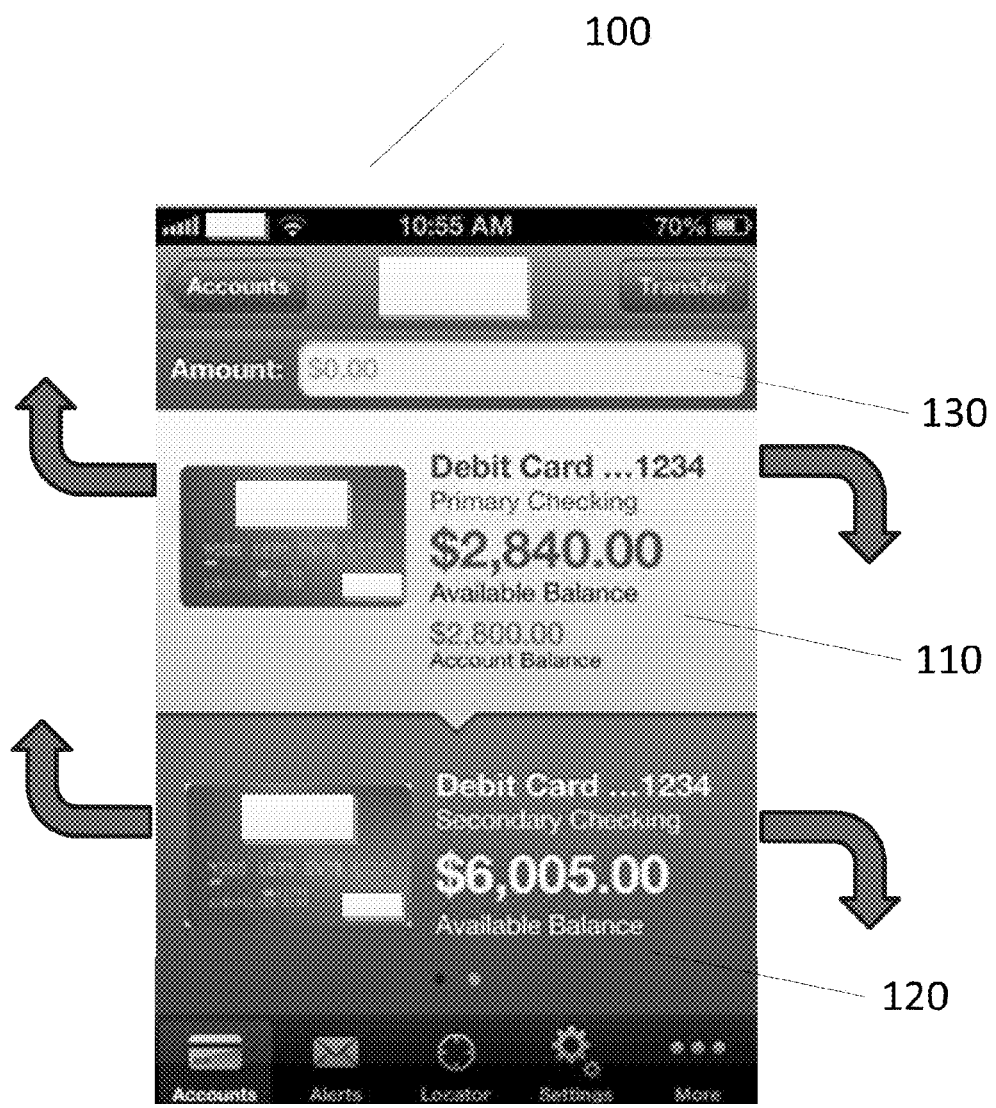
FIG. 1 illustrates a transfer display.

A system and method of transferring value from a first account to a second account is described. At a high level, a graphical interface 100 is implemented to assist in the transfer as illustrated in FIG. 1. The graphical interface 100 has a first rotating set of accounts 110 and a second set of accounts 120. A user may line up a first account 110 and a second account 120 and may transfer value 130 from the first account to the second account (or vice versa) with an affirmation movement. An available balance may be displayed after the transfer and if there were any additional fees for the transfer.

Figure 2:
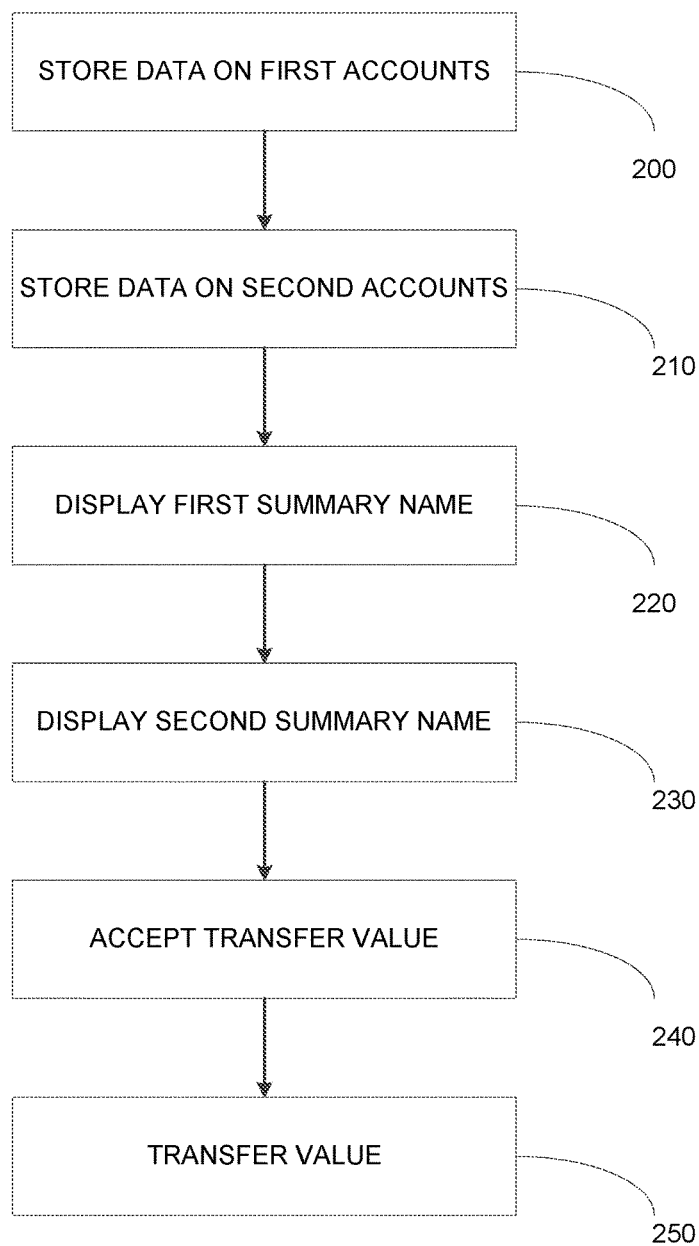
FIG. 2 illustrates a method of transferring value using a graphical input.

Logically, some set up may be necessary to make the transfer so simple. FIG. 2 may illustrate a sample method to assist in creating the system. At block 200, first data on first accounts may be stored. The first data may be stored locally or remotely and may be stored in any appropriate type of memory. The first data may include data sufficient to identify one of the first accounts.

At a high level, account numbers and routing numbers may be necessary to transfer fund between accounts. Similarly, credit accounts may need additional information in order for a transfer to be effectuated. For example, some accounts may have an internet address that need to be accessed, logged into and a set of commands may need to be undertaken to implement the transfer. Likewise, pre-paid cards or debit cards may have specific requirements to effectuate a transfer. Other accounts may require that an application programming interface (API) be used to access the account.

Figure 3:
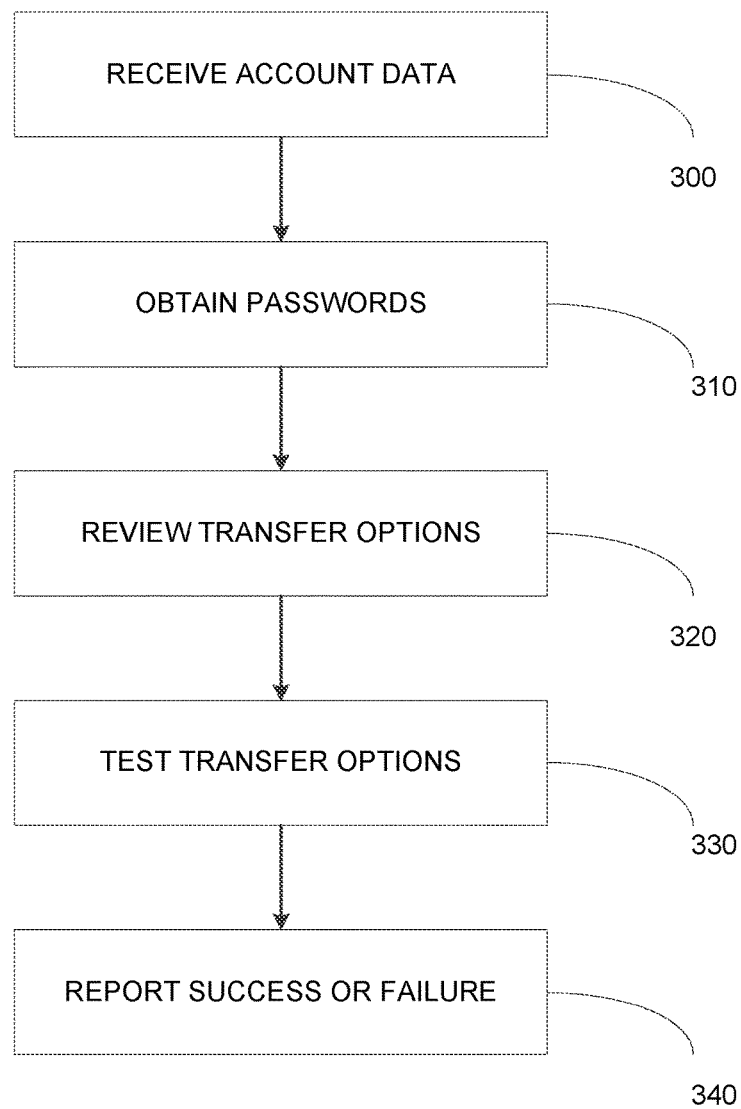
FIG. 3 illustrates a method of obtaining account transfer information.

In addition, the system is not limited to transferring values between traditional banking accounts. As an example, many hotels offer points and these points may be exchanged for a variety of things such as free goods or services. Similarly, value from a pre-paid card may be transferred to a different account. In some embodiments, the system may also be able to transfer the points from one account to another as will be further explained. Further, with sufficient permissions, the system and method may transfer value between accounts of different individuals or businesses. FIG. 3 may illustrate one manner of transferring a value from one account to another account.

At block 300, account data may be received. The account data may be typed in by a user or may be obtained by the system. For example, a code on a pre-paid card may be scanned and the data may enter the system. In another embodiment, account data may already be stored in a useable electronic format that may be available to the system. The data may be stored locally or remotely or placeholder which may not contain sensitive data may be stored locally and the placeholder may be used to access sensitive data stored remotely.

At block 310, the necessary passwords may be obtained to access the account data. In some embodiments, the password may be entered by a user. In another embodiment, the password may be stored in a memory and the user may grant access to the password. In some embodiments, encryption may be used to keep the password secure and the password itself may not be communicated but a code may be communicated which may be unencrypted if the proper key combination has been followed.

At block 320, transfer options may be reviewed. For example, if the value is airline miles, conditions may exist which prevent the easy transfer of miles. For example, transferring miles may require a payment of a fee and the transfer may not be possible immediately but may take a several days. The system may have a database of options on how to address these challenges.

In another aspect, establishing a conversion value may be a challenge that needs to be addressed. The value of hotel points may vary by hotel chain. Similarly, the value of airline miles may vary by airline. Conversion amounts may be accessible through other remote network sites or may be determined independently.

In yet another aspect, some point systems may make it difficult to access and transfer. A series of steps may be needed to be access the account, select the values, and arrange for the transfer. Macros of the steps required may be created and accessed by the system. A wizard or an automated application to walk through a series of steps may be used to assist in creating the macro and series of steps. Similarly, some vendors may make it very easy to access and transfer funds. Application programming interfaces (APIs) may be available which describe an expected call and an expect result. As an example, credit cards may have an established protocol and API system to follow if the proper credentials are present while transferring credits from a local toy store may be a challenge.

At block 330, the ability to transfer to and from accounts may be tested. As mentioned previously, the ability to access certain accounts may be a challenge while the ability to reach other accounts may be relatively straightforward. A test may be undertaken to verify access to the account is available. As an example, the test may involve creating a test transfer that is later reversed. In other embodiments, APIs may be available specifically for testing and these APIs may be utilized.

At block 340, the success or failure of the test at block 330 may be reported. The report may be a simply message that the test was successful or may contain additional information on why the test failed which may alert a user on how to address the problem. In some embodiments, a wizard may be created to walk through the problem and possible solutions.

Referring again to FIG. 2, the first data may also include a first summary name that identifies one of the first accounts. The name may be any name that will remind a user of the account currently being reviewed. The summary name may be suggested by the system or may be created by the user.

Also, there may be a plurality of first accounts. The first accounts may be any accounts under control of a user. In another embodiment such as where multiple users use a single computing device, there may be information stored on a variety of first accounts which may be under the name of a plurality of people or corporations. Also, a single card may be linked to several accounts. As an example, an ATM card may allow access to a plurality of accounts of a user. Each account may be given a separate name but may be accessible through the same card. As mentioned previously, the first account summary may flow across a display under the control of a user until the desired account is located. In addition, an account in the first set may be moved into the second set and vice versa.

At block 210, second data may be stored on second accounts 120. Similar to first data, the second data may include second identity data sufficient to identify one the second accounts 120 and a second summary name that identifies one of the second accounts. The second data may be obtained in a similar manner as described in regard to the first data.

In some embodiments, additional data may be included as part of the first data and as the second data. For example, first balance information may be obtained for the first account and in some embodiments, second balance information may be obtained for the second account 120. If the balance information is located, it may be included as part of the first summary data and as part of the second summary data. For example, if first account A has $4,506.23 in it, the amount may be displayed as part of the summary for account A. Similarly, if second account B, has 425 points, the total number of points may be displayed in the summary for account B.

Logically, some first and/or second accounts may have limits on the amounts that may be transferred in one day. If there are transfer limits, the transfer limits may also be displayed as part of the summary. For example, if an account has $4,506.23 but only $1,000.00 can be transferred, then the account summary may note that $1,000.00 is available for transfer.

Additional relevant information may be displayed in the display summary. For example, if the first account has been suspended, a message may be displayed that the account has been suspended. Similarly, if the first account has a fraud alert, a fraud alert may be displayed in the first summary. Likewise, if a transfer is pending, the pending transfer may be displayed. Other relevant messages may be displayed in the display summary.

At block 220, at least one of the first summary names to be displayed in a first display space may be communicated. As mentioned previously, the first summary names may be moved through the first display space 407 (FIG. 4A). In addition, in some embodiments, the first display space may be adjacent a first previous display space 405 and adjacent a first next display space 409. In some embodiments, even more first summary names may be viewed such as in FIGS. 4A-B or in other embodiments, only one first summary name may be viewed as illustrated in FIG. 1.

At a high level, the first summary names may flow through the various first display spaces 405, 407, 409 in response to a first input from a user. The first input may be a variety of actions. If the system is operating on a standard computer, the input may be from a mouse or from directional input keys such as arrows. In devices that have the capability to accept touch inputs, touch inputs may be used as the first input. A movement on the first display area may be accepted where the movement indicates whether the current first account summary should be move to the first previous display space 405 or to the first next display space 409. Similarly, a movement on the second display area may be accepted where the movement indicates whether the current second account summary should be move to the second previous display space 431 or to the second next display space 435.

In response to the movement, the first account summary may be illustrated as moving in sliding fashion from one of the first previous display space 405, the first display space 407 or to the first next display space 409 to an adjacent one of the first previous display space 405, the first display space 407 or to the first next display space 409. Similarly, in response to the movement input, the second account summary may be illustrated as moving in sliding fashion from one of the second previous display space 431, the second display space 433 or to the second next display space 435 to an adjacent one of the second previous display space 431, the second display space 433 or to the second next display space 435.

There may be additional first account summaries which may be stored in a memory but are not displayed. The first account summaries may fill in openings in any first previous display space 405, the first display space 407 or to the first next display space 409 when another first account summary is moved out. The summaries may be displayed sequentially in a rotating fashion. The first account summaries may be moved out of the first previous display space 405, the first display space 407 or to the first next display space 409 and may be stored in the memory where they may be pulled up again when the rotation of the first accounts completes. In the embodiment where there is a single first display space 405 (FIG. 1), the additional accounts may not be seen.

There also are additional second account summaries which may be stored in a memory but are not displayed. The second account summaries may fill in openings in any second previous display space 431, the second display space 433 or to the second next display space 435 when another second account summaries may be moved out of second previous display space 431, the second display space 433 or to the second next display space 435 and may be stored in the memory where they may be pulled up again when the rotation of the second accounts completes.

As an example as illustrated in FIG. 4A, first accounts A, B, C, D, and E may be in the first group. Similarly, second accounts 1, 2, 3, 4, and 5 may in the second group. Account B may be displayed in the first previous display space 405, account C may be displayed in the first display space 407 and account D may be displayed in the first next display space 409. Arrow 450 in phantom optionally may be part of graphical interface 100 and may represent that a user may rotate accounts A, B, C, D, and E through interface 100 by swiping to the left or right. Similarly, arrow 460 in phantom optionally may be part of graphical interface 100 and may represent that a user may rotate accounts 1, 2, 3, 4, and 5 through interface 100 by swiping to the left or right. Rotation may also occur vertically or at any angle. With a swipe, account B may move from the first previous display space 405 to the first display space 407, account C may move from the first display space 407 to the first next display space 409, account D may move from the first next display space 409 off the display (but remain in the memory) and account A may move into the first previous display space 405. Similarly, with a swipe on an input device, account D may move from the first next display space 409 to the first display space 407, account C may move from the first display space 407 to the first previous display space 405, account B may move from the first previous display space 405 off the display (but remain in the memory) and account E may move into the first next display space 409.

In addition, accounts may be moved from the first group 110 to the second group 120. An account may be selected and moved using an input device (or via sliding a finger across a touchscreen) from one group to another. In this way, a transfer between two accounts in the first group 110 may be accomplished by simply moving one account into the second group 120.

The flow of the summary names may have a deceleration movement where the names move and then slow into the desired location. In some embodiments, the summary names may snap into various display spaces. In other words, once a majority of a summary name is in a display space 407, the entire name may accelerate to fill the display space. In additional embodiments, the summary display names may be spun through the display spaces and the names may continue to rotate in a decelerating fashion similar to a spinning bicycle wheel. Of course, the manner of rotating the summary names may be many and varied and may be limited only by the imagination of a user.

At block 230, at least one of the second summary names to be displayed in a second display space 433 may be communicated. Similar to the first summary names, the second summary names may be moved through the second display space 433 and the second display space 433 may be adjacent a second previous display space 431 and adjacent a second next display space 435. Also, the names may be moved using a variety of input devices on a variety of computing devices.

The first 407 and second display spaces 433 may be in alignment which may be horizontal or vertical or any angle in between. Similarly, in the embodiment with additional first display spaces, the first previous display space 405 and second previous display space 431 may be in alignment, and the first next display space 409 may be in alignment with the second next display space 435. In this arrangement, it may be clear that a proposed transfer would flow from accounts that are in alignment. The alignments may be vertical, horizontal or in any other fashion that makes it easily apparent that a transfer would flow from a first account to a second account or vice versa.

In some embodiments, an alignment indication 420 may be used to indicate that a transfer will move value from the first account to the second account. In one embodiment, the alignment indication 420 may be an arrow or triangle that indicates the flow of value from the first account to the second account. Of course, the shape and look of the alignment indication 420 may be many and varied. For example, in some embodiments, the alignment indication 420 may be animated to illustrate that value may move from the first account to the second account. In yet additional examples, if the first account and second account are in alignment, the first account and second account may change to the same color, an outline may be placed around each of the accounts or the accounts may vibrate to illustrate that the accounts are in alignment. Of course, other indications of alignment 420 are possible and are contemplated.

At block 240, a communication of an inputted transfer value 130 may be accepted. The transfer may flow from the first account 110 as indicated by the first summary name in the first display space 407 to the second account 120 as indicated by the second summary name in the second display space 433. Further, as previously mentioned, the accounts may be in alignment.

The transfer value may be inputted in a variety of ways depending on the device. If a desktop type computer is used, a keyboard may be the most logical way to enter the transfer value. On a smart phone or a tablet, a touch keyboard may be used. Similarly, if the devices is equipped, a voice command may be used to state the transfer value which then may be displayed.

Further, common transfer values may be displayed as selectable icons. The system may learn over time that certain transfer amounts are common and these common transfer amounts may be displayed. For example, if every Friday a user transfers $55 from checking to savings, a $55 icon may be displayed. In addition, the transfer amount icons may account specific. For example, a transfer from an investment account to a savings account may be $10,000 while a transfer from a savings account to a checking account may be in $100 increments. The transfer icons may be adjusted accordingly.

Learn Routine

Figure 5:
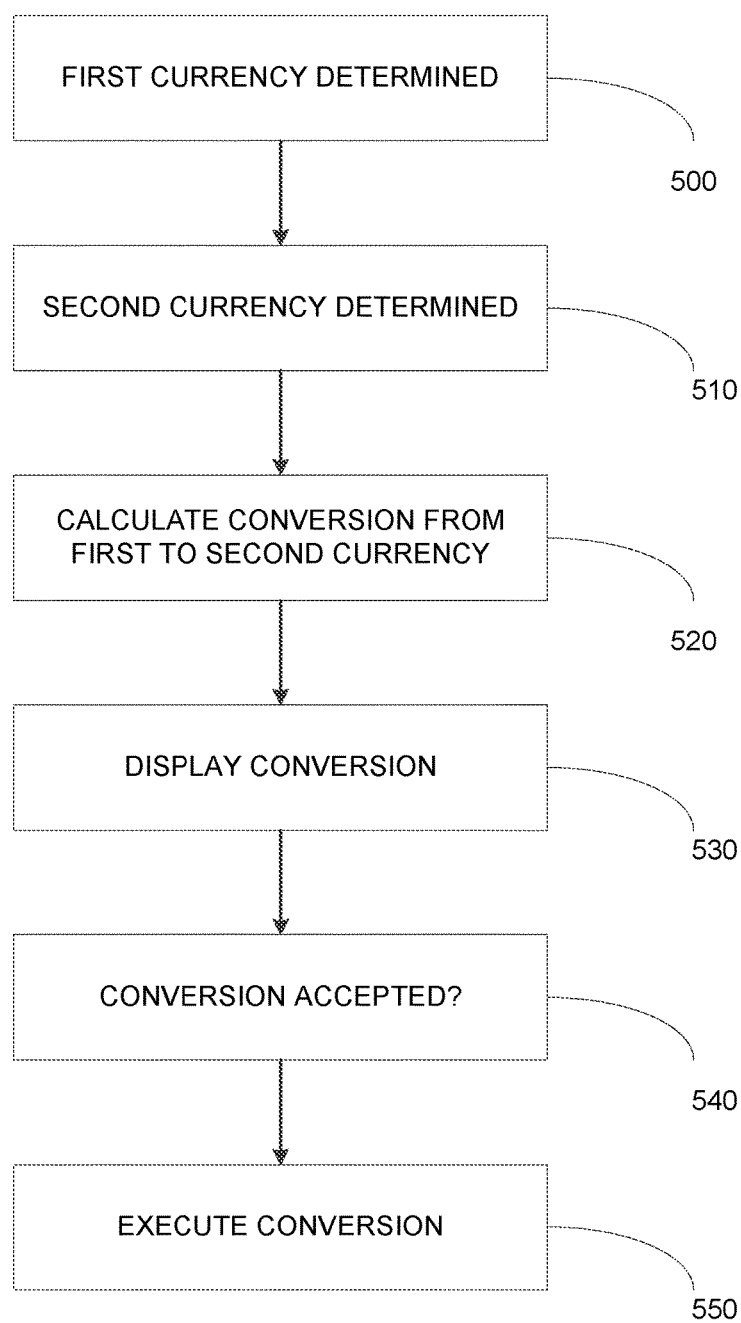
FIG. 5 illustrates a method of determining a conversion value.

In some situations, the value in the first account 110 and the value of the second account 120 may be in different denominations. As an example, the value may be in dollars and Euros. As another example, the values may be in airlines miles and another values may be in dollars. A proposed conversion may be displayed. The user may be permitted to accept or deny the conversion. FIG. 5 may illustrate a sample conversion routine.

At block 500, a first currency may be determined. The first currency may be the currency used in the first account 110. Currency is not meant to be limited to money but can be points or other value indicators. The first currency may be determined by an indication from the first account 110. For example, the first account 110 may be denominated in dollars as reported when the account is accessed. In other embodiments, the account may have to be reviewed to determine the denomination of the value.

At block 510, a second currency may be determined. The second currency may be used in the second account 120. As with the first currency, currency is not meant to be limited to money but can be points or other value indicators. The second currency may be determined by an indication from the first account. For example, the second account may be denominated in Euros as reported when the account is accessed. In other embodiments, the account may have to be reviewed to determine the denomination of the value.

At block 520, a conversion between the first value or currency and the second value or currency may be obtained. In some situations, the conversation may be accessible from an exchange where conversion values between currencies are created. In other situations, an additional party may be used to create the conversion and the additional party may have its own conversion which may by the system. For example, the exchange rate may be a little less favorable using the additional party as the additional party may need to be compensated for providing the conversion service.

In other situations, the conversion may not be so easy as the currencies may not be commonly publically traded. For example, airline points may have value but may not be traded on an open market, making the conversion more difficult to determine. Further, some conversions may require paying a fee which further complicates the conversion. Thus, in these less straightforward situations, past conversions may be accessed to determine a conversion. In addition, third parties may offer to create the conversion for a fee and these rates may be used.

Referring again to FIG. 5, at block 530, the proposed conversion may be displayed. The conversion may include any fees that are required to be paid. The display may also include any time delays that may be required to execute the conversion. The display may also illustrate the reverse conversion such as x dollars for y miles or z miles for v dollars as the reverse rate may be different. In some embodiments, the user may be able to select one of a plurality of third parties to execute the conversion and the rate of exchange may vary according to the third party selected.

At block 540, it may be determined if the conversion is accepted. If the proposed conversion is accepted, at block 550, conversion may be executed. If the conversion is not accepted, the conversion may not be executed and the system may return to the previous state. If the conversion is scheduled to take some time, a provisional movement of value may be made.

Referring again to FIG. 2, at block 250, the transfer value being moved from the first account as indicated by the first summary name in the first display space to the second account as indicated by the second summary name in the second account space. As mentioned previously, the transfer may occur in a variety of ways depending on the account.

If the transfer involved a credit card or debit card, the appropriate network for the transfer may be used. As mentioned previously, with sufficient security in place, the card information may be stored on the computing device and the network may be contacted directly. In other embodiments, additional payment networks may be used. Further, tokens may be used to establish security and trust among the computing device and the payment networks being used.

A confirmation block may be displayed where an option for the transaction to be accepted or canceled may be displayed. In some embodiments, the amounts that will be in the accounts after the proposed transfer may be displayed. Further, if either of the accounts may be above or below a threshold, a warning may be displayed. Logically, if the proposed transaction would result in one of the accounts not having sufficient funds, the transfer may not be permitted. For example, a user could not transfer more miles that the user actually controls.

If the transfer has been accepted, the new values in the first account and the second account after the transfer may be displayed. The accounts may return to the rotation of accounts and be available for further transfers assuming the values have cleared.

In some embodiments, a mobile device 9301 such as illustrated in FIG. 94 may be used as the computing device and additional blocks may be implemented. In short, transfers between accounts may be made using a mobile device 9301.

In some examples, a customer may be incentivized to transfer funds to a particular one of, or to two or more of, the second set of accounts 120. To determine which incentive to present to a customer, server 9341 may access (e.g., via the Internet or other network) available incentives stored in database 9525. The database 9525 may include a listing of available incentives and any restrictions associated with the incentives (e.g., $15 account credit if you spend $50 at a particular merchant, $5 account credit for each $100 transferred, 1000 bonus miles for transferring $50, etc.). Restrictions, for example, may require a customer to transfer at least a predetermined amount of money or purchase at least a predetermined number of points (e.g., airline miles). In other examples, restrictions may specify rules when or where an incentive may be redeemed (e.g., incentive only valid during certain dates, times, merchants, store locations, geo-locations, etc.).

Each of the incentives may be associated with a target customer profile specifying at least one criterion (e.g., demographic criteria, geographic, etc.) of a target customer for that incentive. Server 9341 may use the target customer profiles to select which incentive(s) from the database 9525 to present to a customer. For example, server 9341 may compare a profile of the customer to a target customer profile to determine which incentive(s) to send to that customer. A customer may complete a profile when signing up for an account (e.g., identifying name, home address, gender, interests, income level, etc.), and server 9341 may store the customer's profile in a database 9525 (or in a different database or other storage location). The customer may update the profile over time, and server 9341 may supplement the customer's profile based on observed customer behaviors (e.g., which merchants the customer makes purchases from, purchase frequency, average purchase amount, which accounts the customer transfers funds from/to, transfer frequency, transfer amounts, a merchant a customer shops at before or after another merchant, and the like).

To make a profile comparison, the server 9341 may derive at least one search criterion from the customer's profile (e.g., customer's age, gender, geographic location, income level, etc.) and search the database 9525 for one or more target customer profiles that match. A match may mean that a customer's attribute (e.g., age 30) is the same as or falls within an acceptable range for a target attribute (e.g., target age range is 30-35). Server 9341 may communicate one or more incentives to the mobile device 9301 for presentation to the customer.

Graphical interface 100 may display incentives available for selection by the customer. In an example, graphical interface 100 shown in FIG. 4A may present one or more selectable fields listing one or more incentives associated with one of more of the second set of accounts 120. Multiple incentives may be presented where the customer's attributes in his/her profile match target profiles for two or more incentives. Graphical interface 100 may also limit the number of incentives that can be displayed (e.g., no more than 3 per account). Graphical interface 100 may present the incentives in a text field, in response to a customer selecting a hyperlink, in a pop-up bubble, or the like. A customer may select one or more of the selectable fields by, for example, tapping a touchscreen over a desired field or using a computer mouse.

Graphical interface 100 may permit the customer to scroll between different ones of the second accounts to show what incentives are available to the customer. In an example, a customer may scroll between different ones of the second set of accounts 120 (e.g., by swiping a finger across a touch screen, using a computer mouse, etc.) and graphical interface 100 may present the incentives available for each one of the second accounts. The incentives may be the same for each of the second accounts 120, or may be tailored to some or all of the second accounts 120. When two or more incentives are available for a particular one of the second accounts 120, graphical interface 100 may display two or more of the incentives. As seen in FIG. 4A, graphical interface 100 may display in field 437 a listing of the one or more incentives associated with account 1. The customer may scroll through the incentives as desired. Server 9341 may send the listing to a mobile device 9301 for presentation in the graphical interface 100. Server 9341 may also sort the listing of incentives in a predetermined manner (e.g., from highest to lowest discount, from highest to lowest account credit, etc.). Graphical interface 100 may also permit the customer to sort the listing in a desired manner.

If the customer subsequently makes a transfer to a particular second account associated with a particular incentive, mobile device 9301 may communicate a transfer message identifying the first account and the destination second account, the amount being transferred, and which incentive or incentives the customer selected. Server 9341 may then update a record of database 9525 associated with the particular second account to indicate that the customer selected the particular incentive when making the transfer. The updated record thus links the particular incentive to the particular second account. The database record may also store any restrictions for the customer to be eligible to redeem the particular incentive.

In some instances, server 9341 may provide the incentive to the customer immediately or at a predetermined time after a successful transfer. Server 9341 may, for example, apply a credit to the destination second account, may cause shipment of an electronic gift card/coupon to the mobile device 9301 or shipment of a physical gift card/coupon to a predetermined location (e.g., shipped to the customer r's home or other location), may cause physical shipment of a tangible product (e.g., gift for making a purchase) to a predetermined location, and the like.

In some examples, an incentive may be redeemed at a later time when the customer takes an additional action. For example, a customer may redeem an incentive after making a subsequent purchase from a merchant. When a customer subsequently attempts to make a purchase using mobile device 9301, device 9301 may determine if any of the customer's accounts have any incentives applicable to a merchant where the customer is shopping. Alternatively or additionally, server 9341 may make this determination. For example, mobile device 9301 and/or server 9341 may determine that the customer is attempting to make a purchase from a merchant's physical store or via the merchant's website, and that a particular one of the second accounts has an incentive associated with that merchant (e.g., 25% off coupon if the customer spends $100). When the incentive is identified, mobile device 9301 and/or server 9341 may update the graphical interface 100 to display a summary name of the second account and the incentive to remind the customer about the incentive. Mobile device 9301 and/or server 9341 may determine whether a purchase the customer is proposing to make satisfies any restrictions associated with the incentive (e.g., must spend at least $100 to redeem coupon and whether the customer has spent that amount) and update the graphical interface 100 accordingly. Graphical interface 100 may also recommend what actions the customer needs to make to redeem the incentive (e.g., must spend an additional $20 to reach $100 threshold to redeem 25% off coupon). When the customer is ready to make a purchase, the customer may authorize the purchase and the mobile device 9301 and/or a point of sale terminal may send an authorization message to the server 9341 requesting authorization to complete the purchase.

Server 9341 may receive the authorization message and determine if the attempted purchase qualifies the customer to redeem the particular incentive by satisfying any restrictions associated with the incentive (e.g., did customer make a $100 purchase). If the purchase qualifies and the customer has sufficient funds to make the purchase, server 9341 may authorize the purchase and provide the customer with the incentive. For example, server 9341 may apply a credit to the particular second account, may apply a discount to the customer's final bill, may cause shipment of an electronic gift card/coupon to the mobile device 9301 or shipment of a physical gift card/coupon to a predetermined location (e.g., shipped to the customer's home or other location), may cause physical shipment of a tangible product (e.g., gift for making a purchase) to a predetermined location, and the like.

Server 8341 may communicate a notification message to the mobile device 9301 replying to the authorization message. The notification message may indicate if the transaction has been declined or approved. The notification message may further indicate whether purchase transaction permitted customer to redeem the incentive. Graphical interface 100 may, for example, notify the customer that a discount was awarded, an account credit has been applied to the second account, or that a physical product (e.g., gift card, coupon, product, etc.) has been shipped to a predetermined location (e.g., home, office, or other location associated with the customer). Server 9341 may also maintain information indicating what types of incentives the customer redeemed or attempted to redeem, for use is selecting what incentives to send to the customer in the future and for notifying partners offering incentives about what types of incentives the customer is likely to respond.

In some examples, monitoring a customer's interaction with a touchscreen of mobile device 9301 may provide additional security and may be used to authenticate the customer when transferring funds between accounts. As depicted in FIG. 4B, graphical interface 100 may prompt the customer to select a predetermined location of a field for a first account and drag his/her finger to a field associated with a second account. To drag between account C and account 1, for example, graphical interface 100 may prompt a customer to initially place a finger on field 439, and drag his/her finger from field 439 to field 441A. Likewise, to drag between account C and account 2 or 3, for example, graphical interface 100 may prompt a customer to initially place a finger on field 439, and drag his/her finger from field 439 to field 441B or C. The process of moving one's finger across a touchscreen displayed is referred to herein as a swipe.

During a swipe, a biometric reader (e.g., a fingerprint reader) of the mobile device 9301 may sense the customer's fingerprint. The mobile device 9301 may verify the fingerprint as belonging to an authorized customer of the first and second accounts (or other person with authority to make such transfers) or may send fingerprint data to server 9341 for verification prior to transferring funds between accounts. Mobile device 9301 and/or server 9341 may store fingerprint data for each customer authorized to make transfers between accounts. For example, server 9341 may associate a customer's fingerprint with one or more accounts when the account(s) is established. In some examples, a customer may have multiple accounts and may permit certain other individuals the right to make transfers between some or all of the accounts. For instance, only selected ones of individuals may be authorized to make transfers between certain accounts, and not others, and fingerprint data may be used to confirm that only authorized individuals may make an account transfer.

When a finger swipe is used to make a transfer, the mobile device 9301 may monitor one or more of the speed, acceleration, and deceleration of the customer's finger when swiping between field 439 and any of fields 441A-C. Mobile device 9301 and/or server 9341 may compare the monitored finger movement data to representative movement data (e.g., average speed, acceleration, deceleration) at which an authorized customer moves his/her finger when making such transfers. If the monitored movement data does not differ by more than a predetermined amount from the representative movement data, or is otherwise within an acceptable range (e.g., within 10% of the average speed), the mobile device 9301 and/or by server 9341 may authenticate the customer. Additionally, server 9341 may use the fingerprint data and/or the monitored movement data for fraud detection and calculating a risk score to assess whether to approve or decline a transaction.

In another example with reference to FIG. 4B, a customer may place different fingers on the first and destination second accounts at the same time to make the transfer (e.g., pinky finger on field 439 and index finger on field 441A). Mobile device 9301 and/or server 9341 may verify that each fingerprint matches that of an authorized customer.

Figure 6:
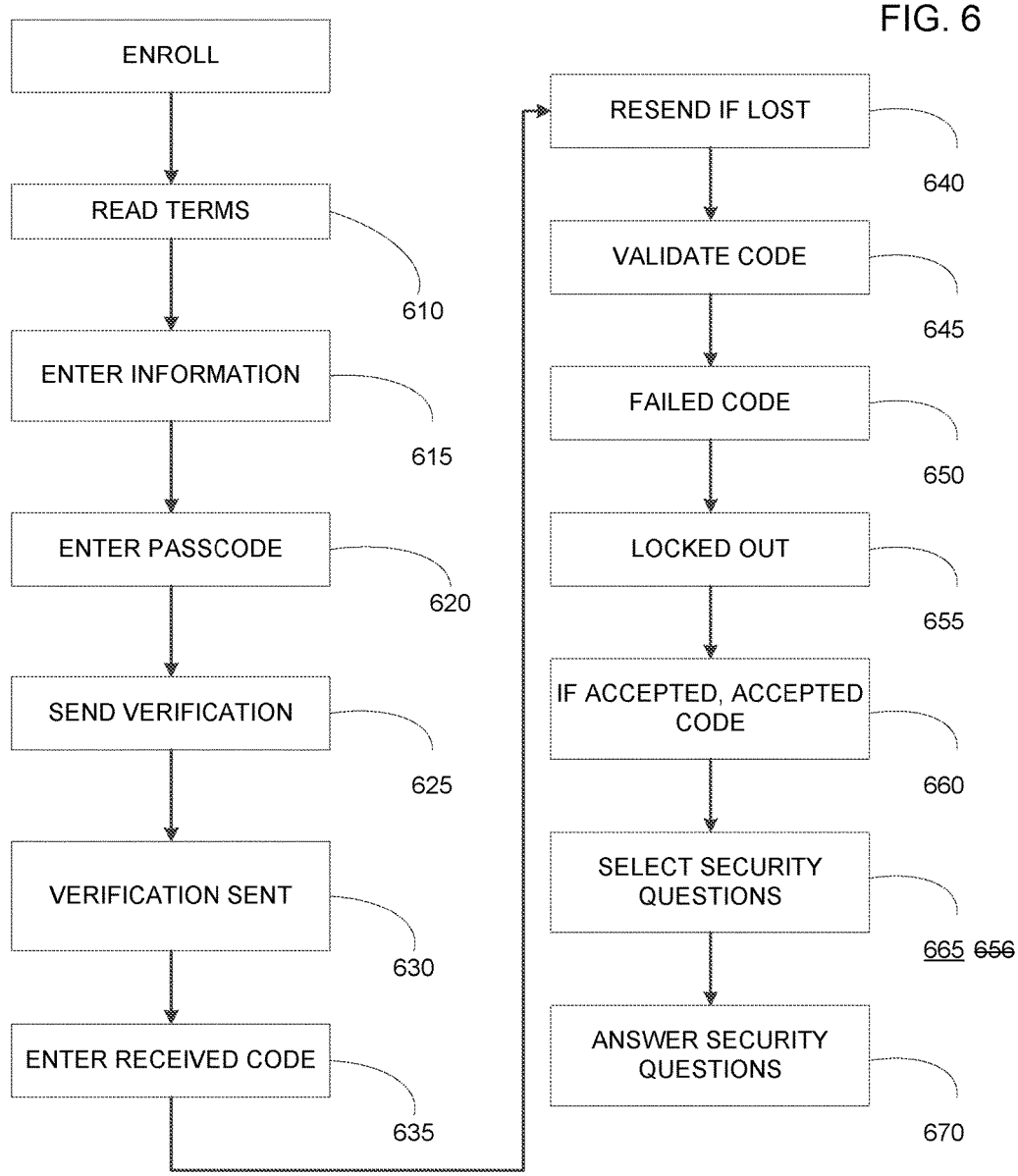
FIG. 6 illustrates a method of registering for the system using a portable computing device.
Figure 7:
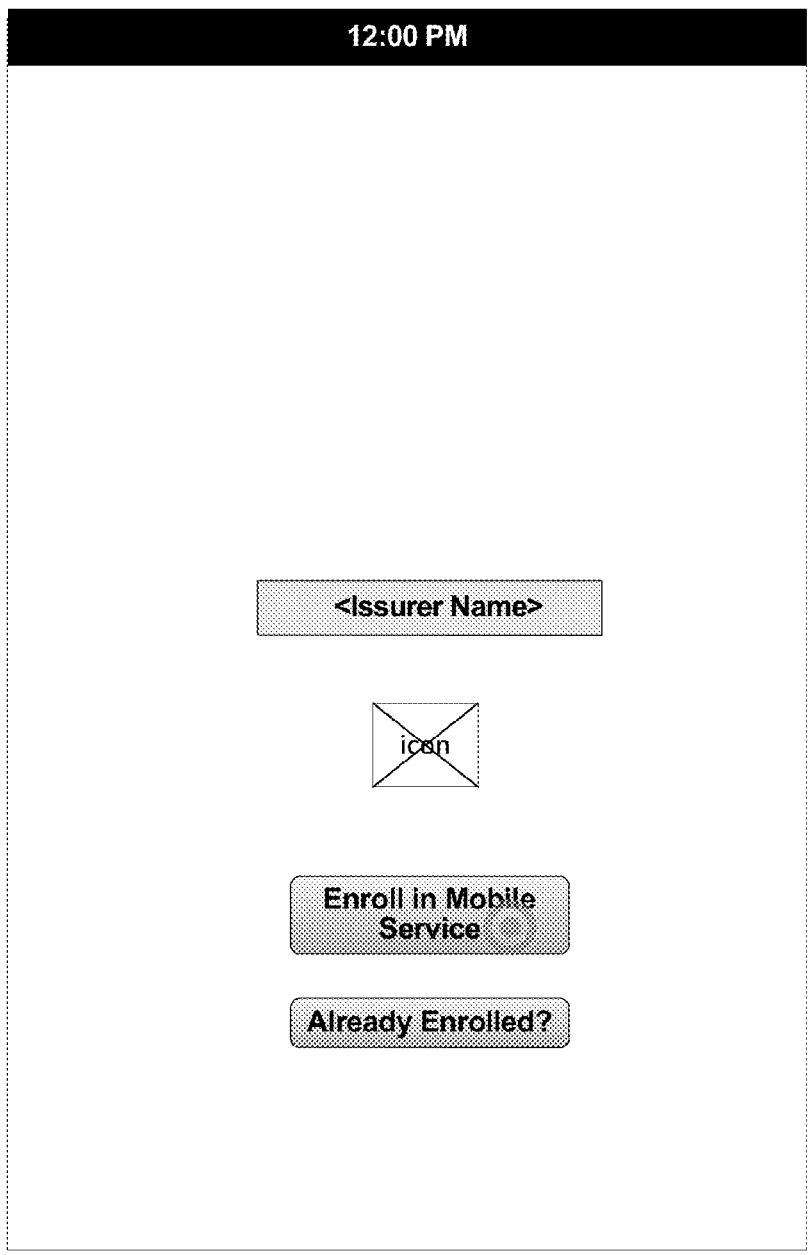
FIG. 7 illustrates an enrollment display.

FIG. 6 may illustrate a method of enrolling in the transfer system on a mobile computing device. At block 600, a user may request to enroll in the system. FIG. 7 may be a sample display for enrolling on a mobile computing device. In some embodiments, an app may be downloaded and in other embodiments, a web site may be accessed through the mobile computing device. At block 605, a start screen may be displayed and a user may choose between creating a new account or signing in to an existing account (after entering their registered email address and passcode and then verifying their email address).

Figure 8:
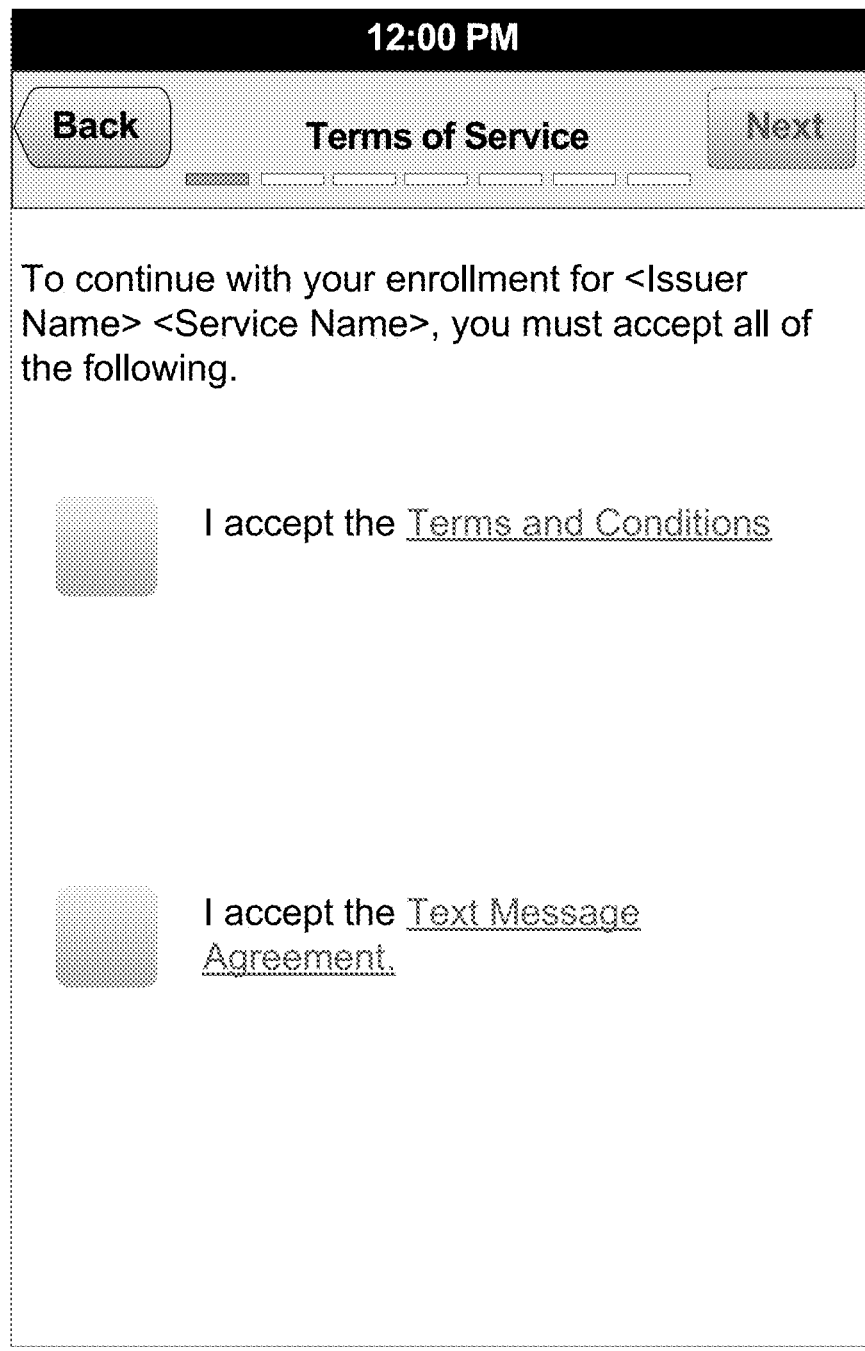
FIG. 8 illustrates a terms of service acceptance display.

At block 610, an accept terms option may be presented. FIG. 8 may be an illustration of a sample display to accept the terms of service. The terms may be for the service and for text messages. The next button may be enabled if both checkboxes are checked as the default state may be unchecked.

Figure 9:
FIG. 9 illustrates a display for entering enrollment data.

At block 615, account information may be entered. FIG. 9 may be an illustration of a possible new account information entry display. A next button may only be enabled if all fields are filled in with validly formatted data. Some sample fields are listed below. The descriptions are examples and are not meant to be limiting or requirements.

Name: May be editable; May be alphanumeric, spaces, Spanish characters, between 1 and 100 characters.

Mobile: May be 10 digits, numeric only, non-numeric characters may not be entered if typed. Numbers as they are typed may appear in the format (###) ###-####.

Email: May be alphanumeric; @ may be required; between 1 and 50 characters.

If user returns to this screen to edit, the name, mobile number and email address may be populated but editable.

Figure 10:
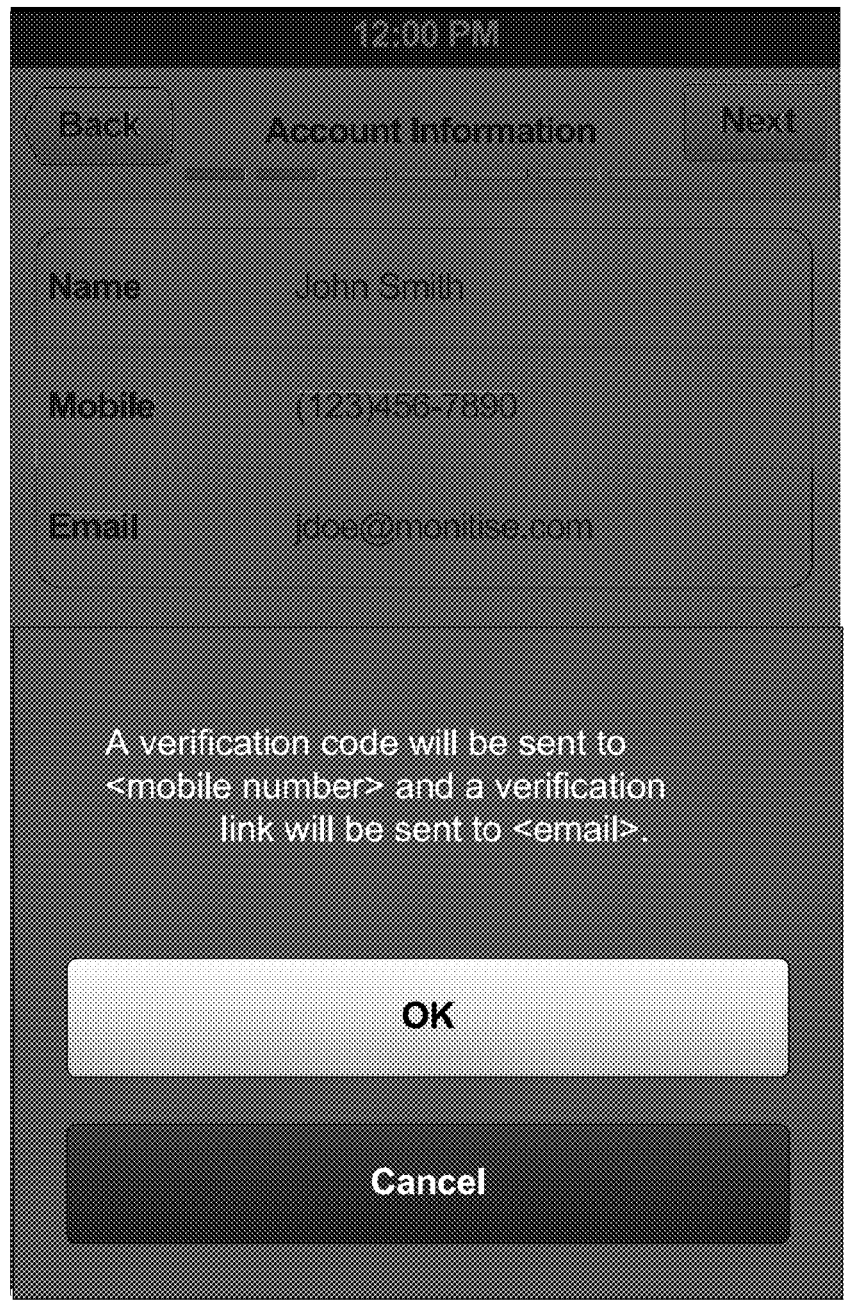
FIG. 10 illustrates a display of communicating a verification code.

At block 620, a passcode may be entered. If valid data is entered in all the fields, the Next button may become enabled. The passcode may be numeric; 5-8 digits in length and may have some limitations to make it difficult for others to guess, such as may not be ascending or descending sequence and 1 digit cannot make-up over half the code. When re-entering the passcode, it may have to match the passcode exactly. A user may tap on next button and a confirmation dialog may appear as illustrated in FIG. 10.

At block 625, a verification code may be created and communicated if consent is received. FIG. 10 may illustrate that tapping on OK may send the verification code to the user's mobile number and a verification link may be sent to the user's email. Tapping on cancel may return the user to a previous display. If either or both the mobile number and the email address are invalid then an alert is displayed with an OK button to dismiss.

Figure 11:
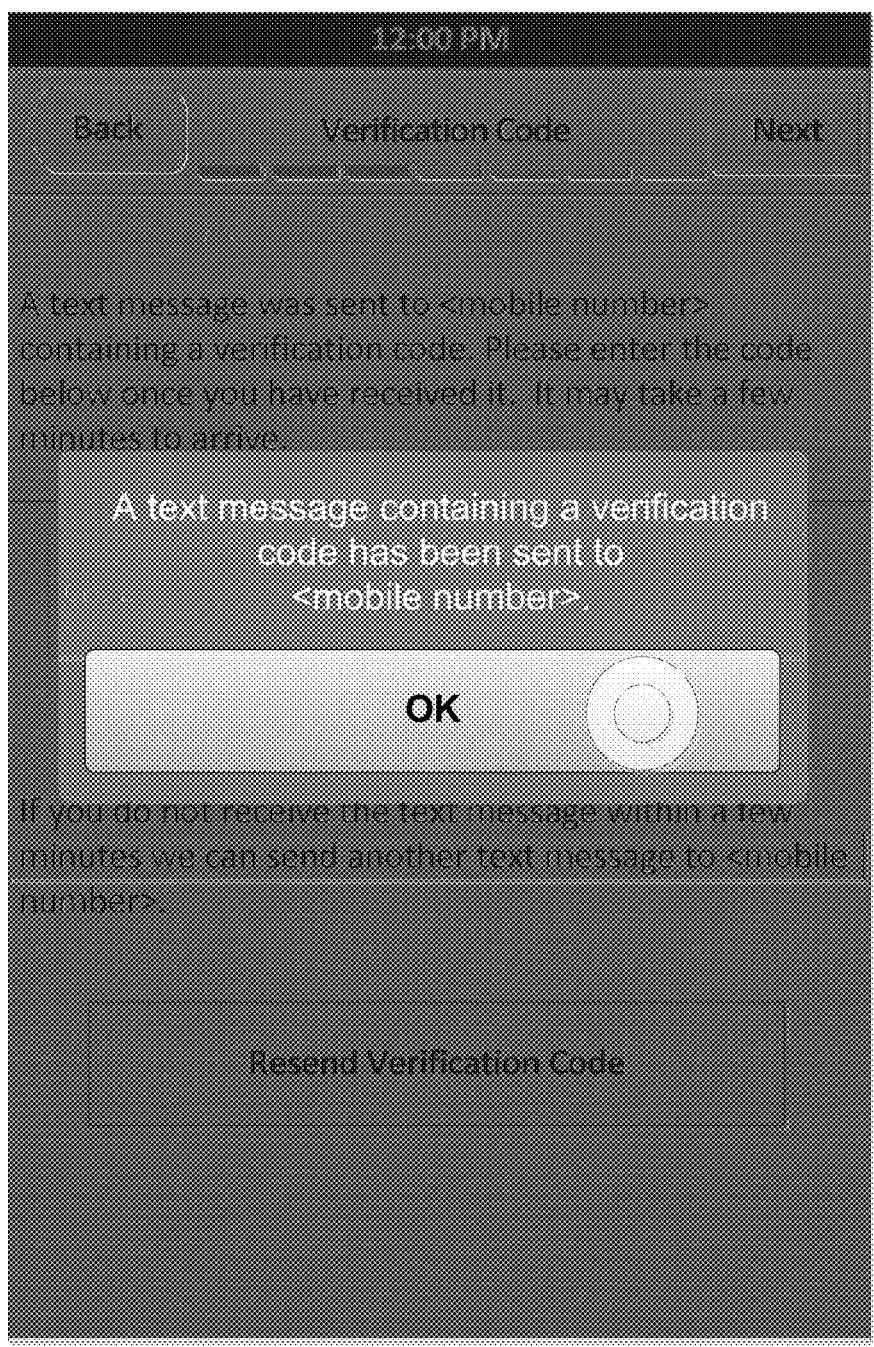
FIG. 11 illustrates a display of communicating a verification code via text.
Figure 12:
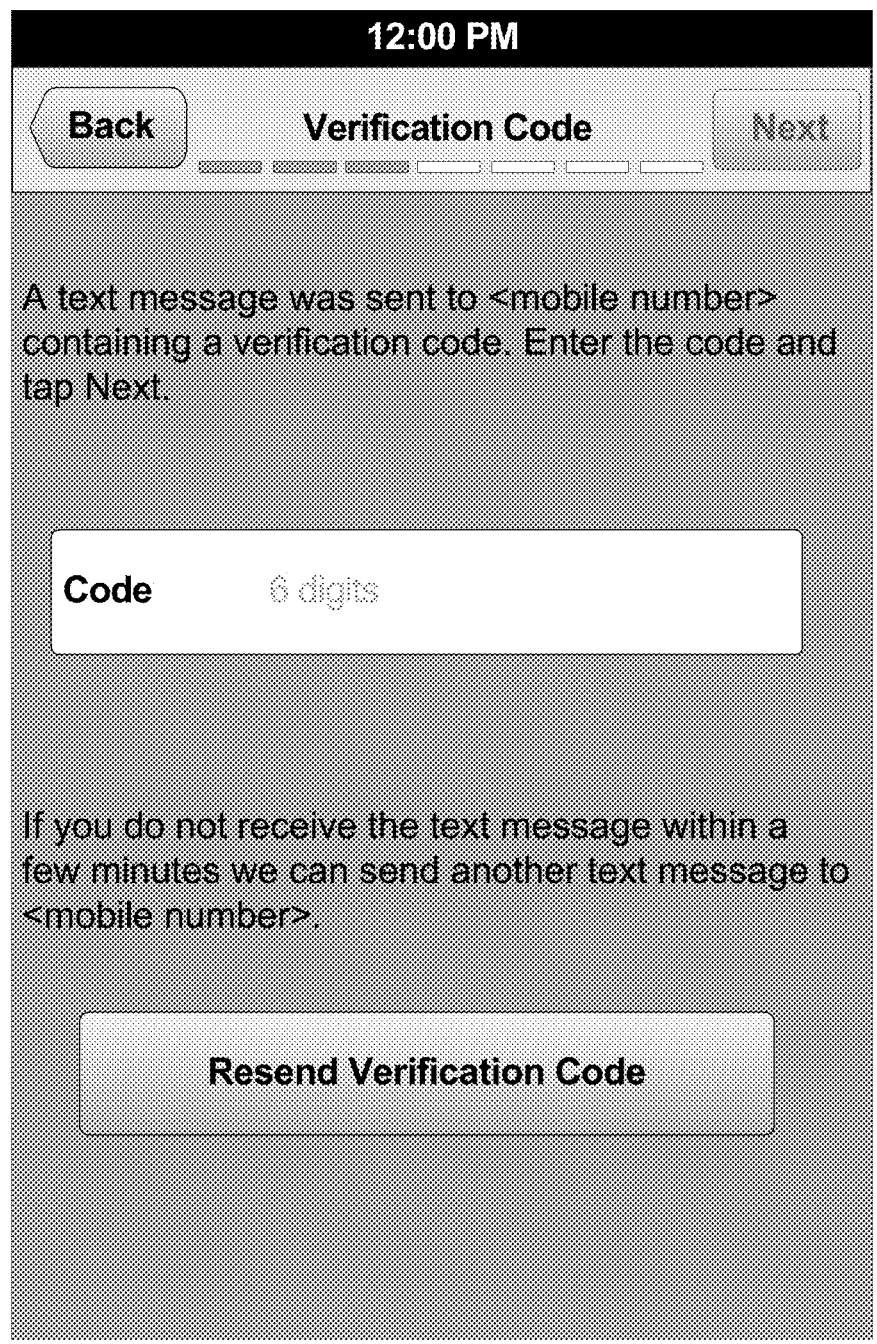
FIG. 12 illustrates a display for entering the verification code.

At block 630, a verification may be communicated as illustrated in FIG. 11. The code may be a plurality of numbers, characters or digits. At block 635, the received verification code may be entered or a request may be made to resend the code as illustrated in FIG. 12. The next button may be enabled if all fields filled in with validly formatted data, such as 6 digits input in the code field.

Figure 13:
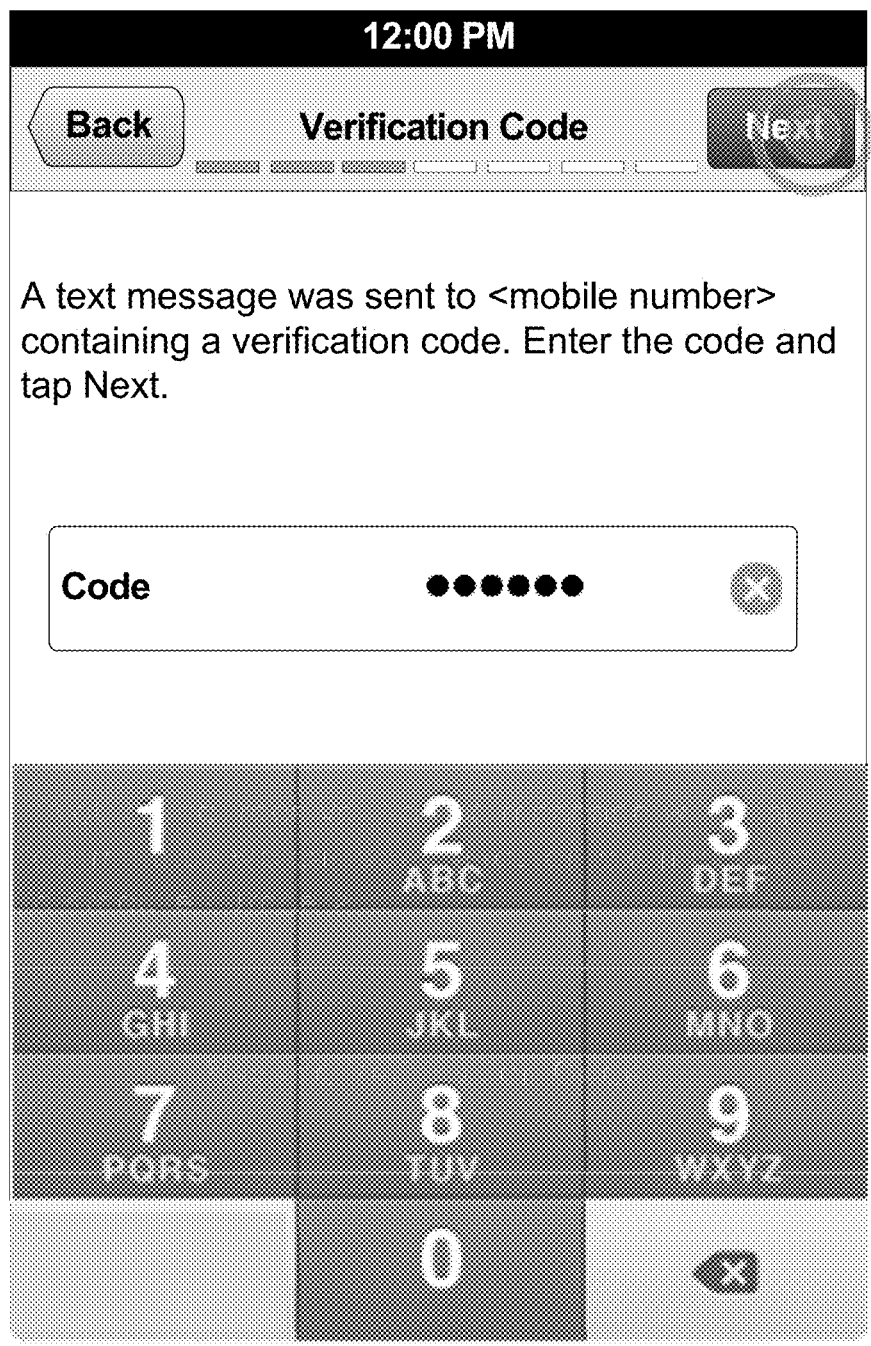
FIG. 13 illustrates a display where the verification code is being entered.
Figure 14:
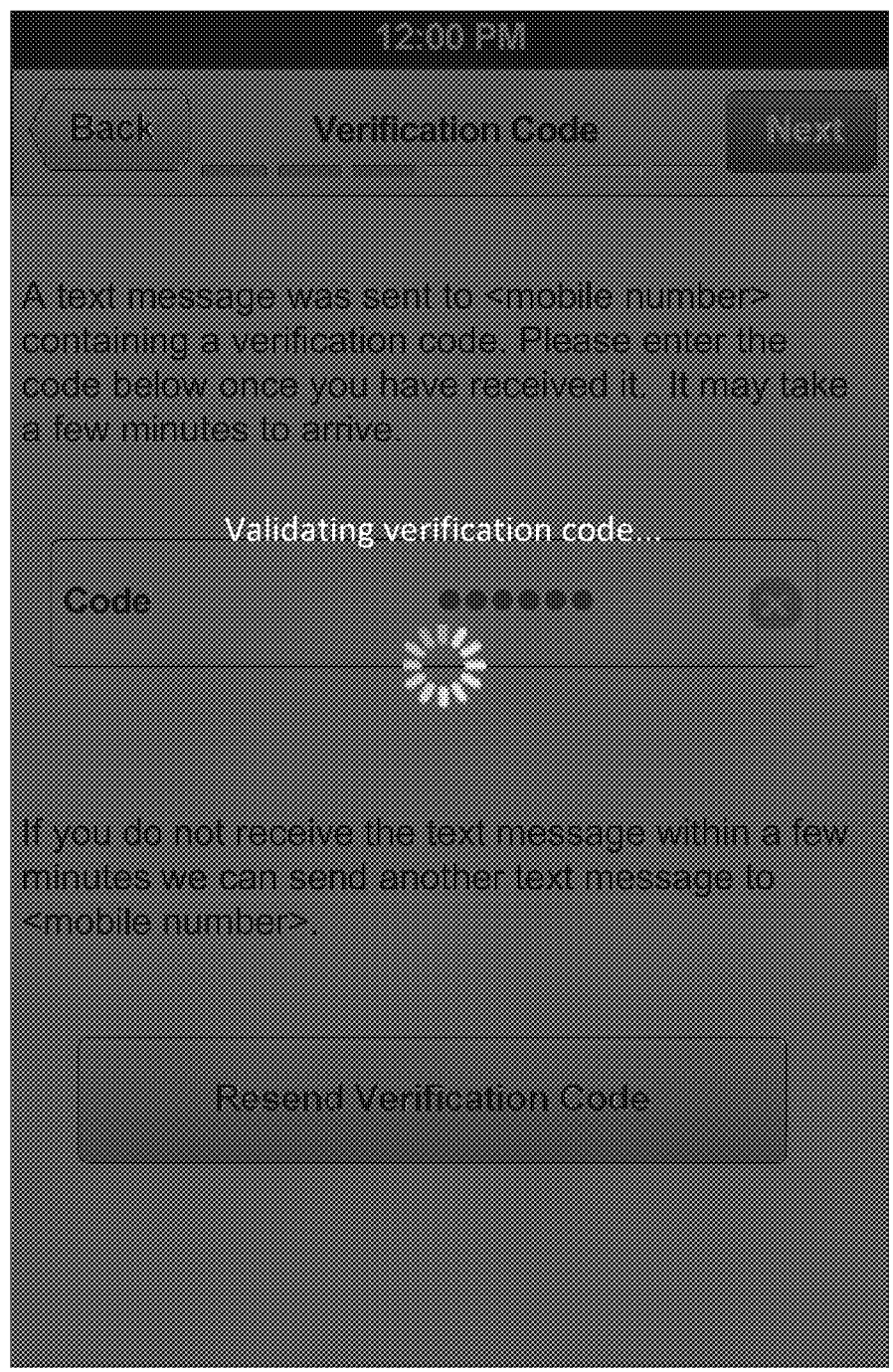
FIG. 14 illustrates a display for validating the verification code.
Figure 15:
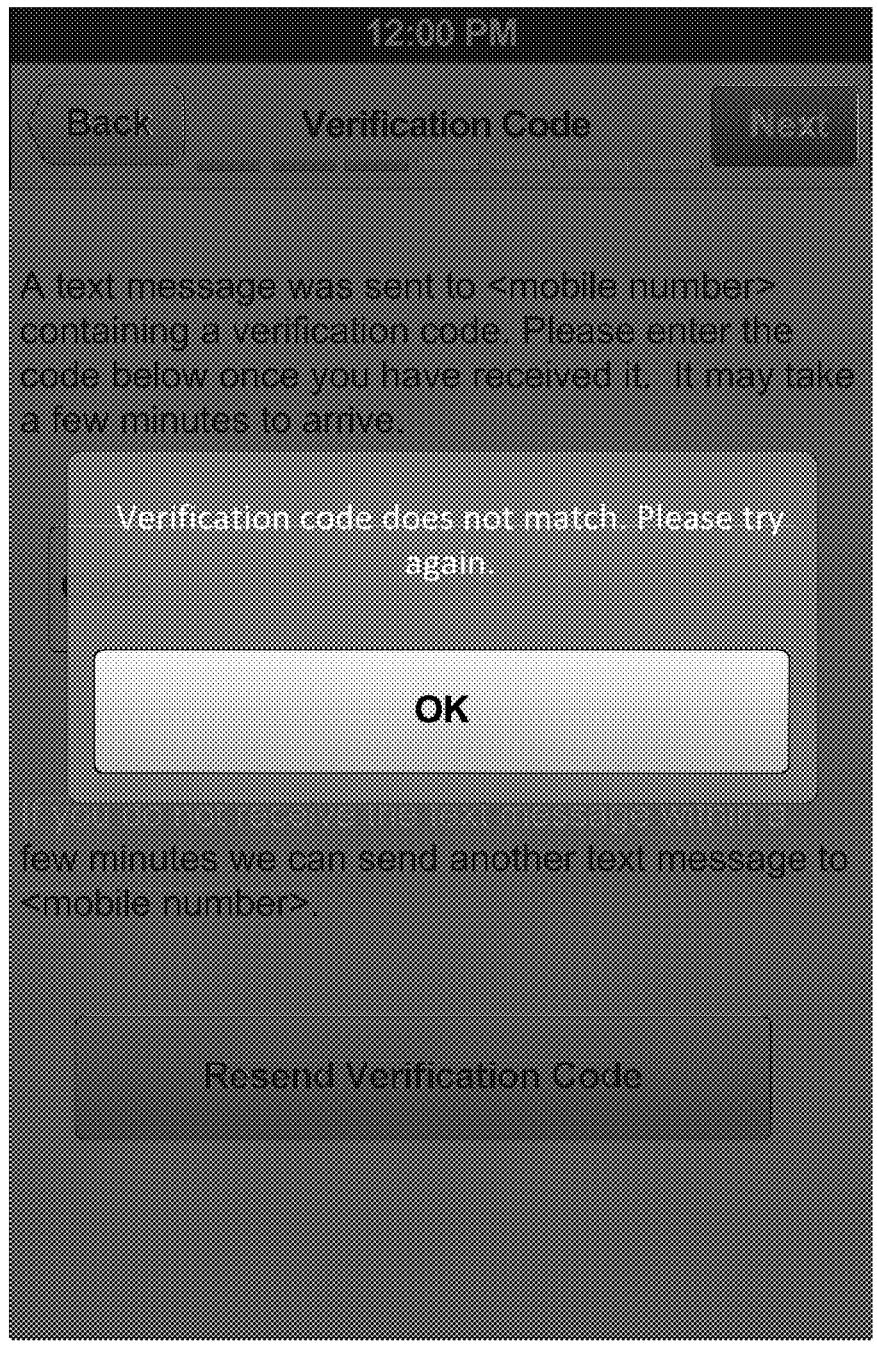
FIG. 15 illustrates a display where the verification code failed to match.
Figure 16:
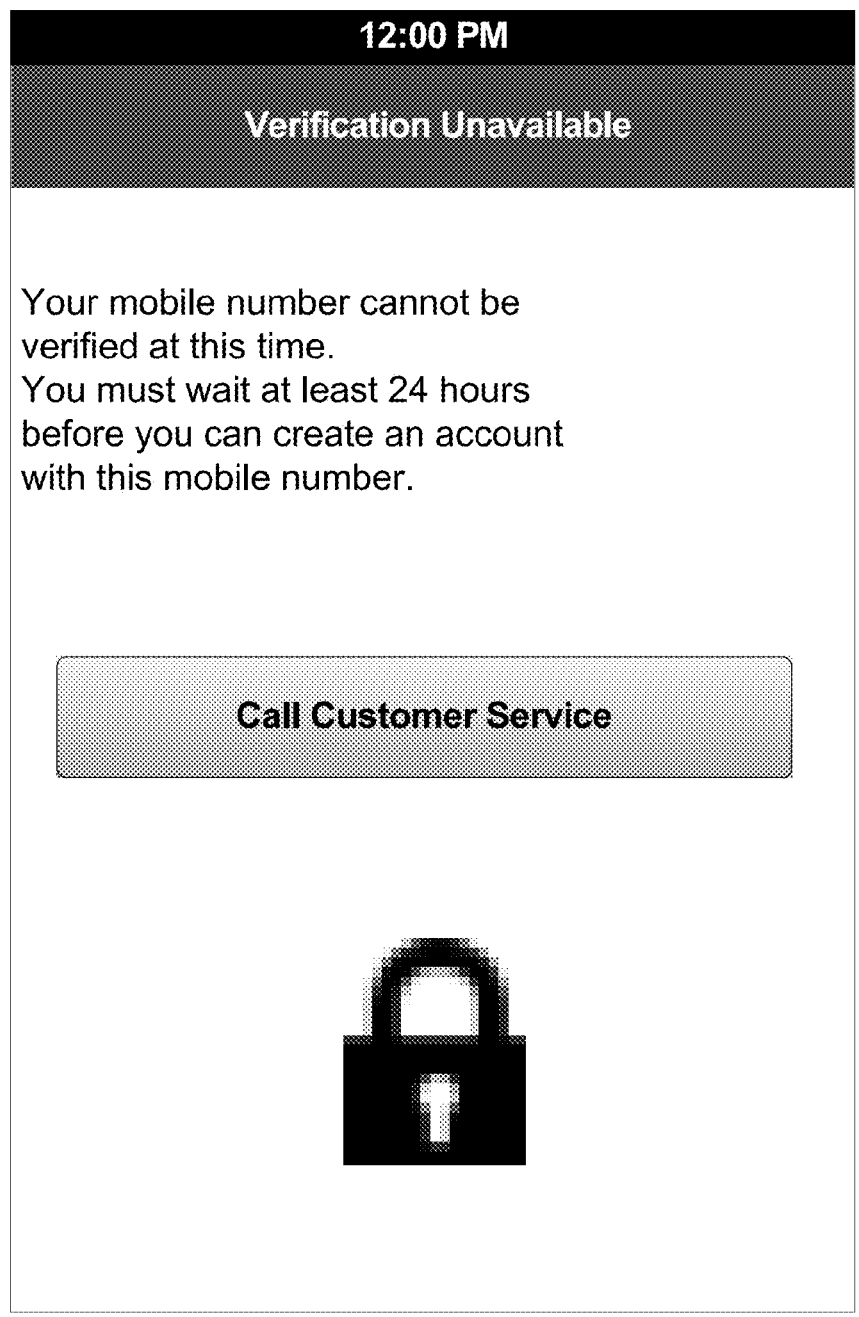
FIG. 16 illustrates a display where the verification code failed to match and the system is locked.

At block 640, the verification message may be resent if requested by the user as illustrated in FIG. 13. Logically, at block 645, the verification code received may be entered as illustrated in FIG. 14. If the verification code fails as illustrated in FIG. 15, the user may be given additional chances to enter the verification code. At block 650, if the verification code fails after a given number of chances (5 chances in some embodiments), at block 655, the device may not be able to access the system for a period of time, such as 24 hours as illustrated in FIG. 16. If the use decides to try again to register after 24 hours they may start over from the beginning. If the user returns to the method before 24 hours have passed, they may be returned to this screen.

Figure 17:
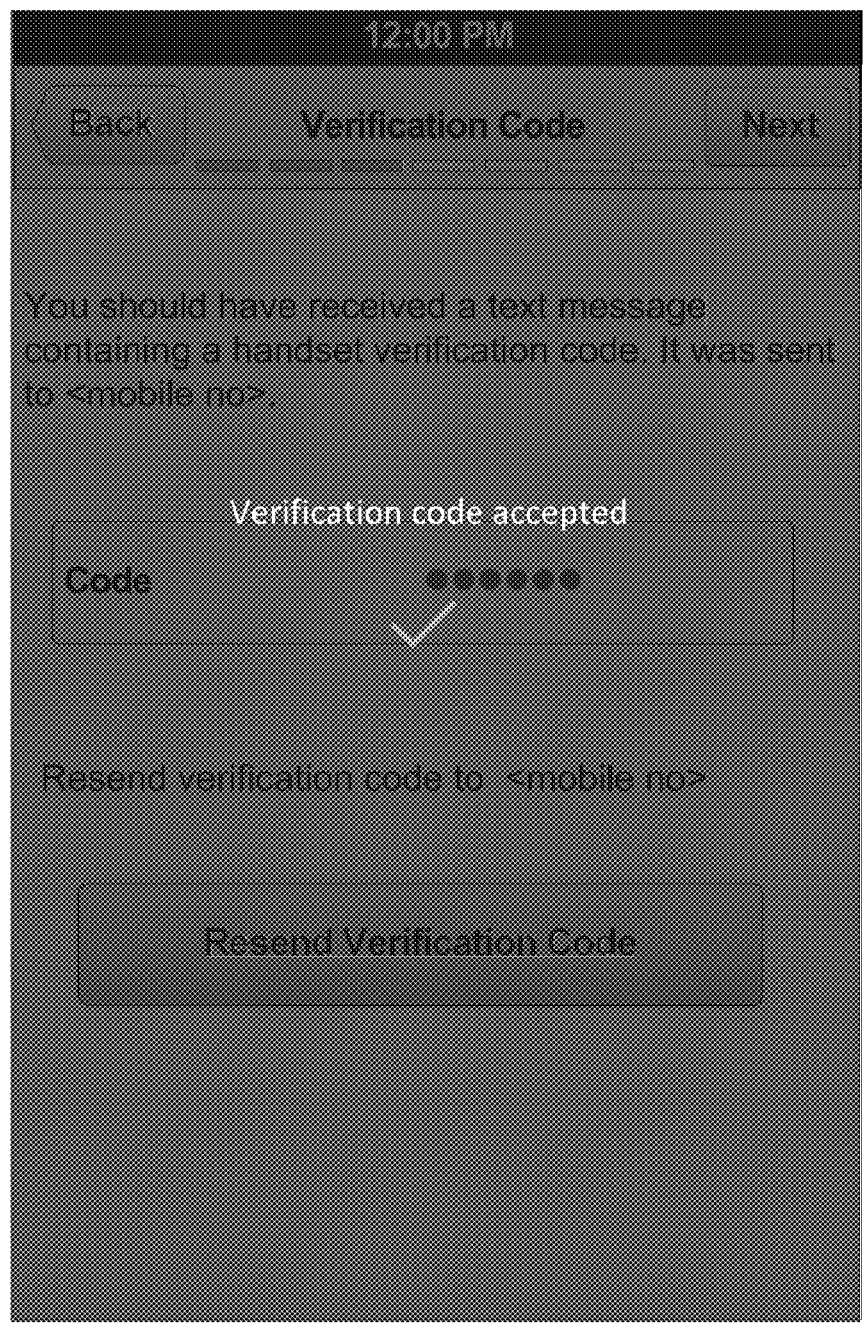
FIG. 17 illustrates a display where the verification code matches.
Figure 18:
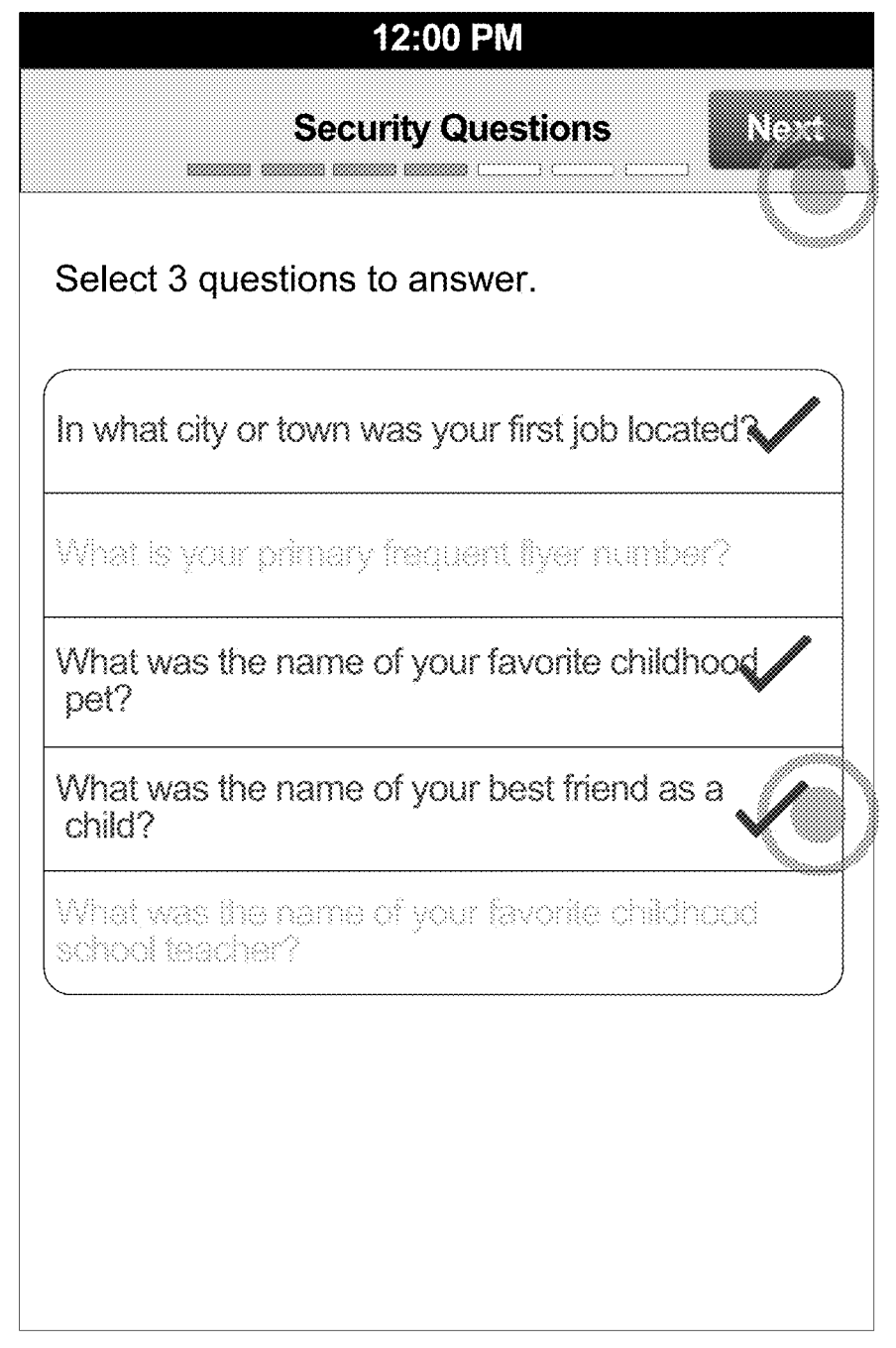

At block 660, the verification code may be accepted as illustrated in FIG. 17. Once the verification code is accepted, the set up process may continue. At block 665, security questions may be selected from a group of security questions as illustrated in FIG. 18. There may be a limit on the number of questions that may be selected. For example, only three questions may be allowed to be selected. If user does not select the desired number of questions, the next button may be greyed out and not available for use. A user may not select more than the desired number of questions. Once the user has selected the desired number of questions, the remaining questions may fade out and be un-selectable. When one of the questions has been unselected, the rest of the questions become selectable again. At block 570, the selected security questions may be answered and entered as illustrated in FIG. 19. The answers may have to be unique from each other. The Next button may only be enabled if all the questions are answered.

Figure 20:
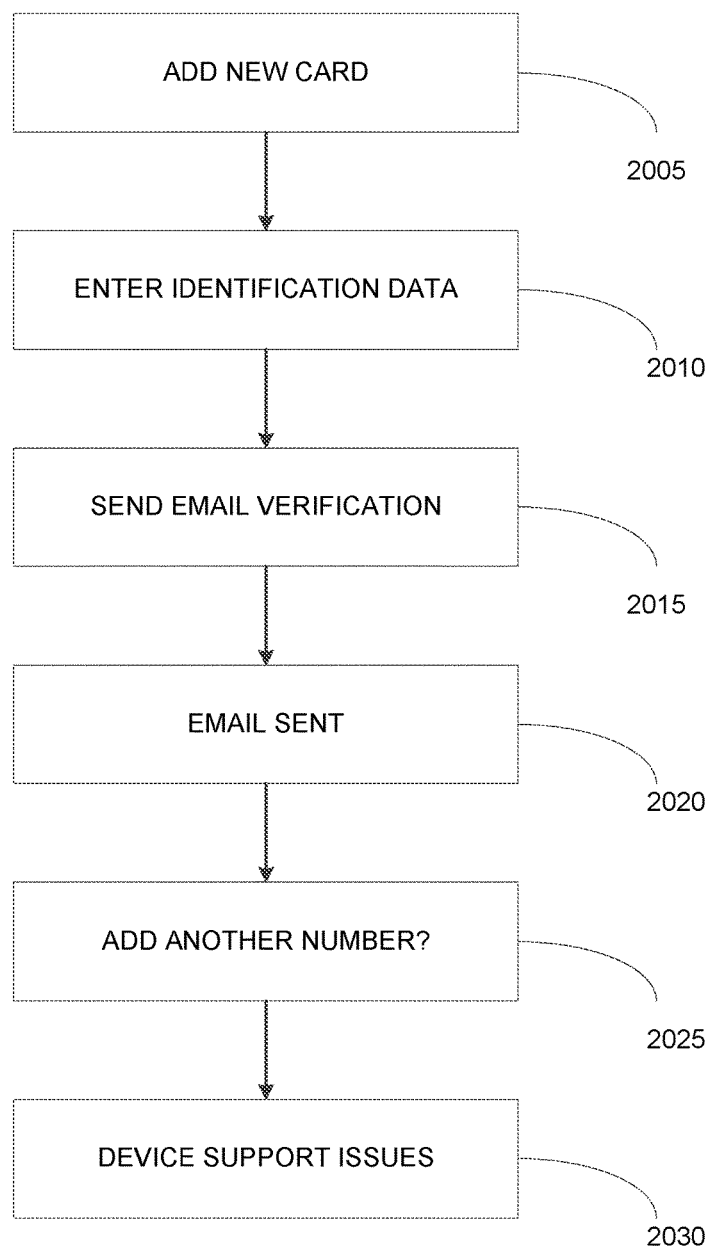
FIG. 20 illustrates a flowchart of adding a number to an account.
Figure 21:
FIG. 21 illustrates an input display for entering account information.
Figure 22:
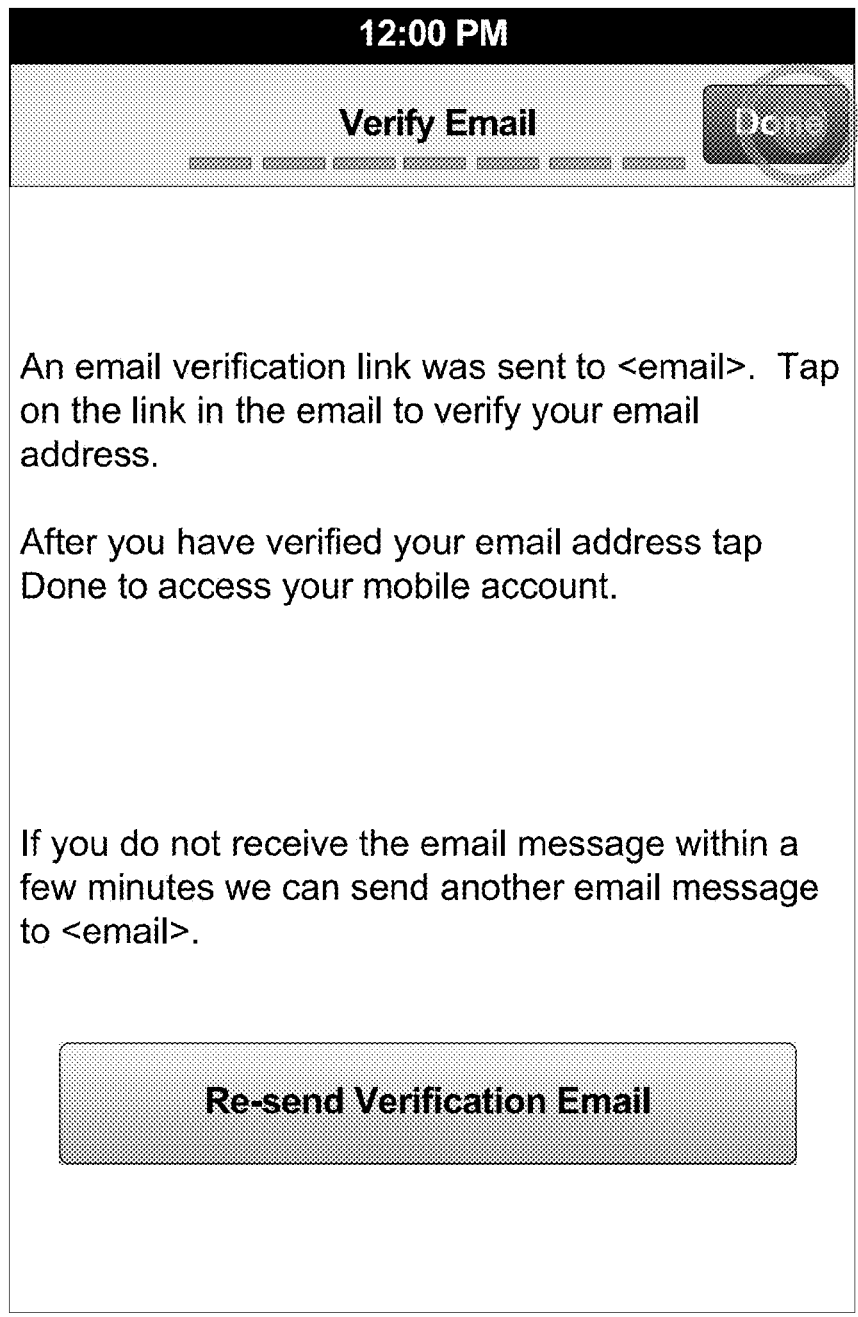
FIG. 22 illustrates an email being prepared to be sent for verification.
Figure 23:
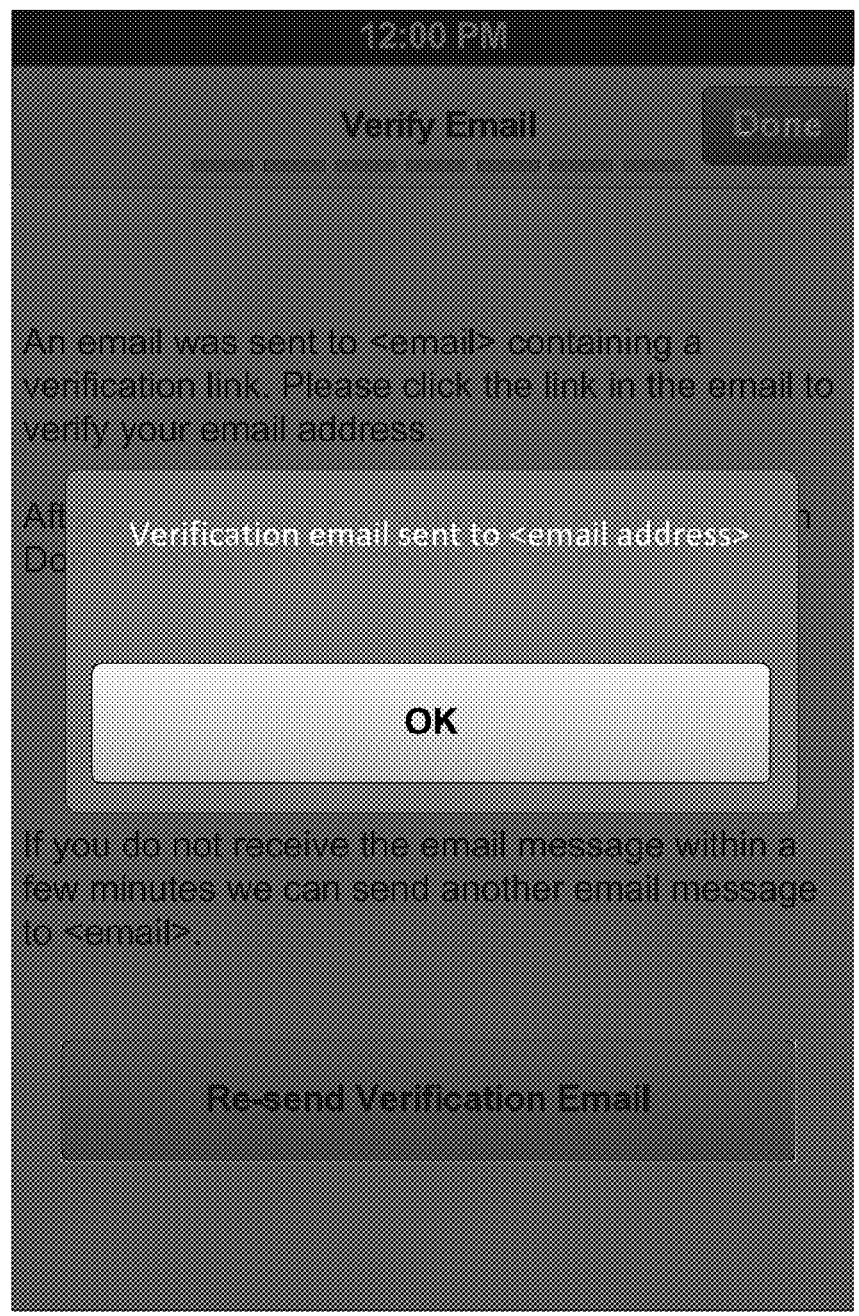
FIG. 23 illustrates an email being sent for verification.
Figure 24:
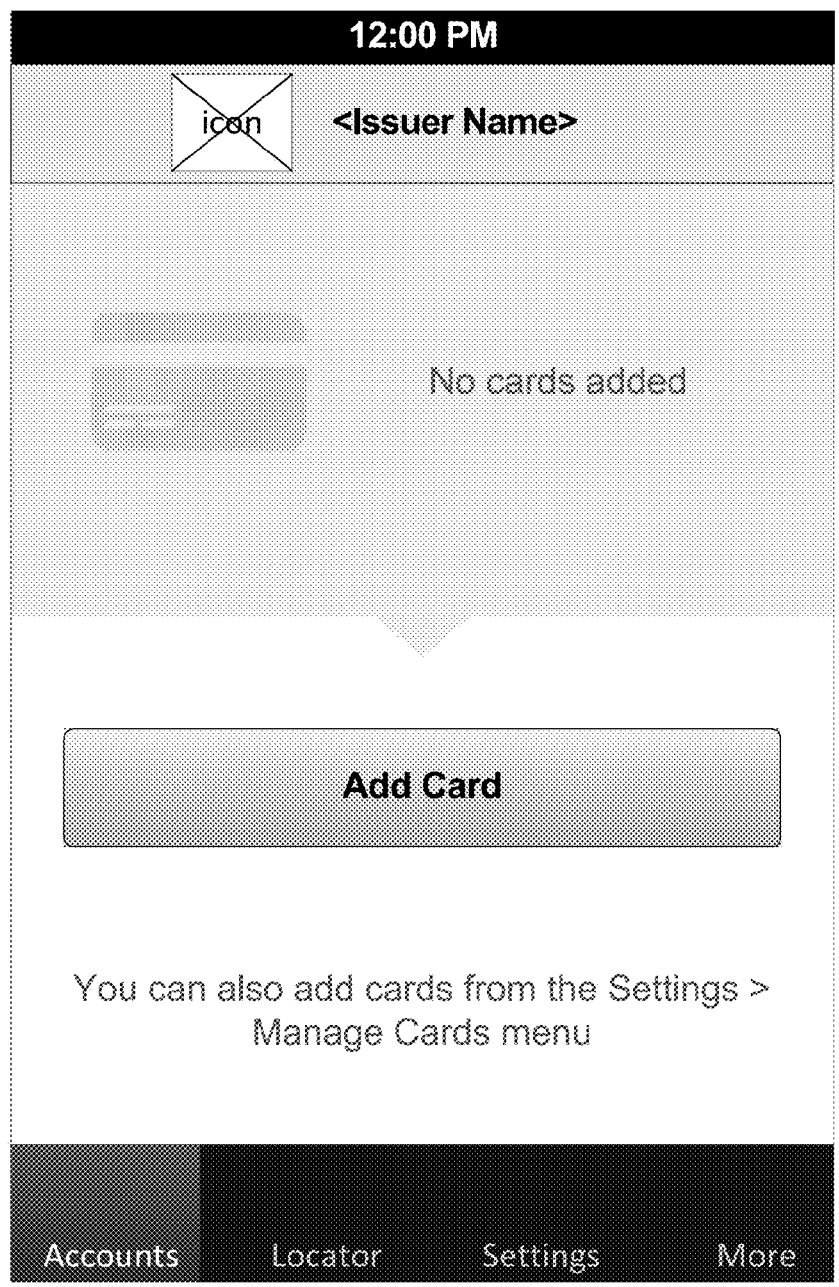
FIG. 24 illustrates a display for adding a card.
Figure 25A:
FIGS. 25a and 25b illustrates displays if there are issues with the portable computing device.
Figure 25B:

In FIG. 20, a method of adding a card using a mobile device may be disclosed. At block 2005, a user may select to add a card. If the card details are filled out, then an "Add Card" button may become enabled. At block 2010, identification data may be entered as illustrated in FIG. 21. At block 2015, tapping on the Re-send Verification Email button may re-send the verification email as illustrated in FIG. 22. At block 2020, an email may be sent as illustrated in FIG. 23. At block 2025, a user may select to add another card as illustrated in FIG. 24. If there are support issues, at block 2030 a message of "Device/OS No Longer Supported" (FIG. 25*a*) or "User's device and or OS is no longer supported" (FIG. 25*b*) may be displayed. If the user tries to launch the app again, the user may be returned to the same screen.

Figure 26:
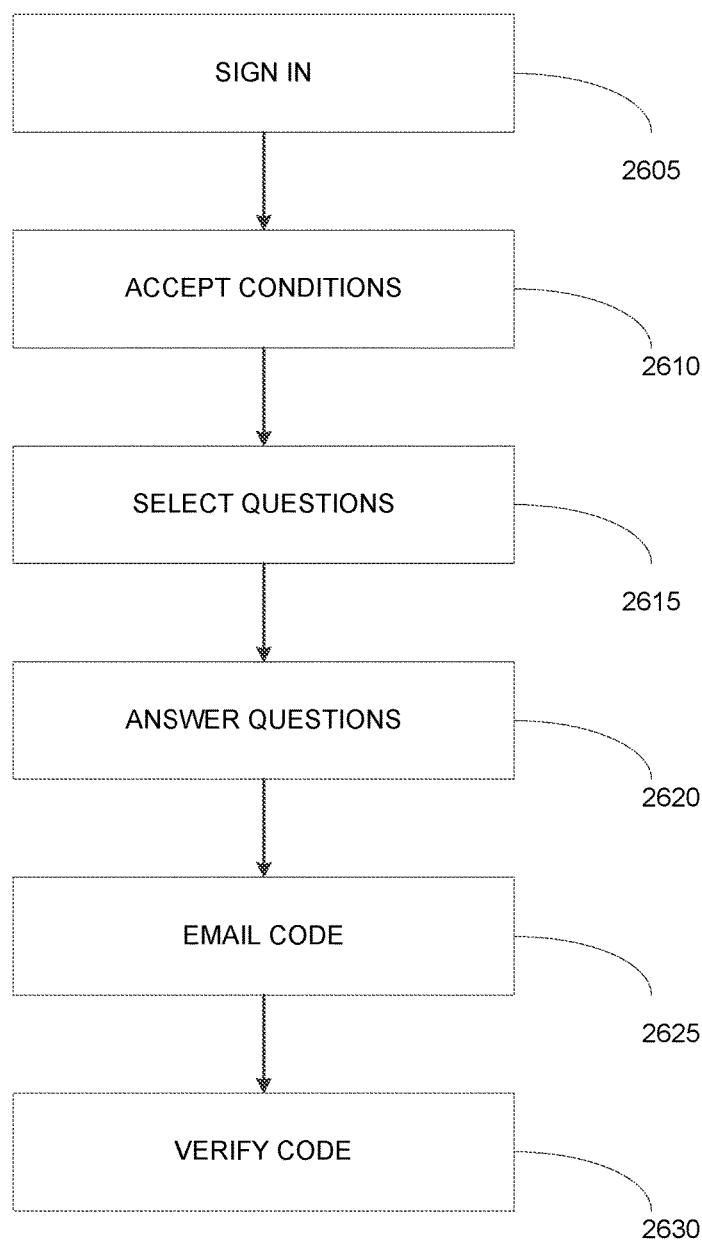
FIG. 26 illustrates a flowchart of adding security questions and verification codes to an account.
Figure 27:
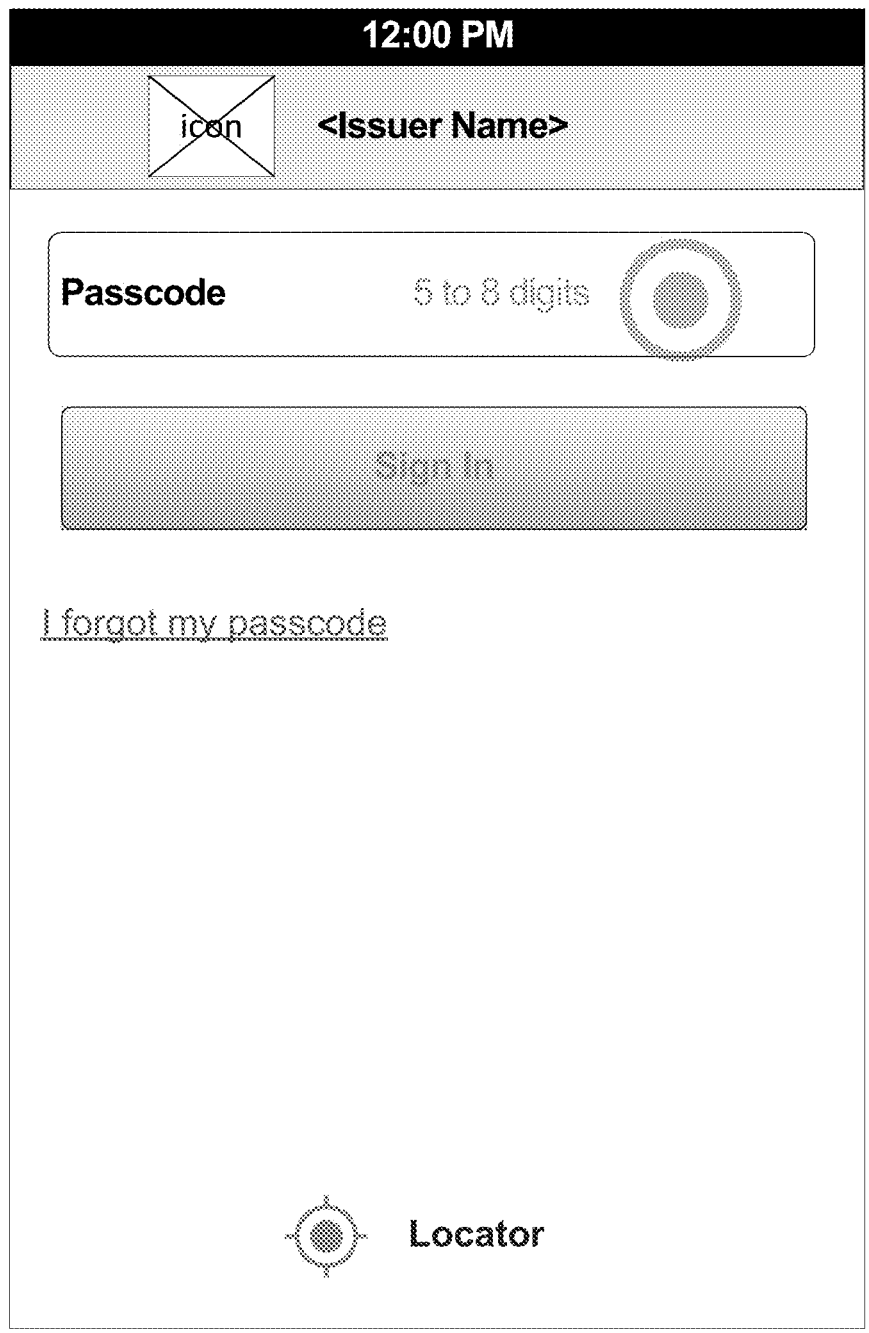
FIG. 27 illustrates a display to enter a passcode.

FIG. 26 may illustrate a sign in procedure. At block 2605, a sign in passcode may be entered as illustrated in FIG. 27. The sign in button may be enable if the passcode field is filled in. The sign in button may be greyed out until at least 5 characters are in passcode field. As mentioned earlier, the passcode may be a plurality of characters or digits or may be restricted such as: numeric; 5-8 digits in length; cannot be ascending or descending sequence; 1 digit cannot make-up over half the code.

At block 2605, the verification code may be entered as illustrated in FIG. 27. The system may prevent more than a known number of digits, such as 8 digits. Like some other passcode fields, the system may accept numeric characters only. The passcode may be masked as it is entered.

Figure 28:
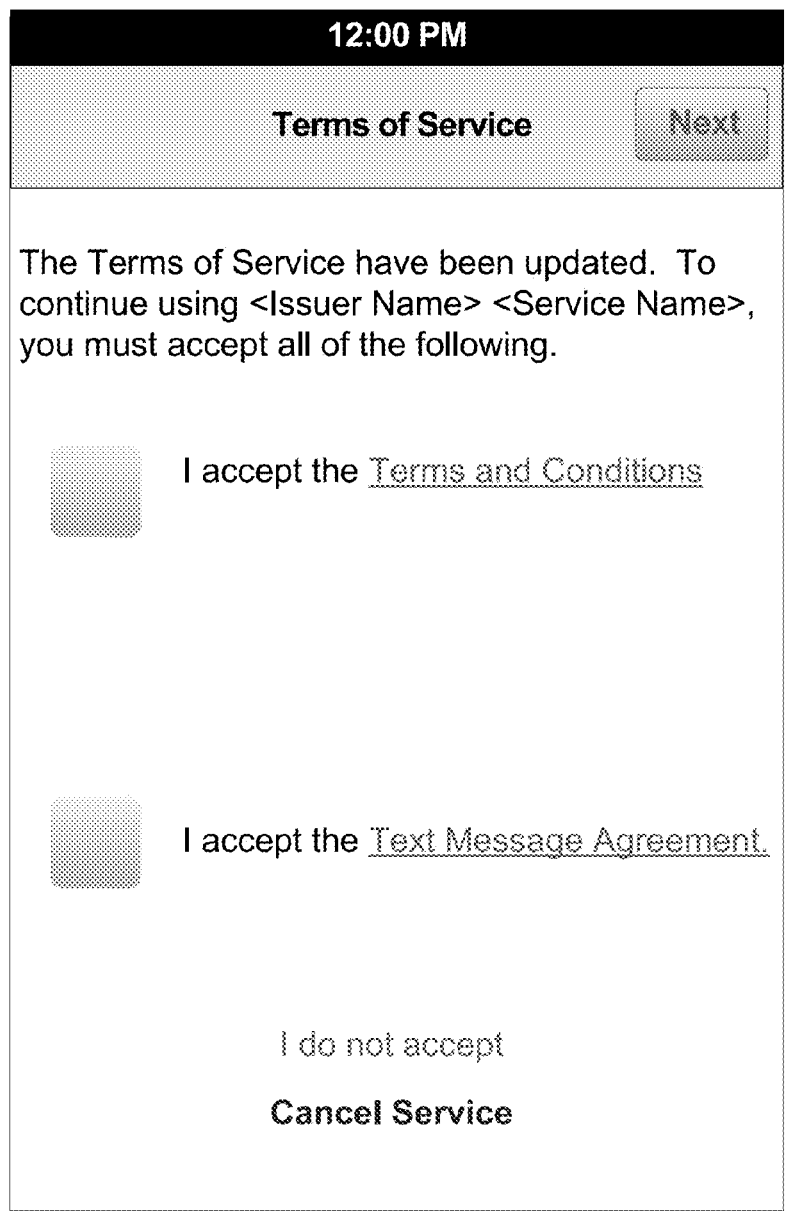
FIG. 28 illustrates a terms of service acceptance display.

At block 2610, the terms of service may be accepted as illustrated in FIG. 28. For existing account holders that have accepted the new Terms of Service, this display may be skipped. The next button may take the user to the signed in state of the application. The next button may only be enabled if both checkboxes are checked.

Figure 29:
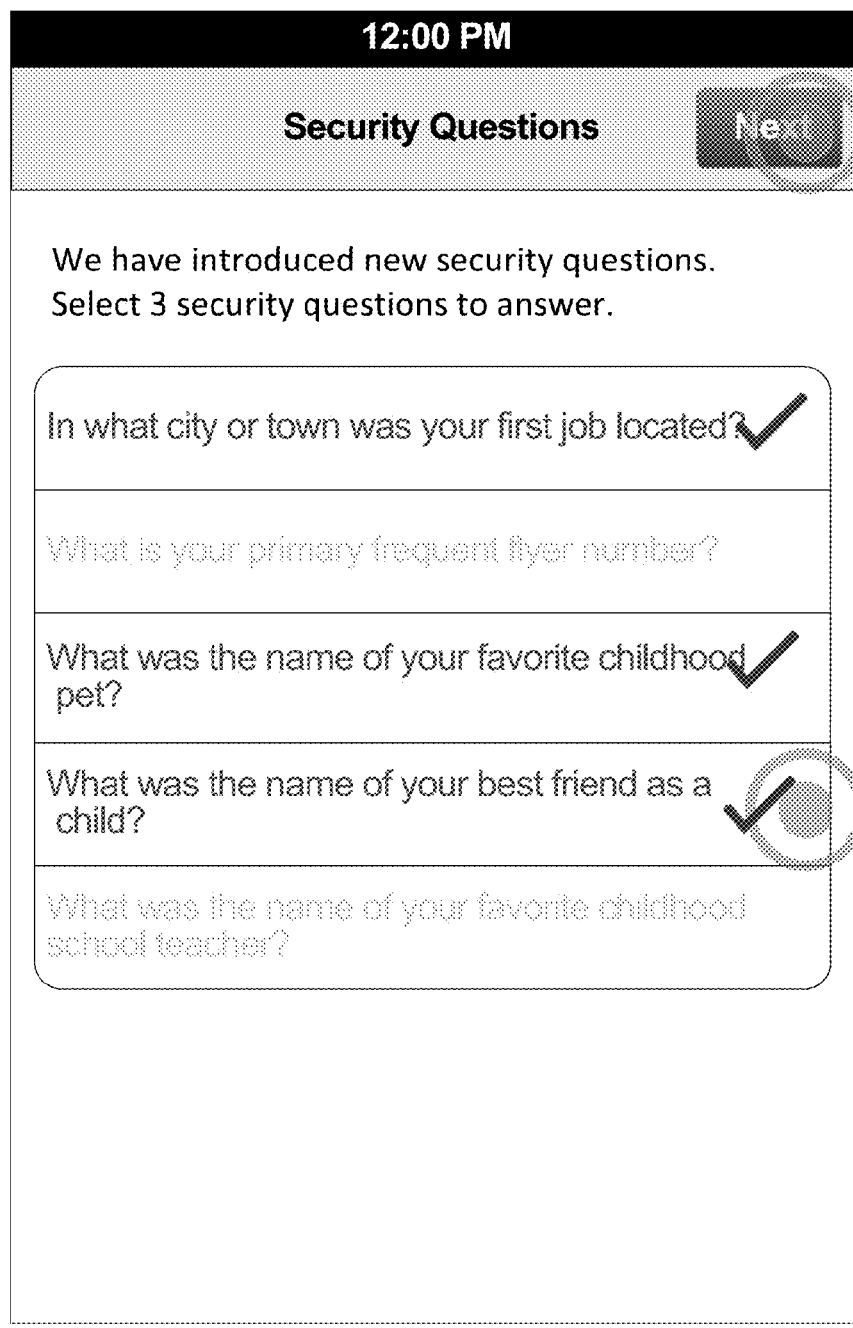
FIG. 29 illustrates a display for selecting security questions.

At block 2615, a security question may be selected as illustrated in FIG. 29. The user may tap to select preferred questions. Tapping on selected questions may unselected them. A limited number of questions may be selected, such as three. If user does not select enough questions, the next button may be greyed out. A user may not select more than a given number of questions. Once the user has selected the given number of questions, the remaining questions may fade out and be un-selectable. When one of the questions has been unselected, the rest of the questions may become selectable again.

At block 2620, the security questions may be answered as illustrated in FIG. 30. A user may tap in each answer field and then enter the answer and select Done. The Done button may only be enabled if all questions answered. The answer may have requirements such as the answer may have to be alphanumeric, spaces, or Spanish characters, may be between 1 and 100 characters and may be case insensitive. The answers may be required to be unique and may be masked when entered.

Figure 31:
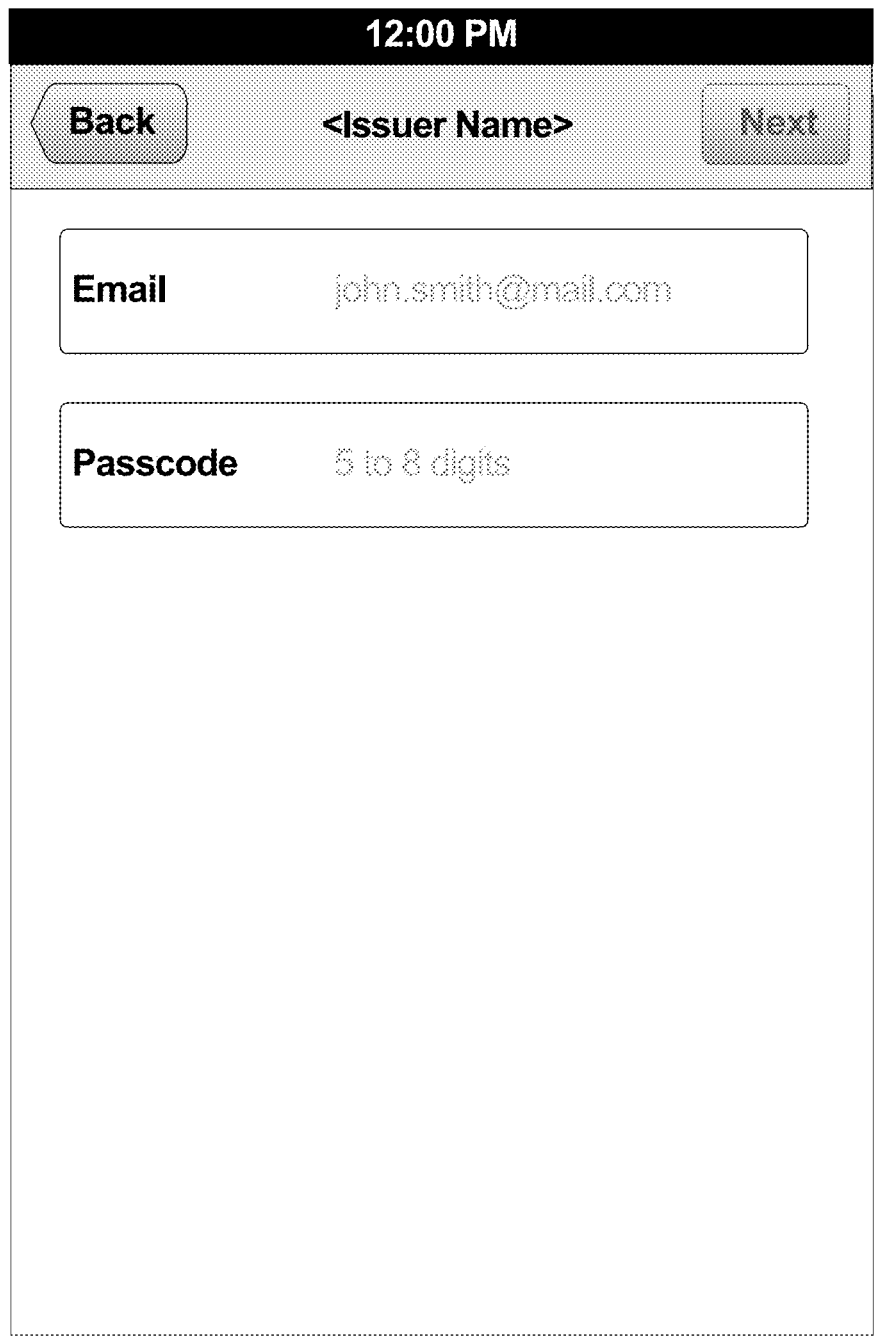
FIG. 31 illustrates entering an email for verification.
Figure 32:
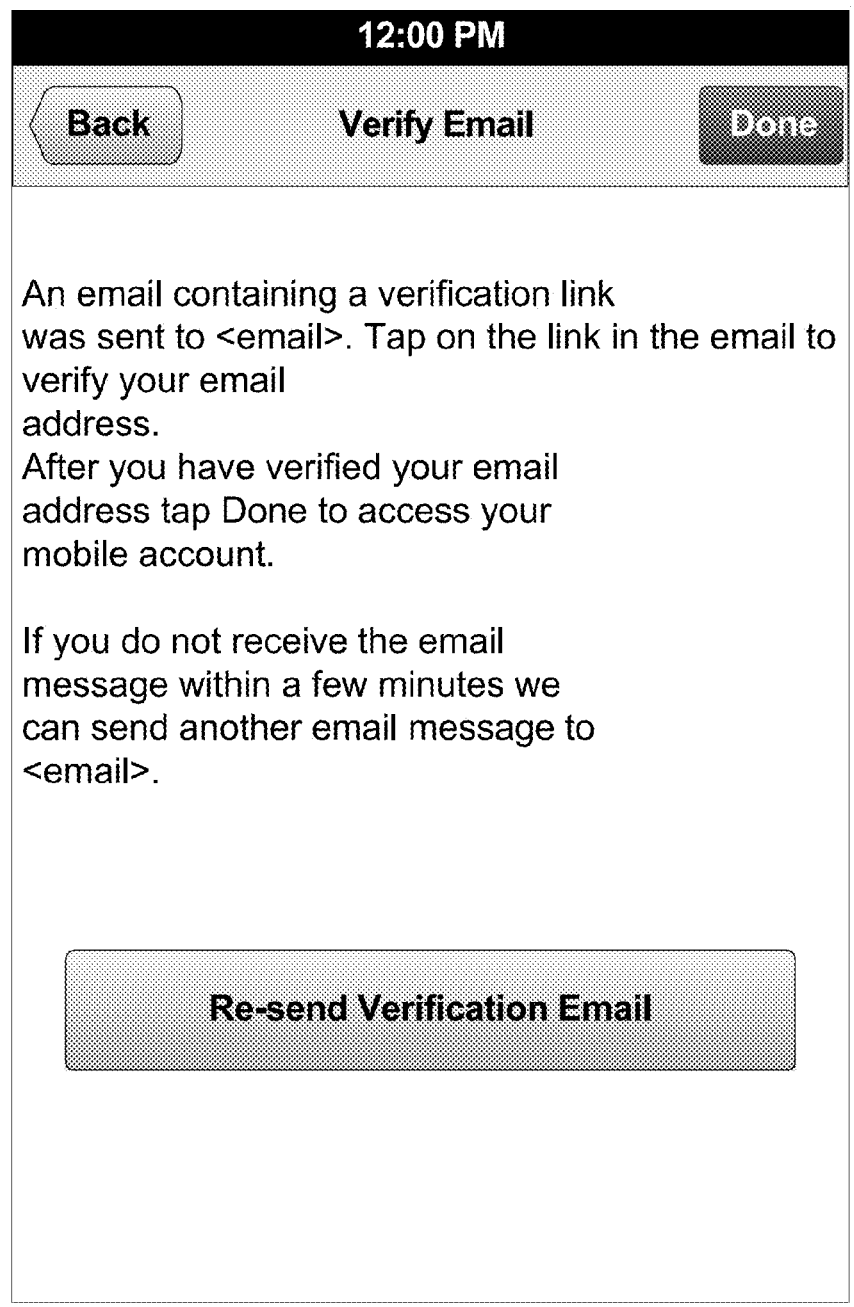
FIG. 32 illustrates an email being sent to the email address for verification.

If a user already has an account, at block 2625 the code may be entered as illustrated in FIG. 31. A user may enter from the start screen and tap on the "Already Have an Account?" button. A user may enter their registered email address and passcode and the next button may be enabled if both the passcode and email fields are filled out. The sign in button may be greyed out until at least sufficient characters are entered in passcode field. At block 2630, a verification email may sent as illustrated in FIG. 32.

Figure 33:
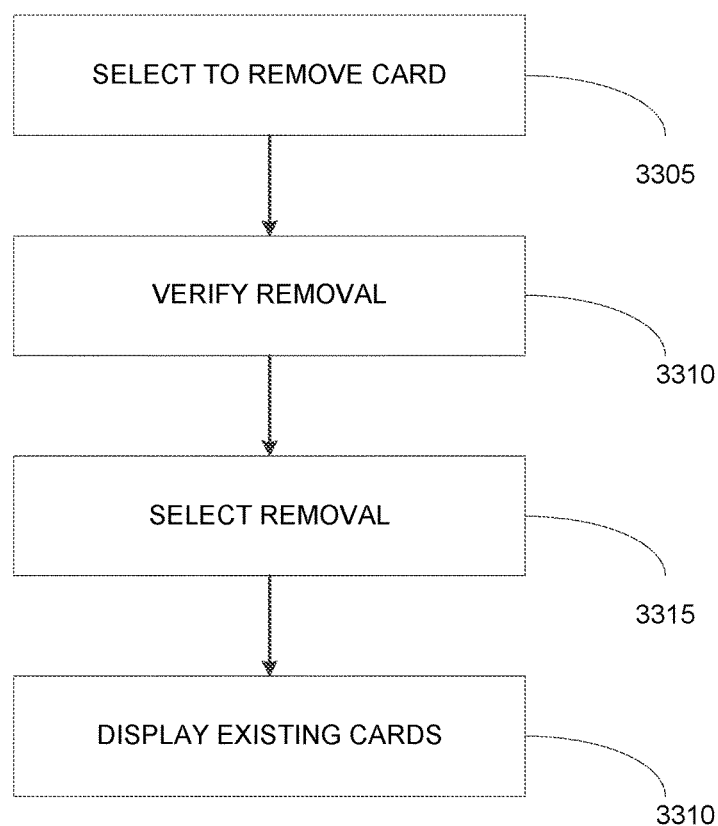
FIG. 33 illustrates a flowchart of removing cards from an account.
Figure 34:
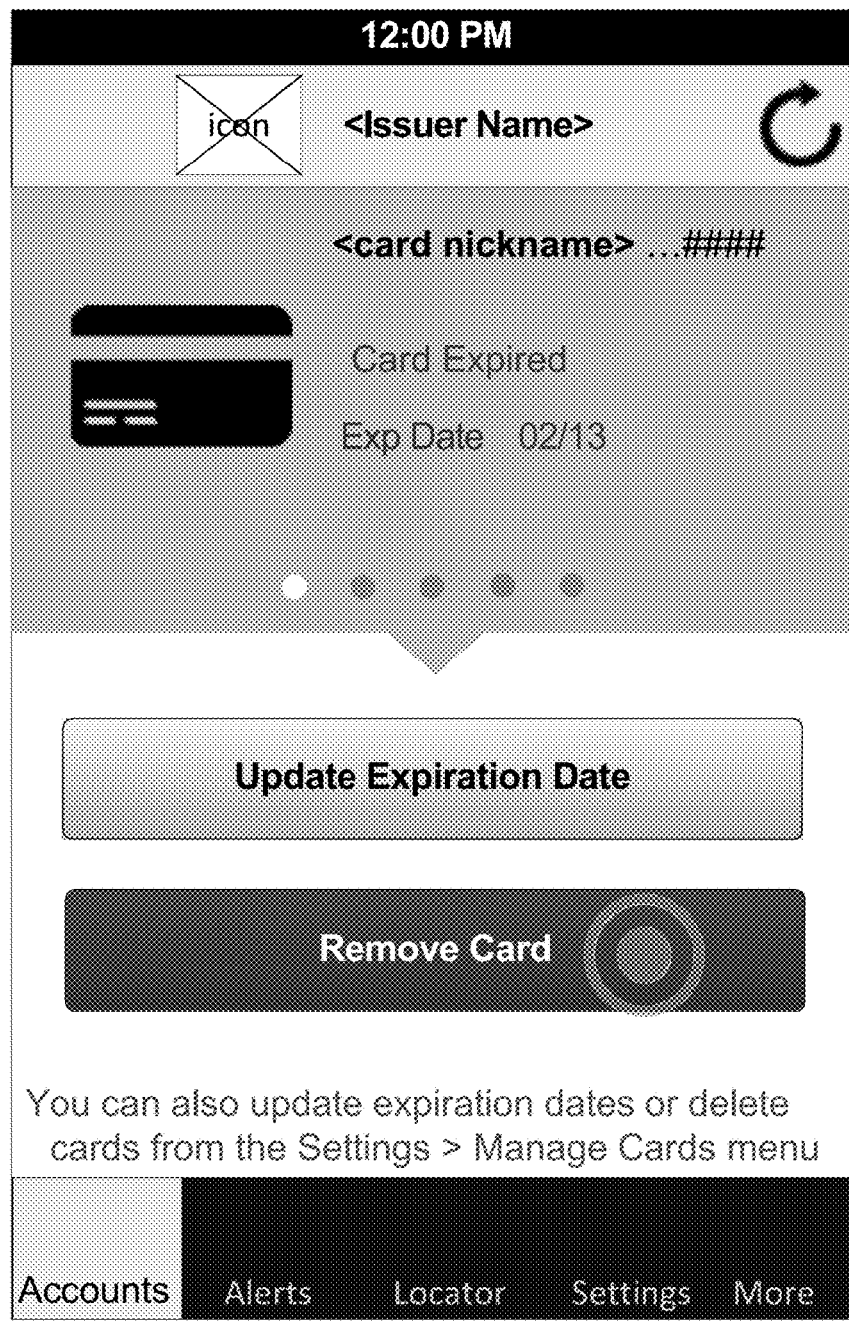
FIG. 34 illustrates a display to select to remove a card.
Figure 35:
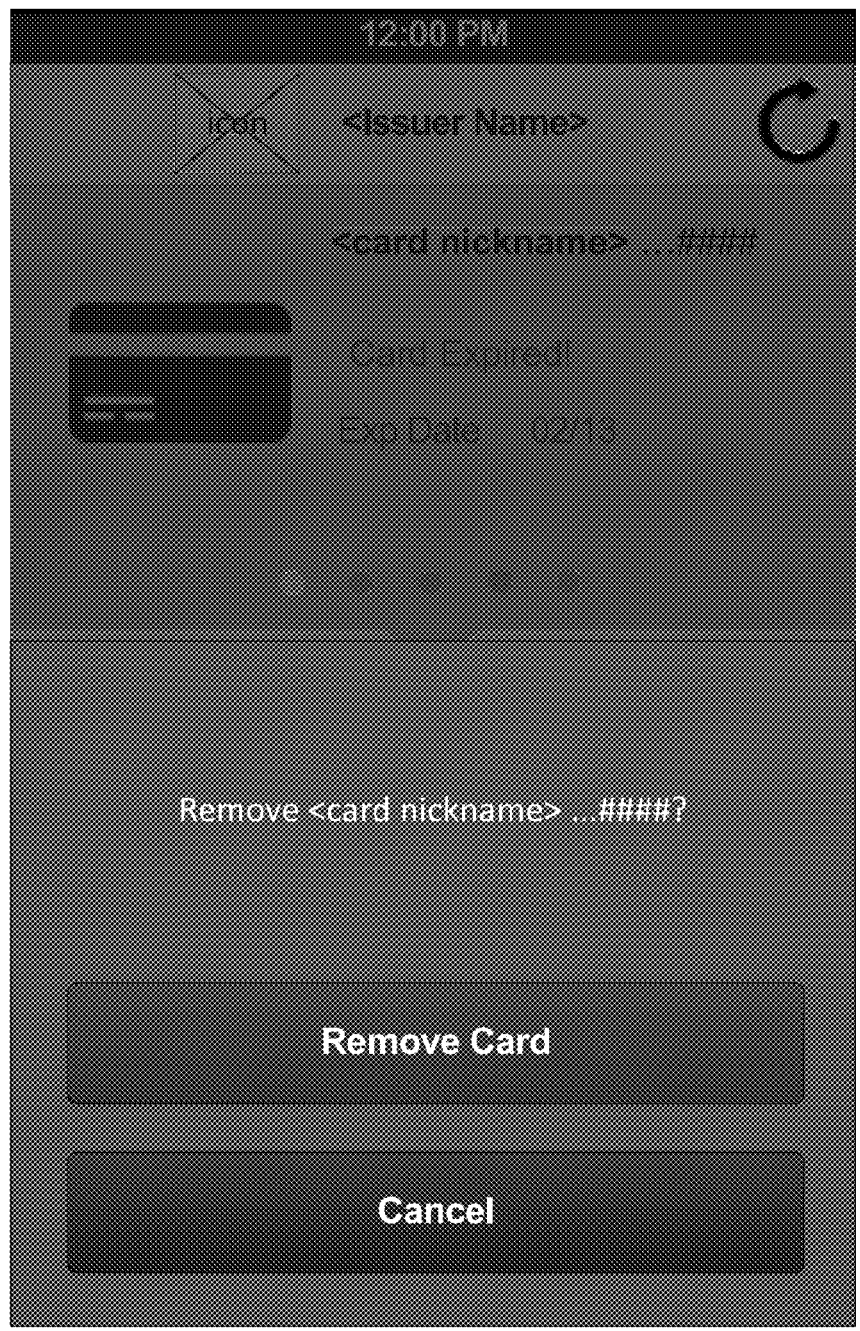
FIG. 35 illustrates a confirmation display to remove a card.
Figure 36:
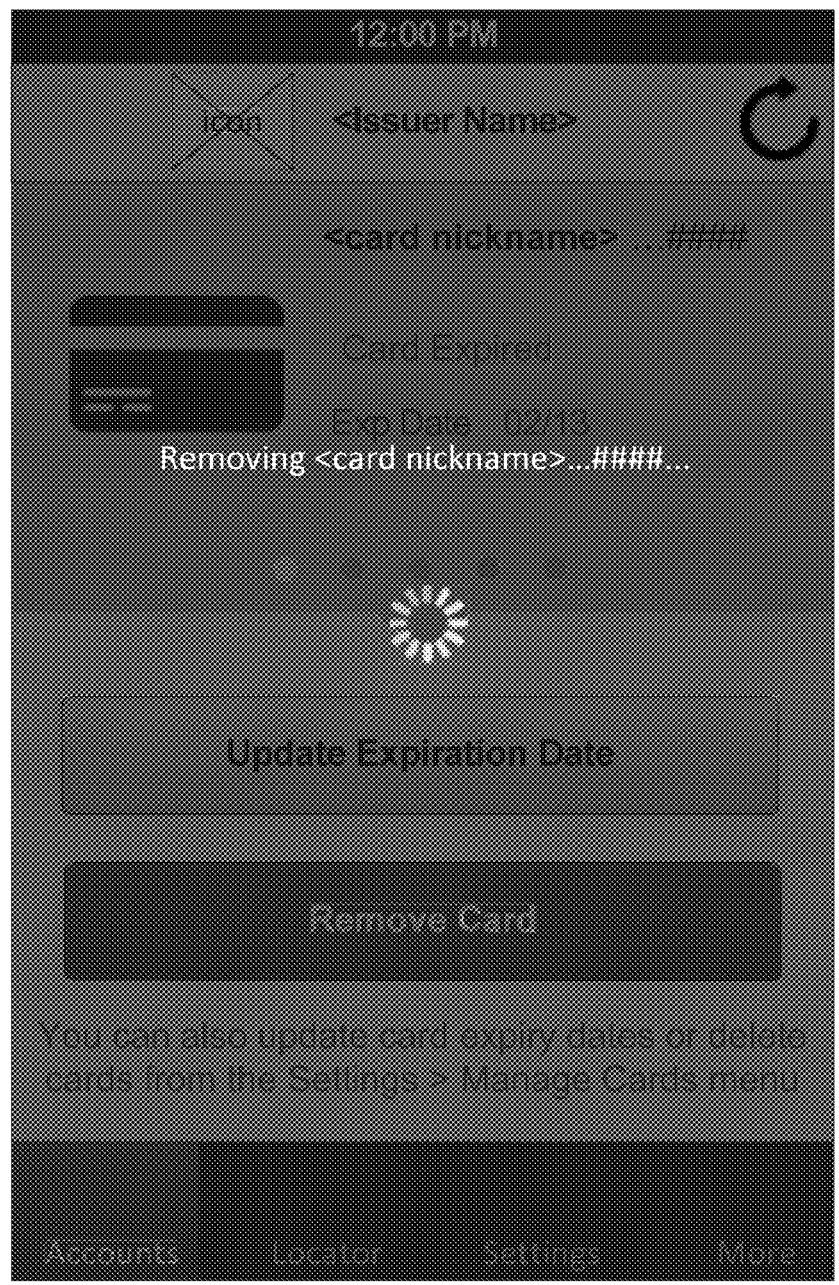
FIG. 36 illustrates a display or removing a card.
Figure 37:
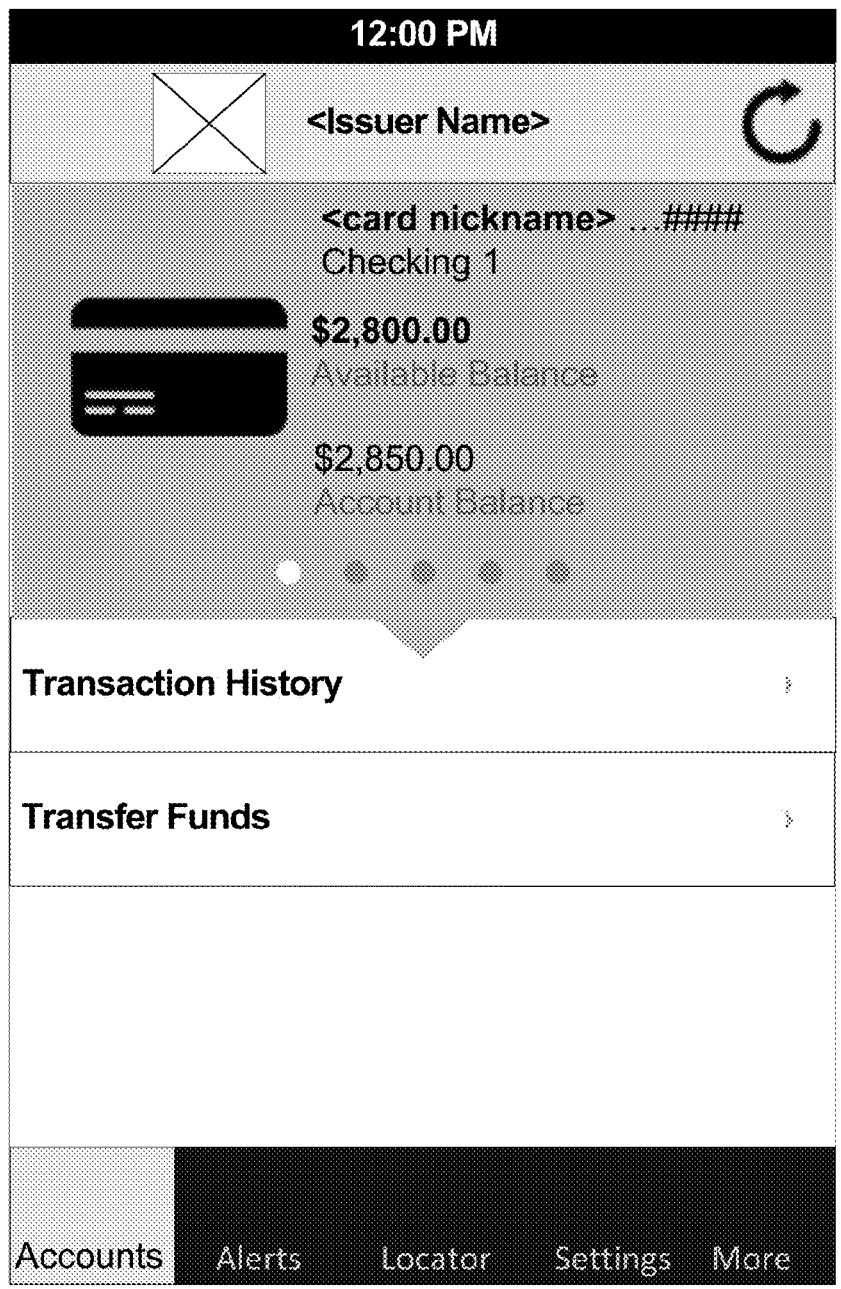
FIG. 37 illustrates the remaining accounts after a card has been removed.

FIG. 33 may be an illustration of a flowchart for deleting a card from the system. At block 3305, a user may select to remove a card as illustrated in FIG. 34. To ensure a card is not accidentally removed, at block 3310, the removal may be verified as illustrated in FIG. 35. At block 3315, once the removal has been verified, the removal may occur as illustrated in FIG. 36. Once the removal is complete, at block 3320, the remaining cards may be displayed to a user as illustrated in FIG. 37.

Figure 38:
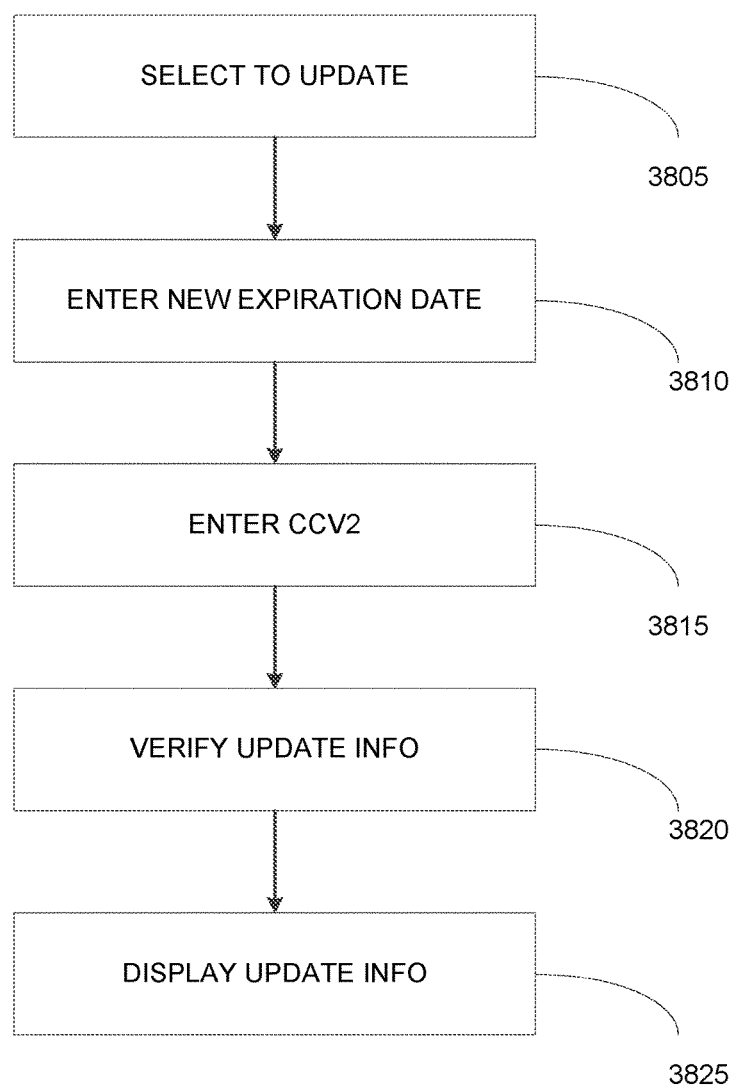
FIG. 38 illustrates a flowchart of updating cards in an account.

Logically, card data may need to be updated. In some embodiments, the update may be automatic as the system may note that a card is going to expire and may inquire from an issuer whether there is updated information on the card. In other embodiments, the information may be pushed to the system from the issuer. And, in some embodiments, the data may be inputted manually by a user. FIG. 38 may illustrate one possible method to input updated expiration information.

Figure 39:
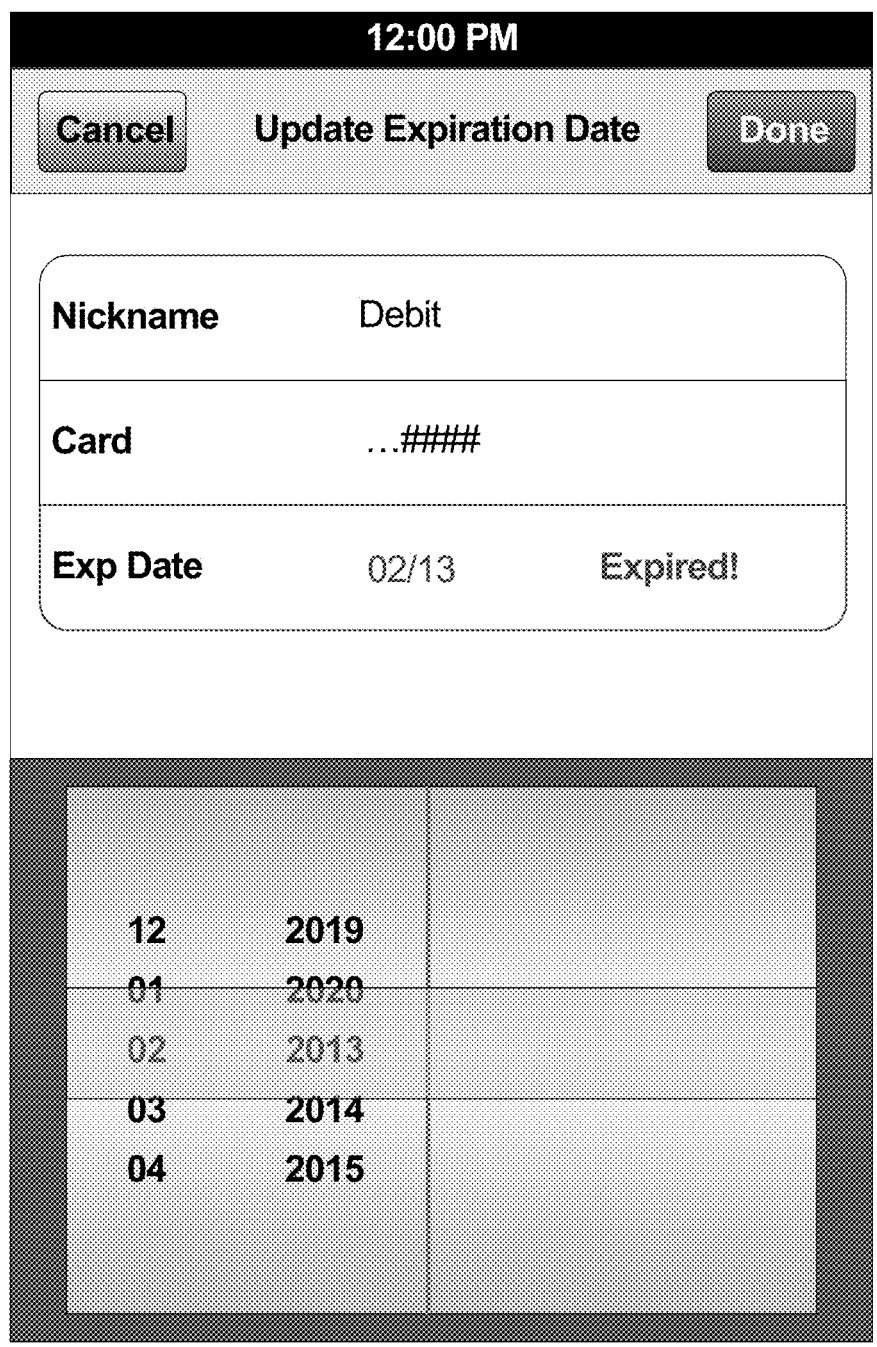
FIG. 39 illustrates a display for entering expiration dates.
Figure 40:
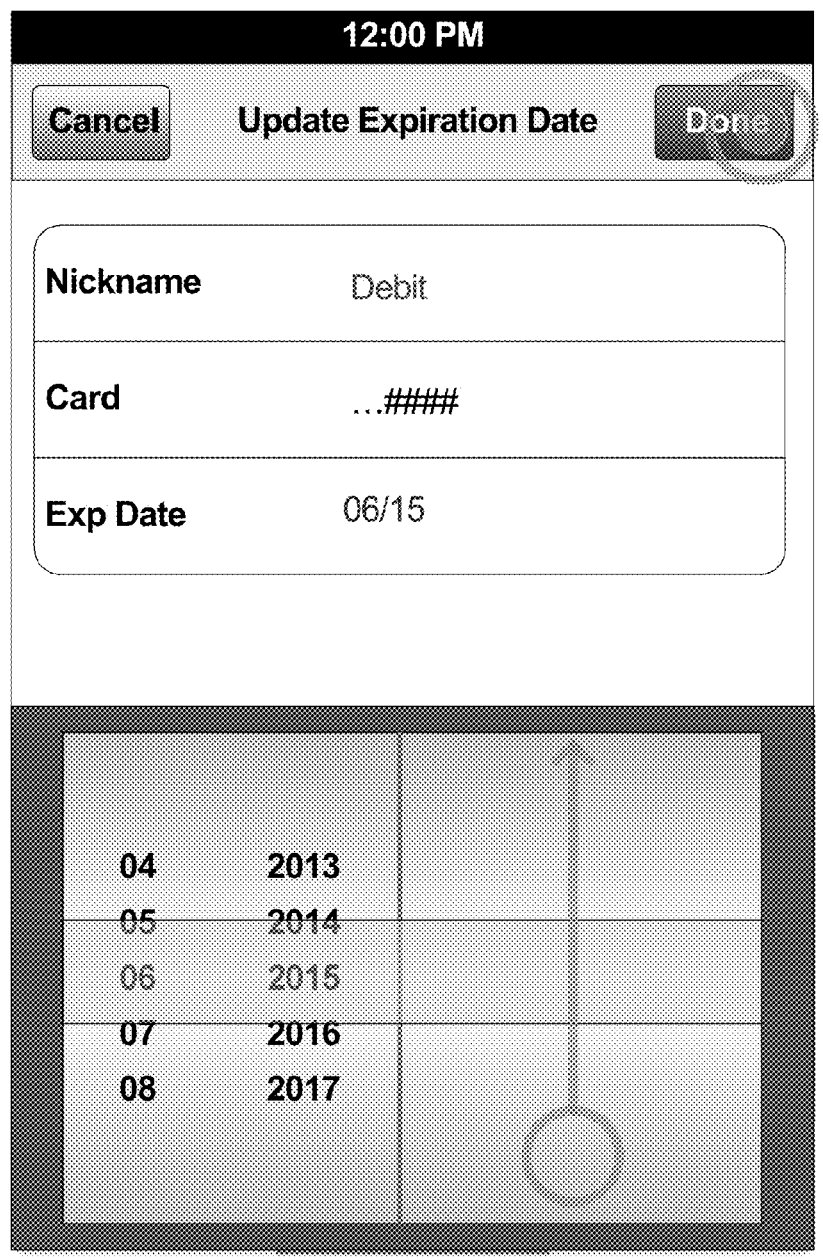
FIG. 40 illustrates a display for entering expiration dates.
Figure 41:
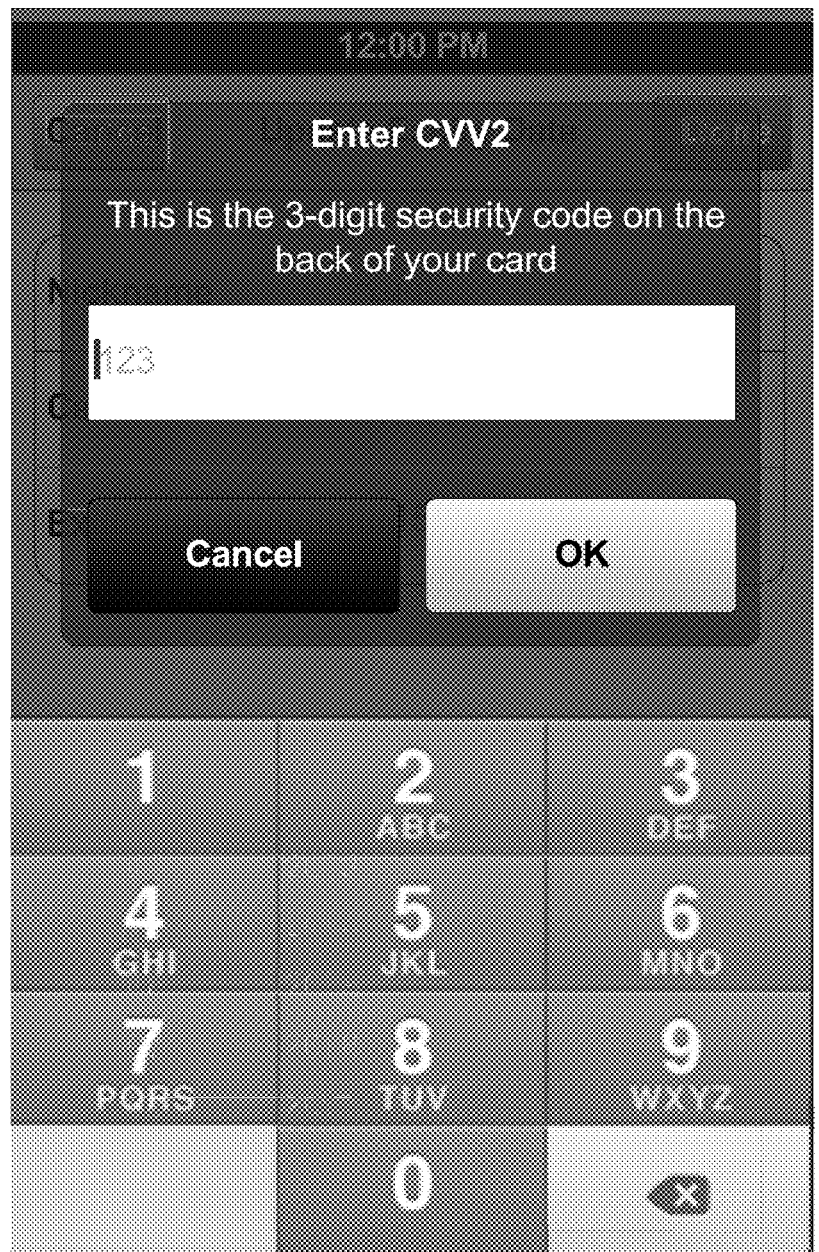
FIG. 41 illustrates a display for entering ccv2 codes.
Figure 42:
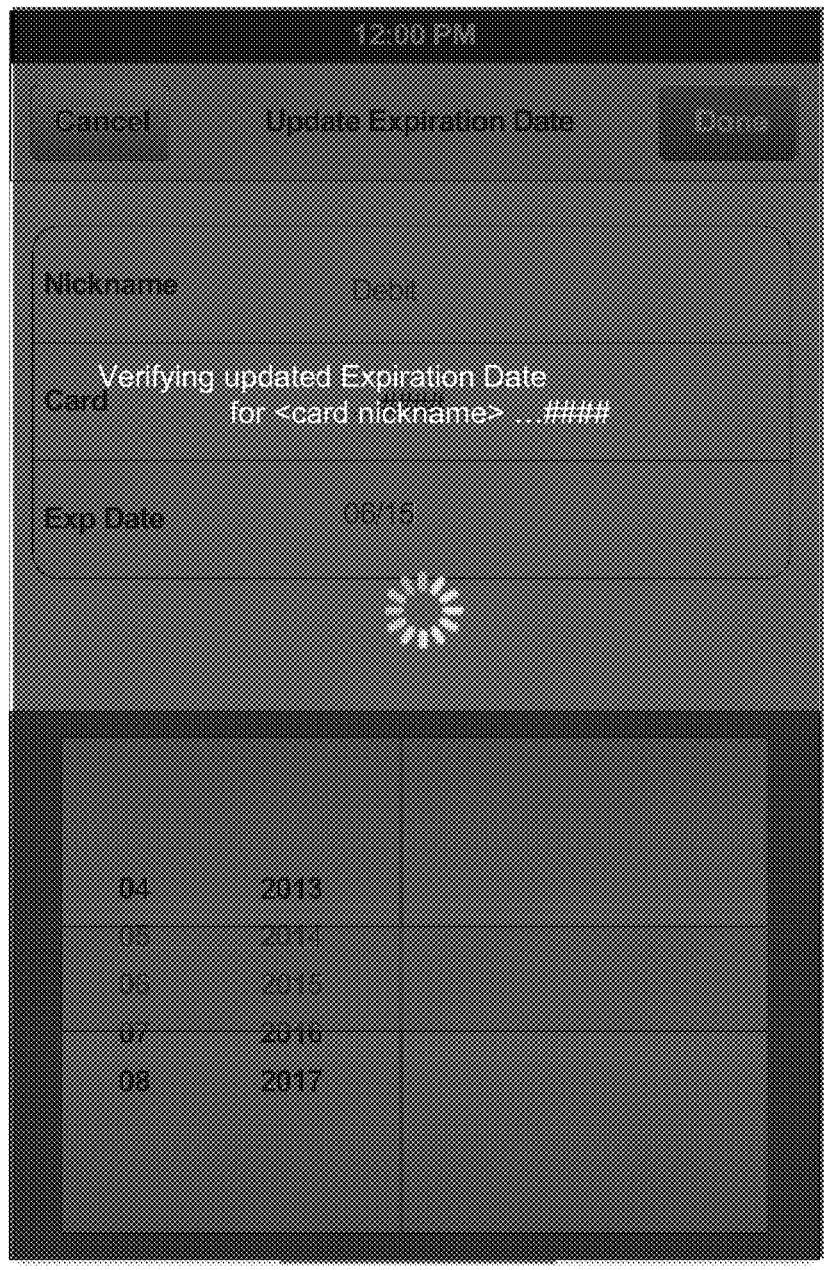
FIG. 42 illustrates a display for verifying codes.
Figure 43:
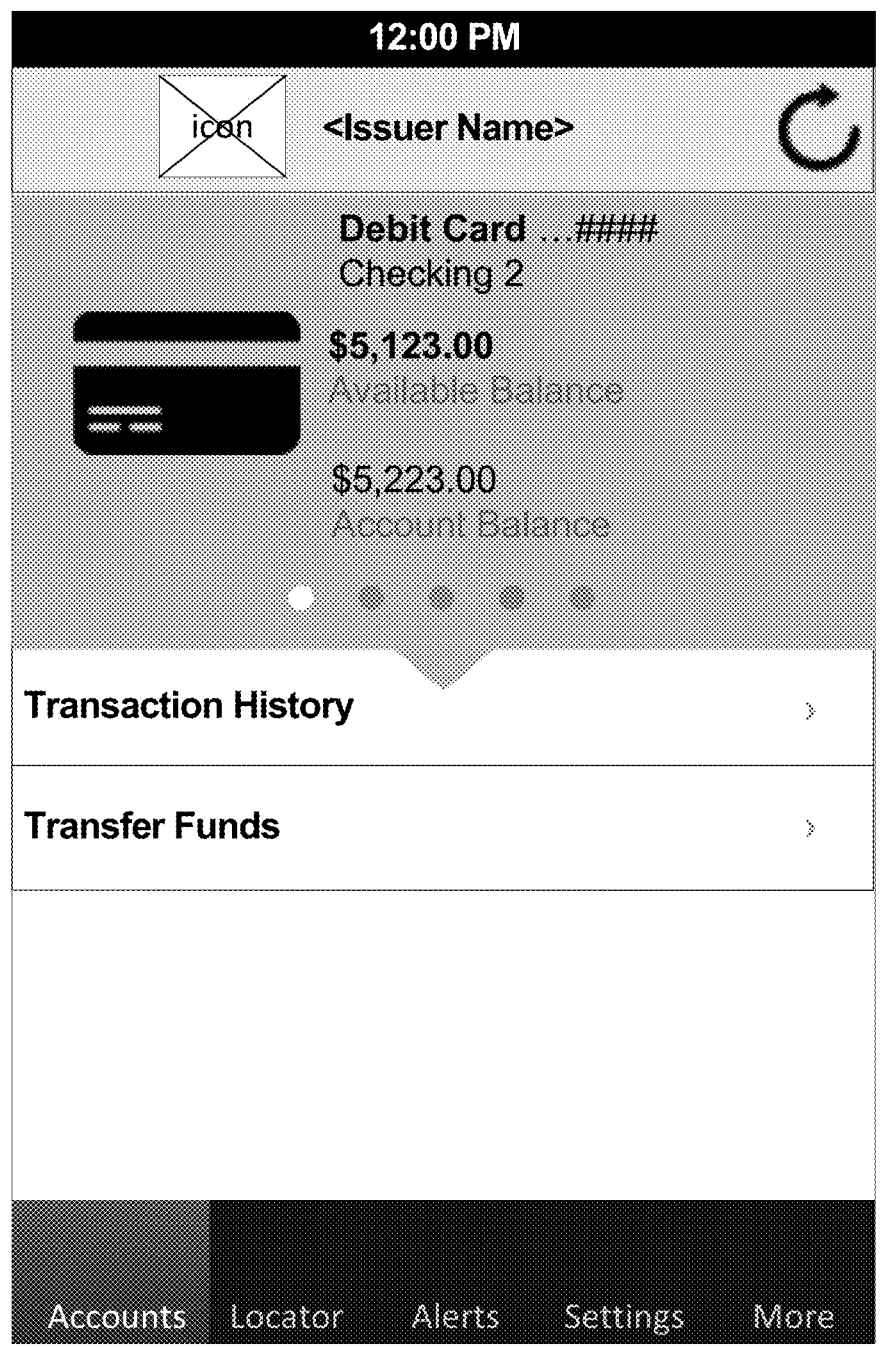
FIG. 43 illustrates an updated card in an account.

At block 3805, a display may note that a card in the system has an expired card as illustrated in FIG. 39. At block 3810, a user may then select to update the expiration date using an input display as illustrated in FIG. 40. At block 3815, a user may also update the three digit CVV2 code from the back of the card as illustrated in FIG. 41. At block 3820, the information may be verified as illustrated in FIG. 42. At block 3825, the updated information may be displayed with the card in question returning to a valid state due to the update.

Figure 44:
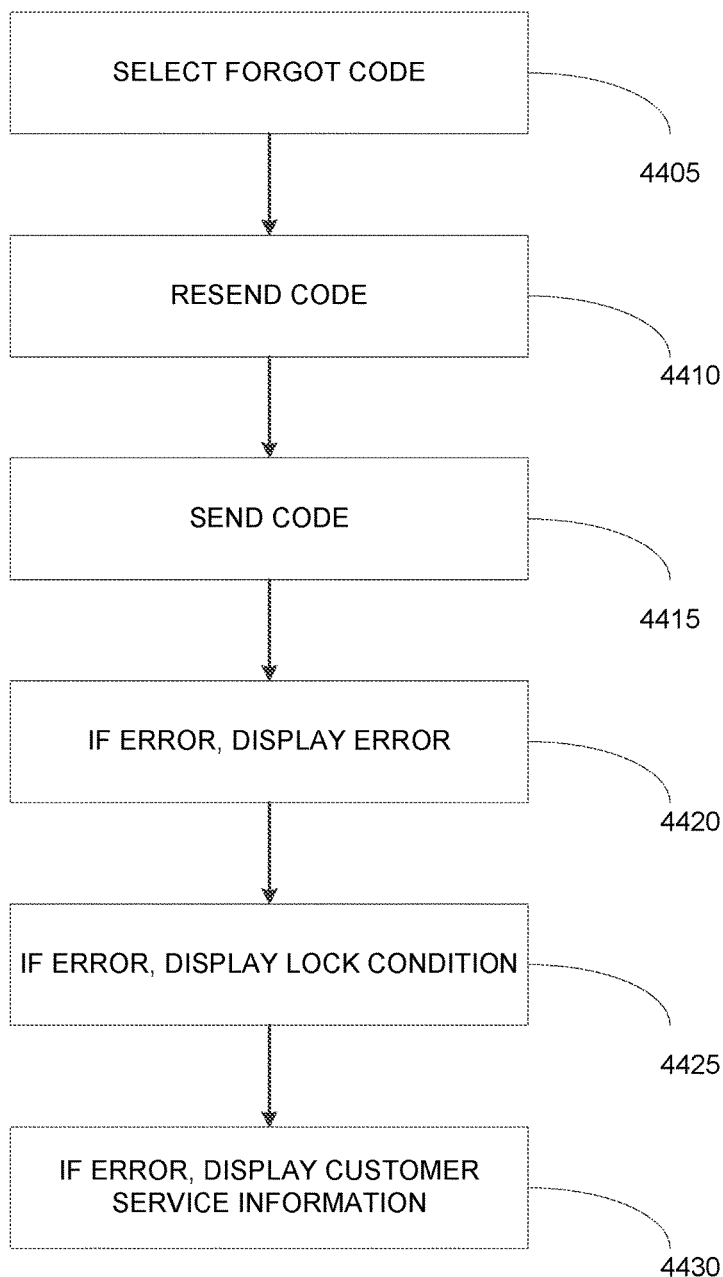
FIG. 44 illustrates a flowchart of resending codes for an account.
Figure 45:
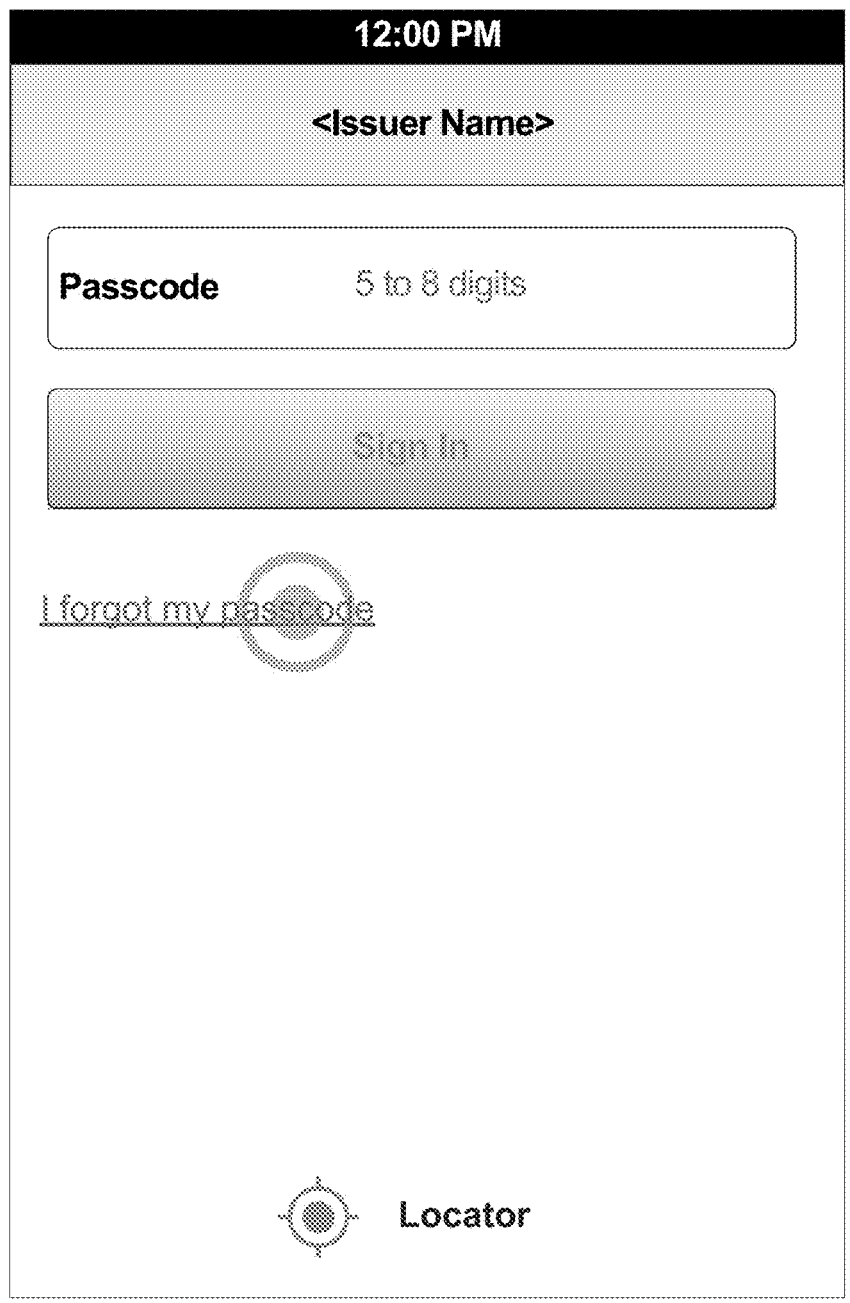
FIG. 45 illustrates selecting that a passcode was forgotten.
Figure 46:
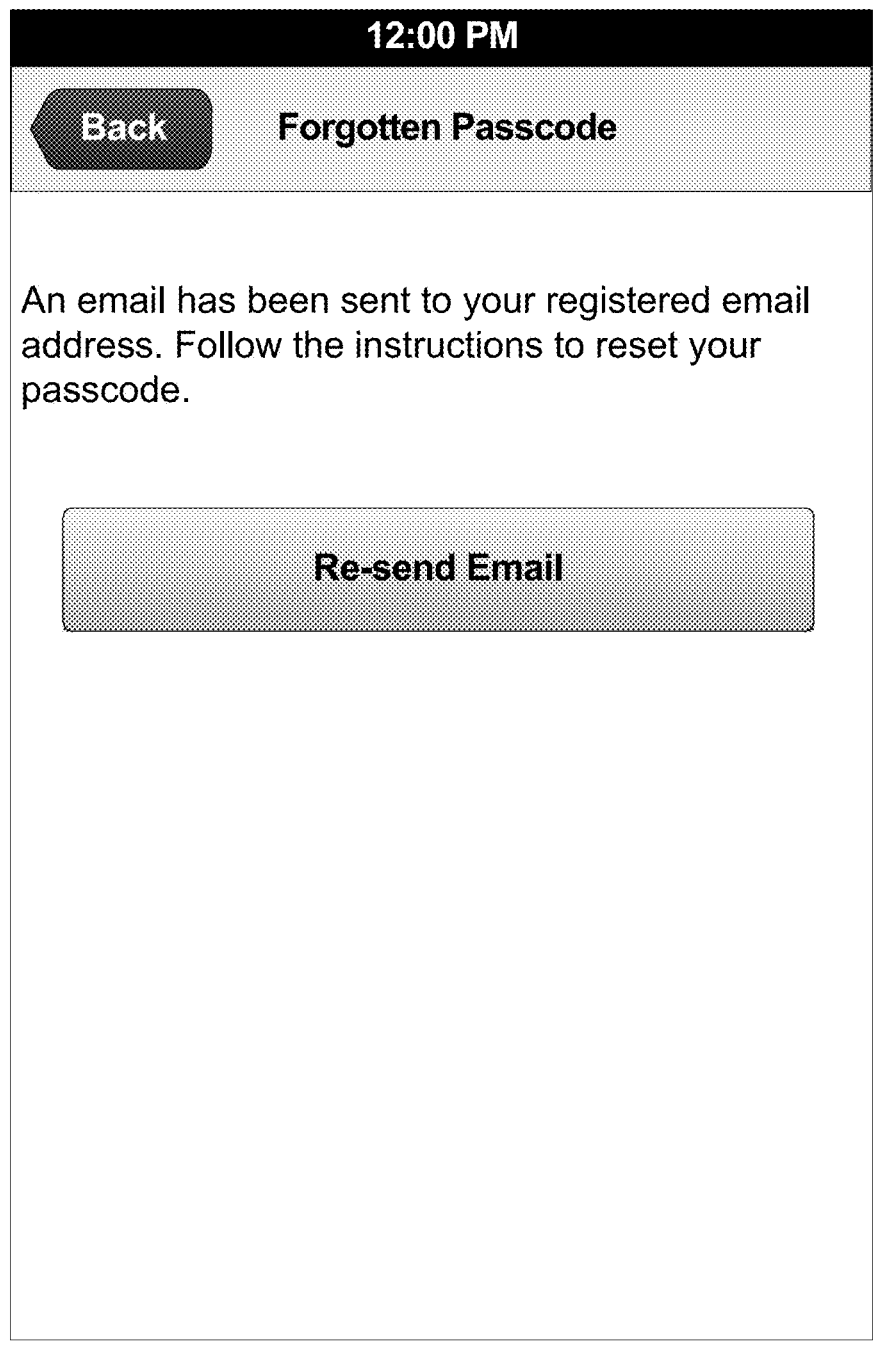
FIG. 46 illustrates sending an email to a registered address with a reset passcode routine.
Figure 47:
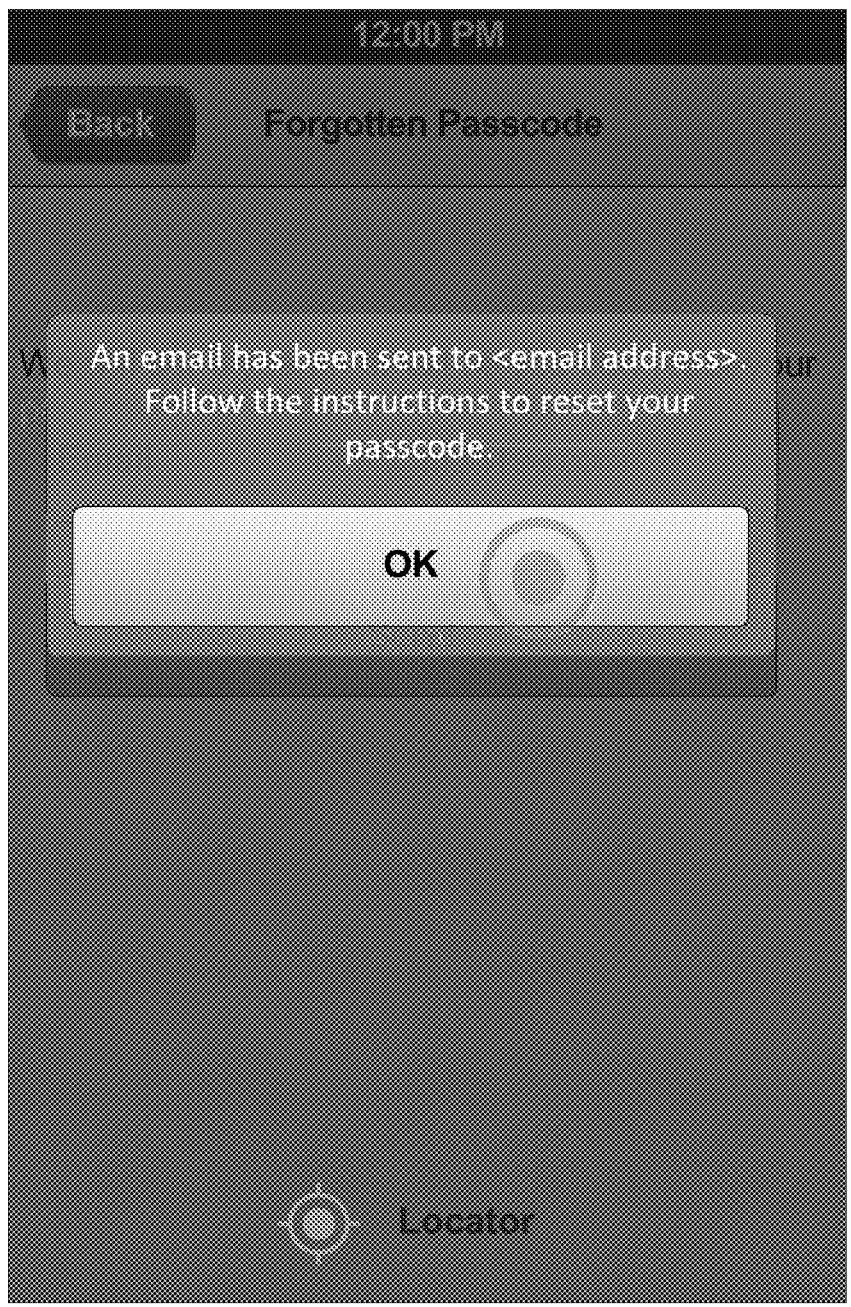
FIG. 47 illustrates confirming an email to a registered address with a reset passcode routine.
Figure 48:
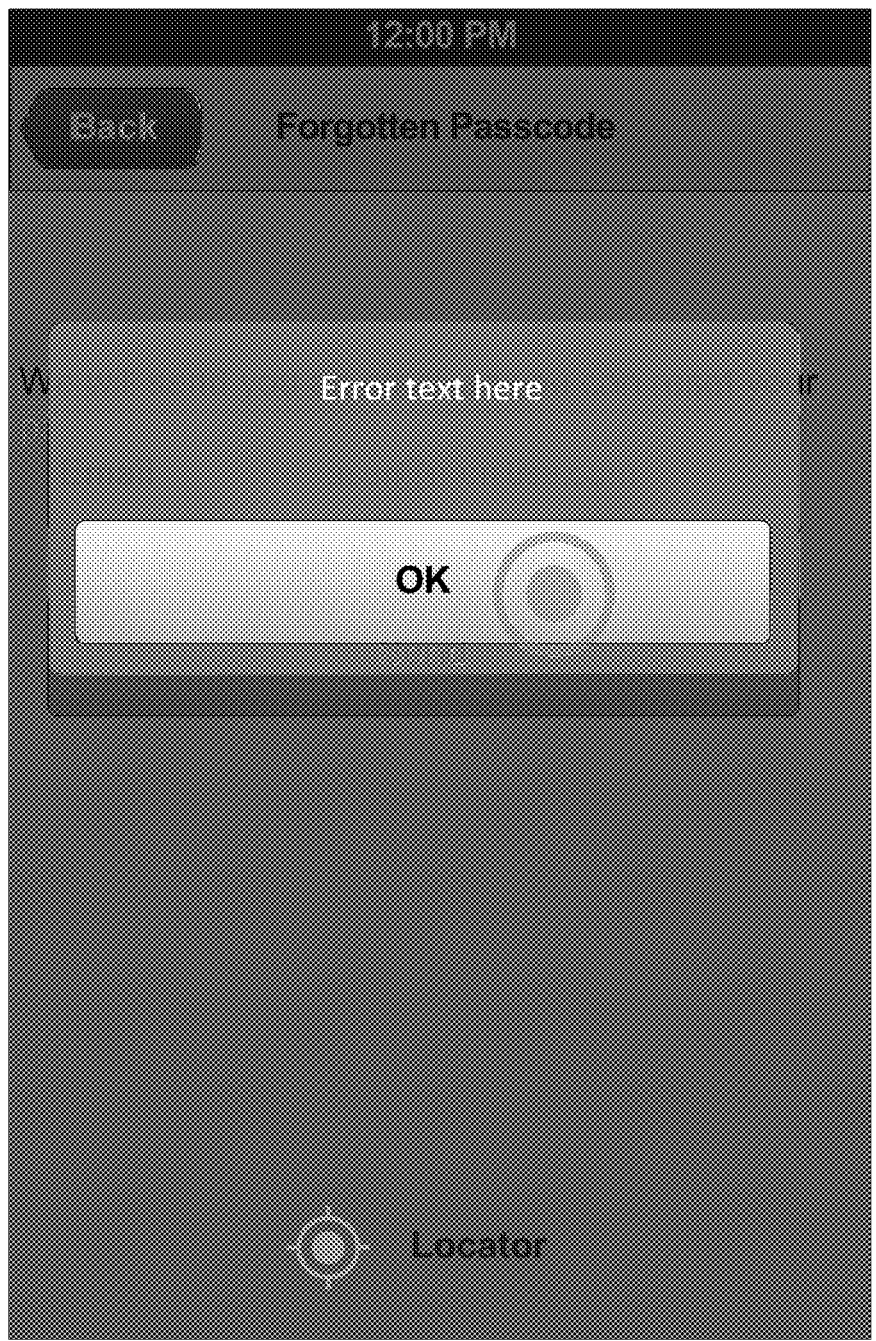
FIG. 48 illustrates if there was an error sending the password reset routine.
Figure 49:
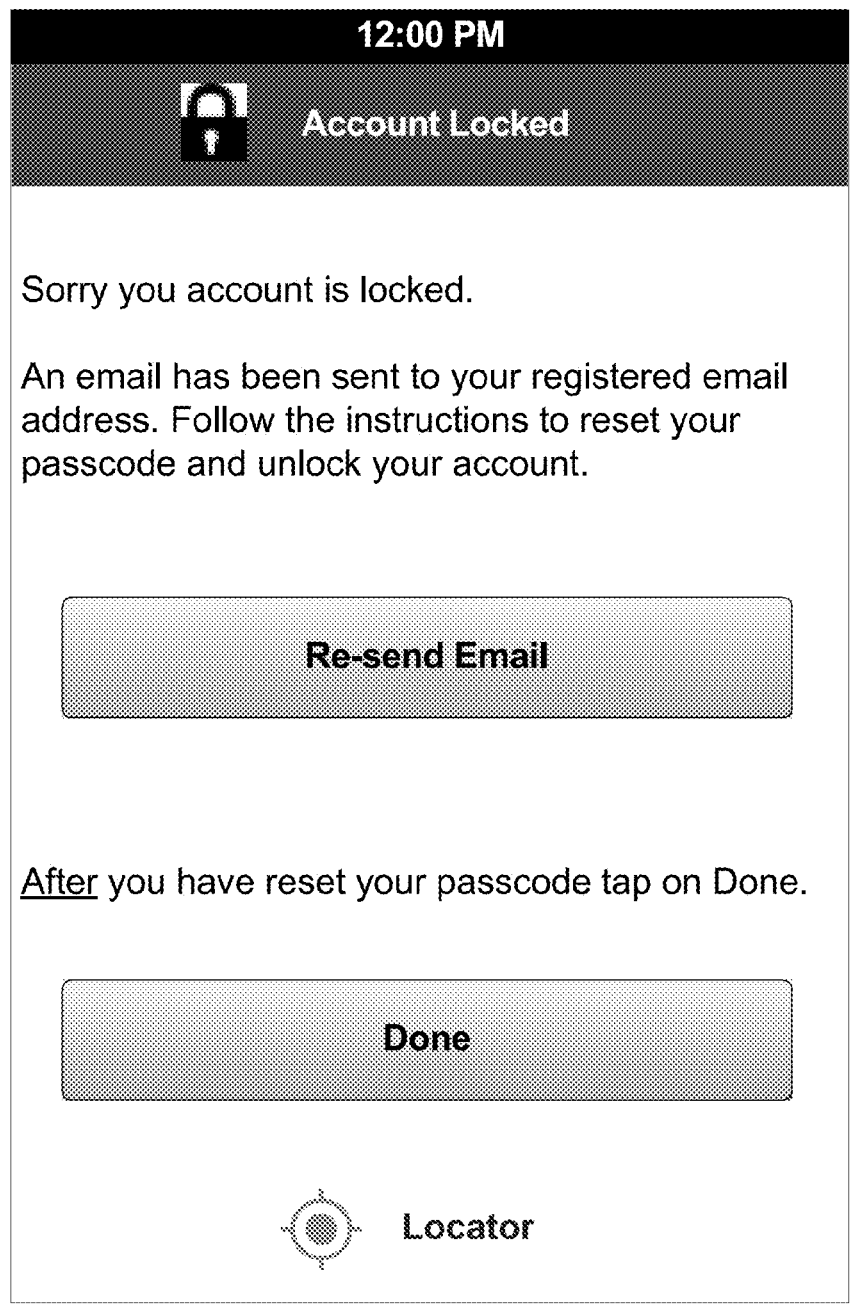
FIG. 49 illustrates the account being locked and an option to send a reset code.
Figure 50:
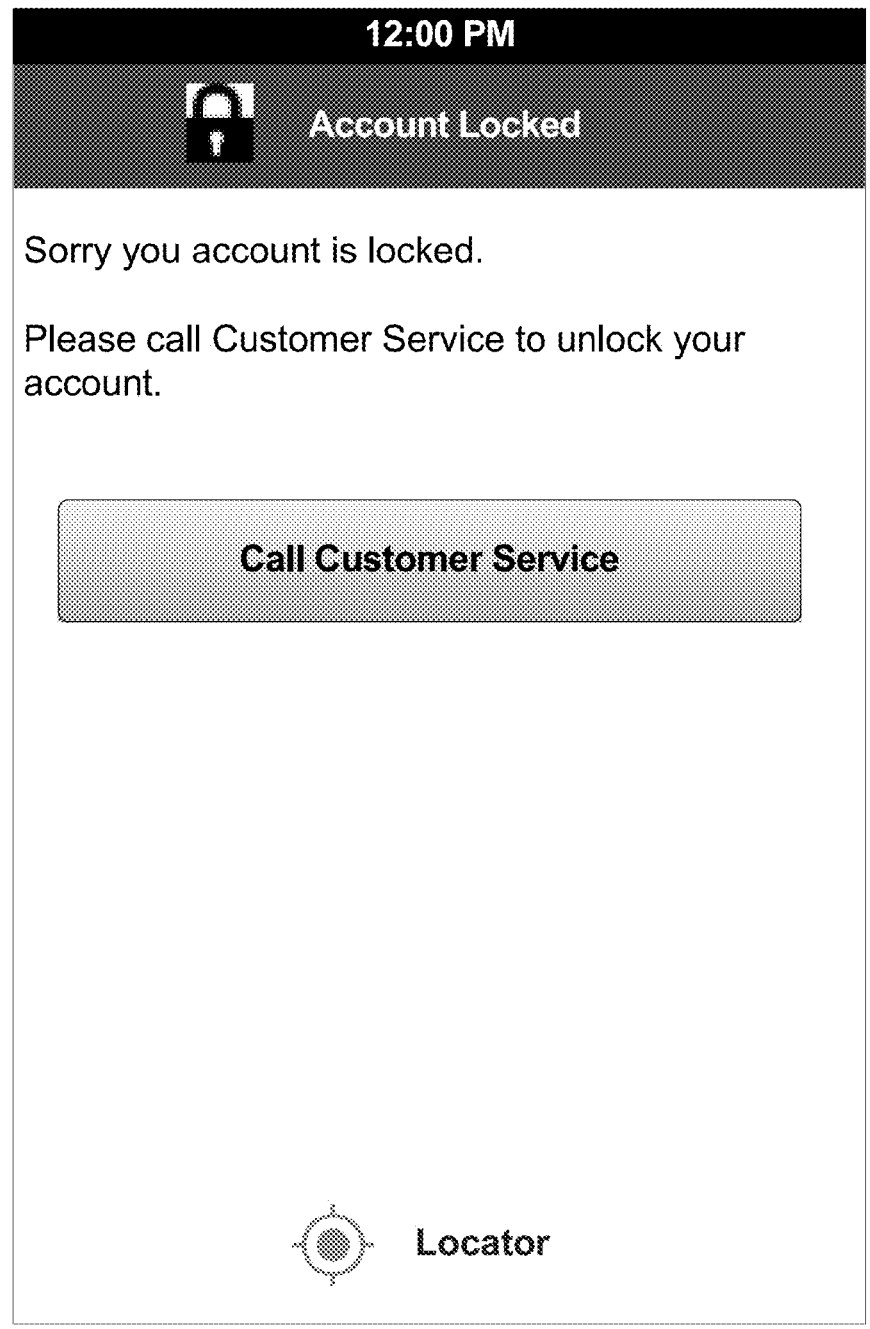
FIG. 50 illustrates the account being locked if the reset code has been sent.

FIG. 44 may illustrate a flowchart 44 of a method that may be executed when a forgot passcode is selected. At block 4405, a user may tap on the "I forgot my passcode link" as illustrated in FIG. 45. At block 4410, the system indicate that the code may be communicated to the address as indicated by the user as illustrated in FIG. 46. The code may be a text or SMS message to a portable computing device or may be an email. At block 4415, the code may be communicated as illustrated in FIG. 47. If the code was inputted incorrectly, at block 4420, an error may be displayed such as in FIG. 48. If there are repeated failed attempts to login or the code is not received, at block 4425 the user may select to have the code resent as illustrated in FIG. 49. If the user fails to enter an acceptable code after a number of tries, at block 4430, the user may be informed of the need to call customer service as the account may be locked as illustrated in FIG. 50. On some portable computing devices 9301, the customer service phone number may link to a telephone function and merely selecting the number may cause the customer service number to be called.

Figure 51:
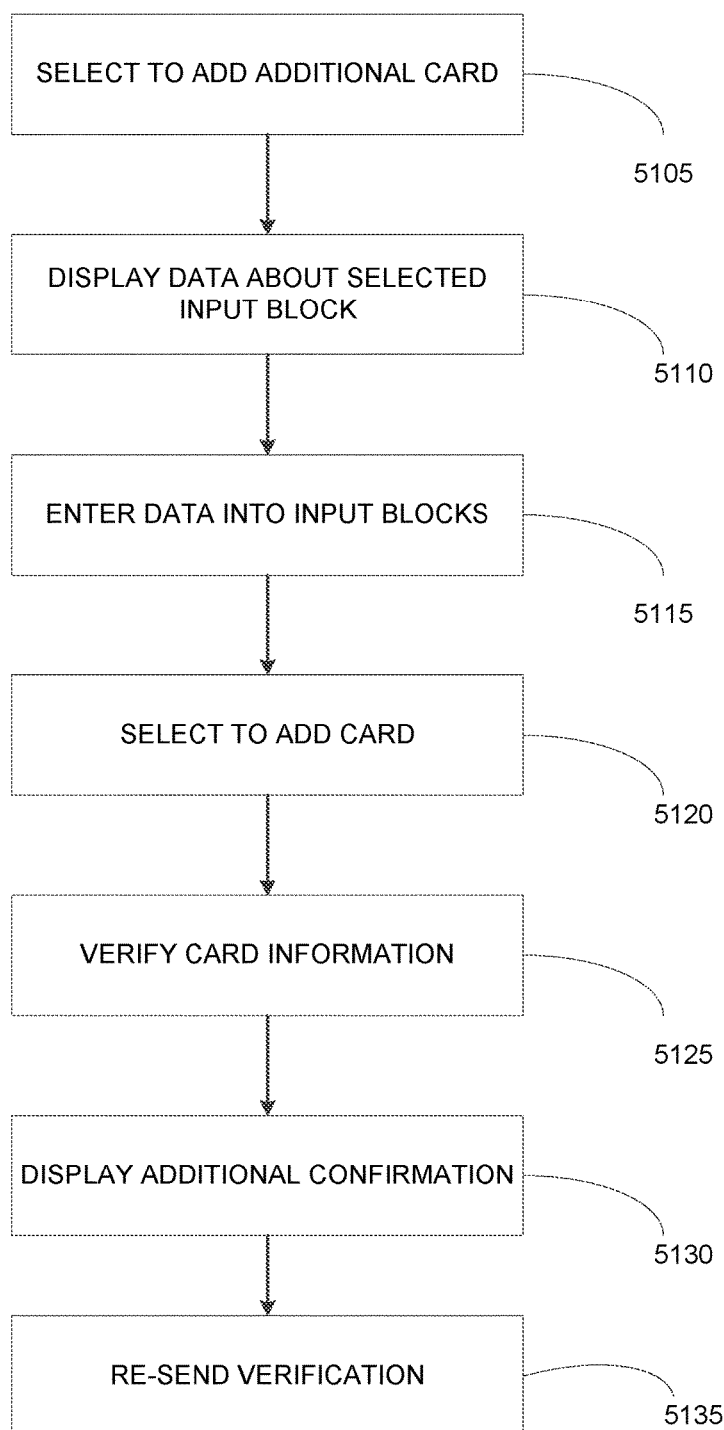
FIG. 51 illustrates a flowchart of adding cards to an account.

Similarly, a user may want to add a card to the system such as to the first group of accounts or second group of accounts. FIG. 51 may illustrate one possible method of adding a card or account to the system. At block 5105, a selection may be made to add a card or account as illustrated in FIG. 51. Several blocks may be displayed of information that may be required to be filled in by the user as illustrated in FIG. 52. As mentioned previously, the data requested may depend on the card or account type. There may be a plurality of input blocks as described below:

Nickname: May be alphanumeric, spaces, Spanish characters; may be unique; 1-15 characters; no special characters.

Card Number: May be numeric, 12-19 digits.

Exp Date: May be numeric, MM/YY . . . "/" may be added automatically.

3-digit Security Code: May be numeric, 3 digits.

Address: May be alphanumeric, spaces, Spanish characters, 1-75 characters.

City: May be alphanumeric, spaces, Spanish characters, 1-50 characters.

State: May be a (Spinner—State picker, ex. "HI—Hawaii")

Zip Code: May be numeric, may be only 5 digits.

Figure 53:
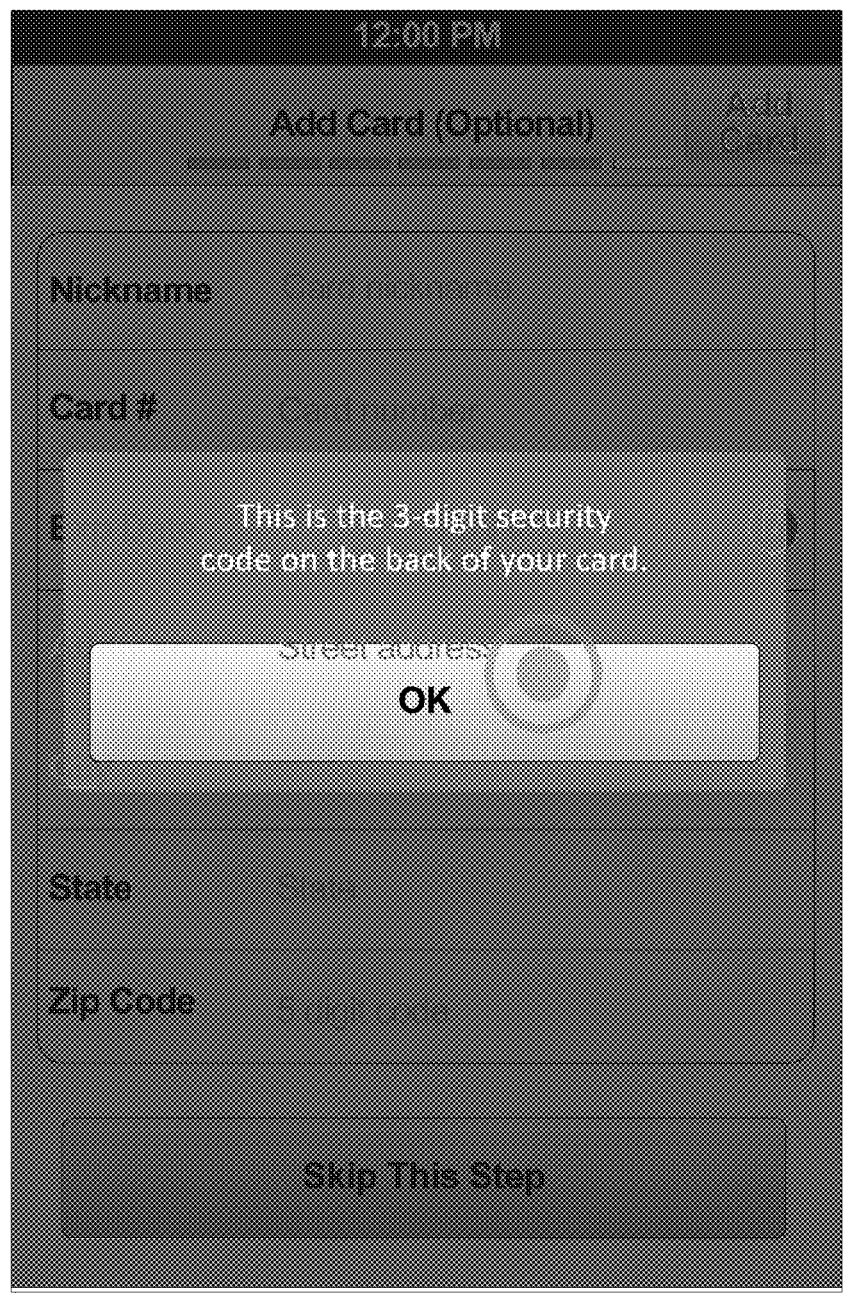
FIG. 53 illustrates a display to select to enter a cvv2 code.
Figure 54:
FIG. 54 illustrates an entry display for a cvv2 code.
Figure 55:
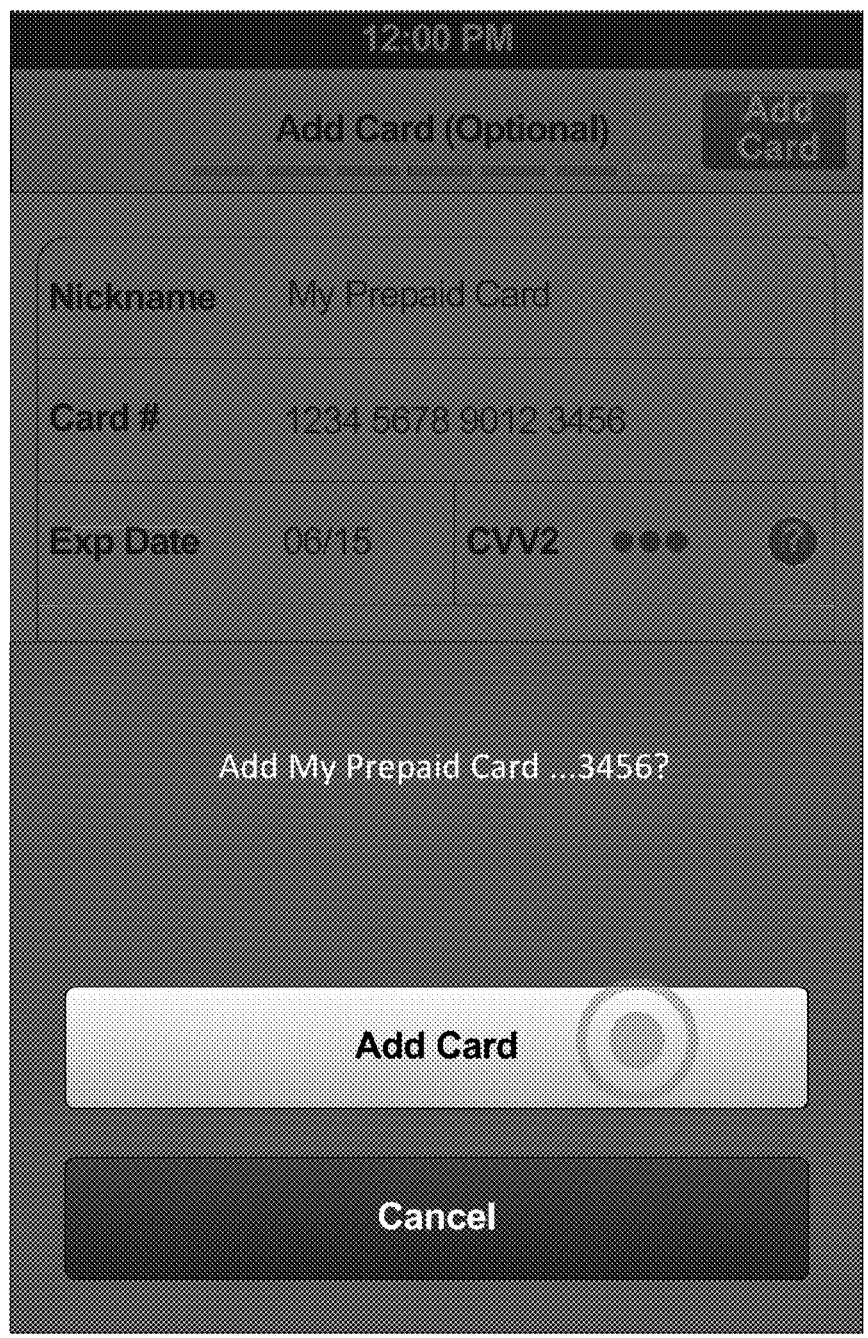
FIG. 55 illustrates an entry display for adding a card.
Figure 56:
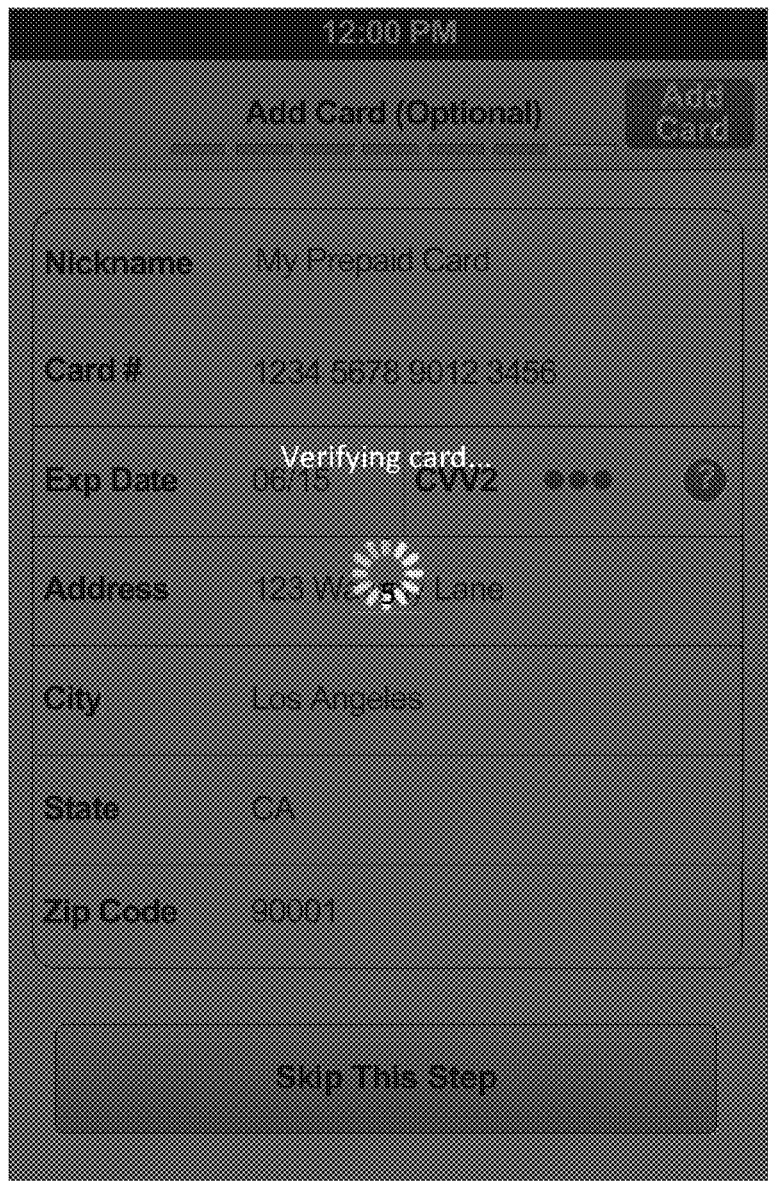
FIG. 56 illustrates an entry display for verifying a card.
Figure 57:
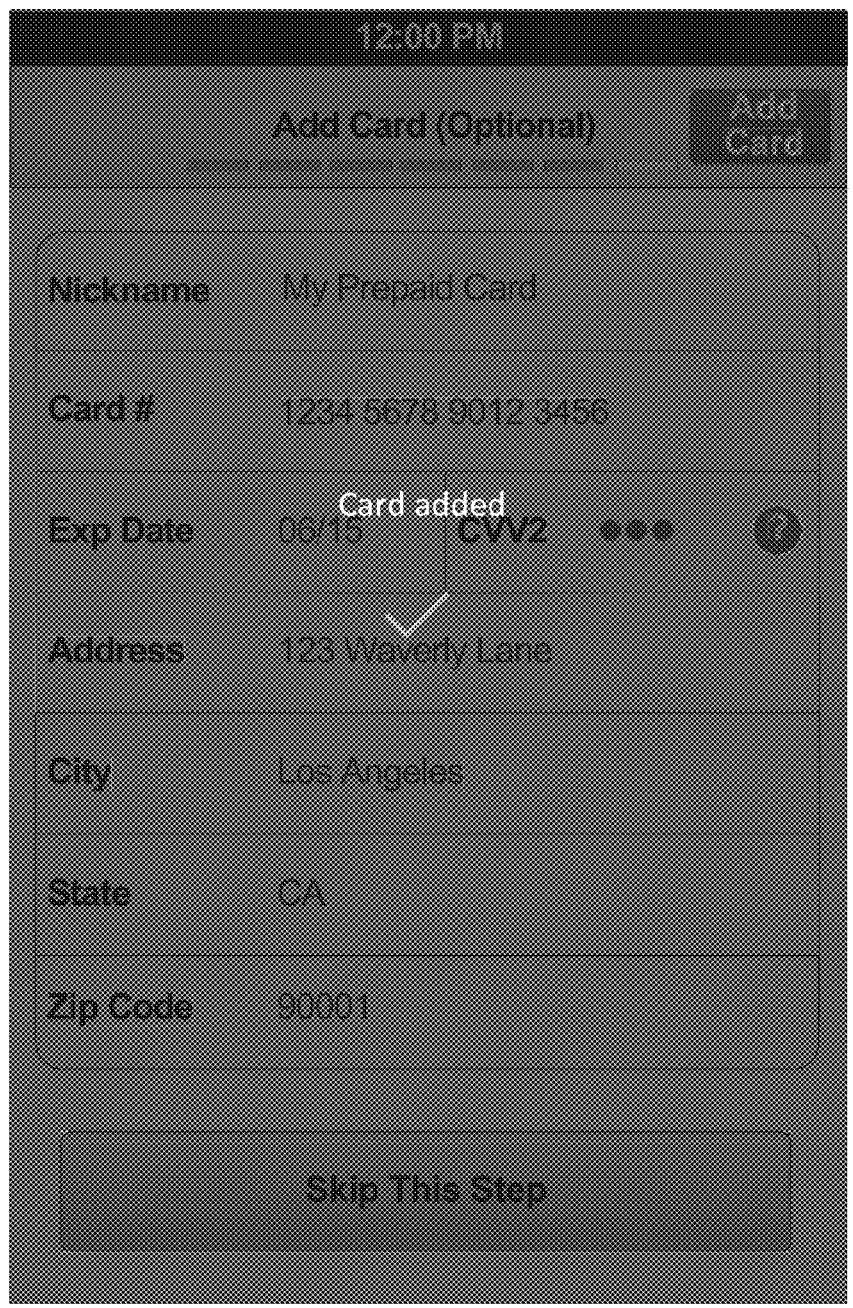
FIG. 57 illustrates an entry display for accepting a card.
Figure 58:
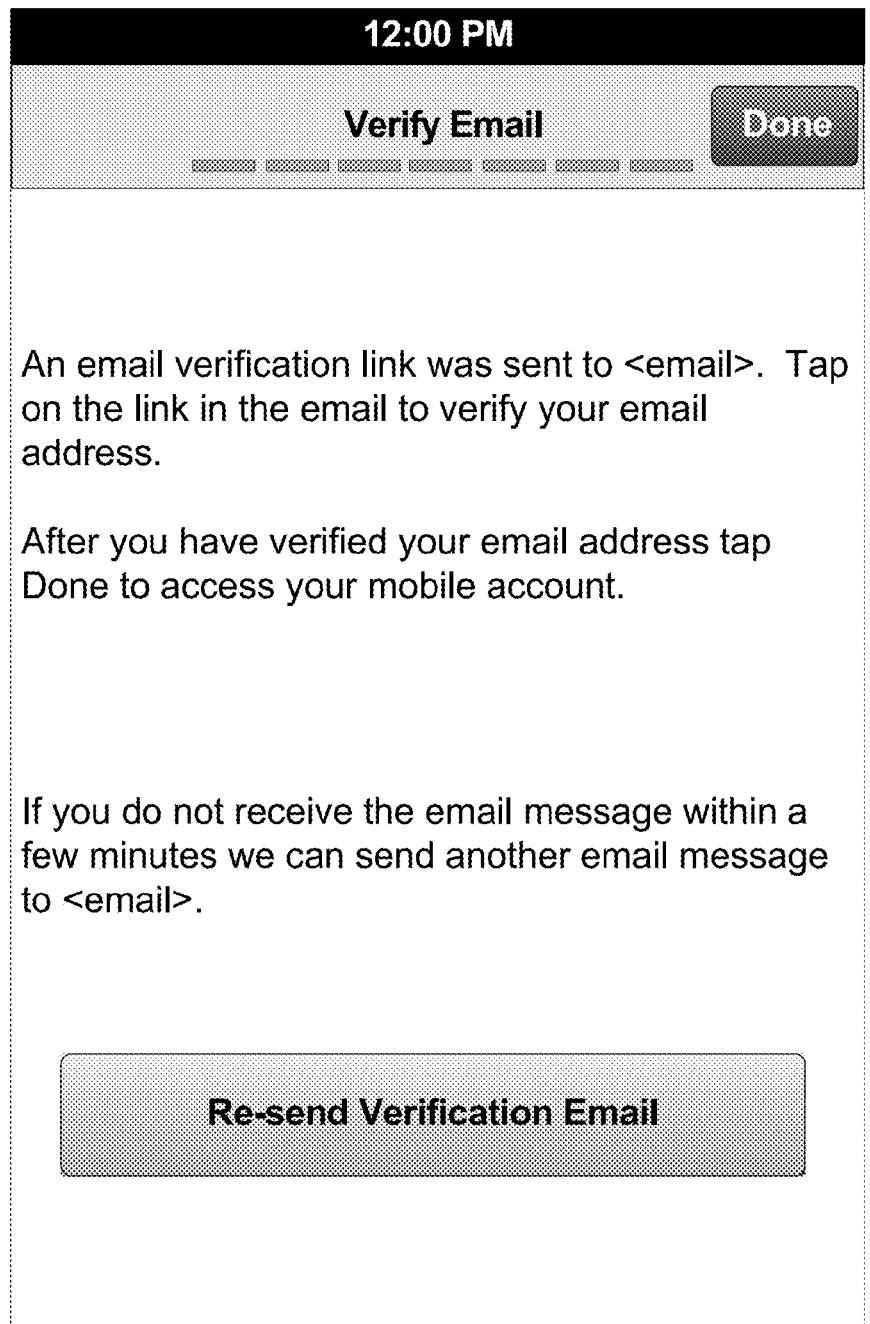
FIG. 58 illustrates an entry display for verifying an email address.

By hovering on a block or selecting a "?" or "i" near the block, at block 5110, information about the block may be obtained as illustrated in FIG. 53. At block 5115, the blocks may be filled with relevant data as illustrated in FIG. 54. If sufficient data is added to the input blocks, at block 5120, a user may be able to select to add a card to the system as illustrated in FIG. 55. Logically, the system may verify the data at block 5125 (FIG. 56) and if the data is verified, the card may be added at block 5130. At block 5135, a verification email may be re-sent to the email added in the input blocks if the initial verification email was not received.

Figure 59:
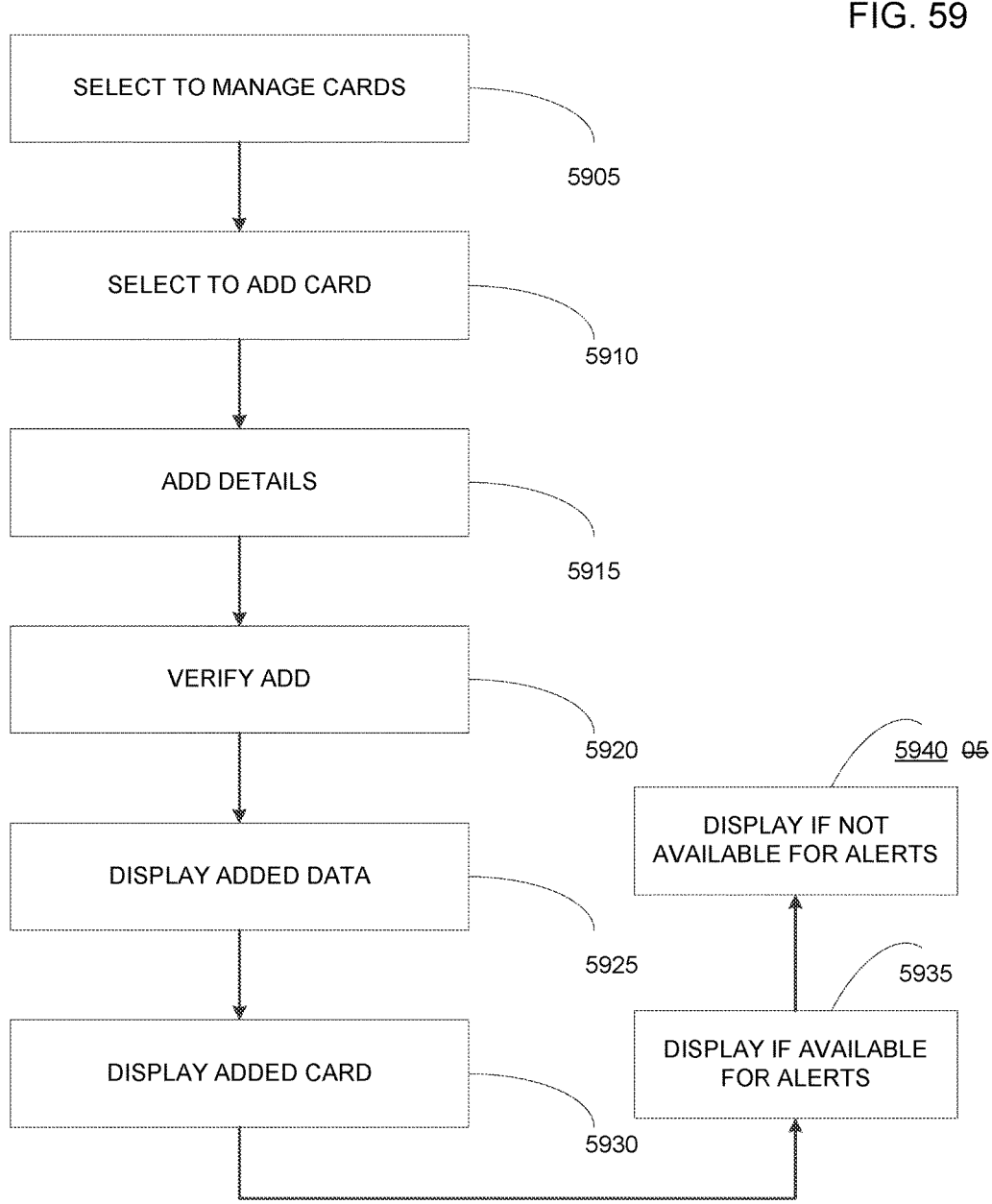
FIG. 59 illustrates a flowchart of resending codes for an account.
Figure 60:
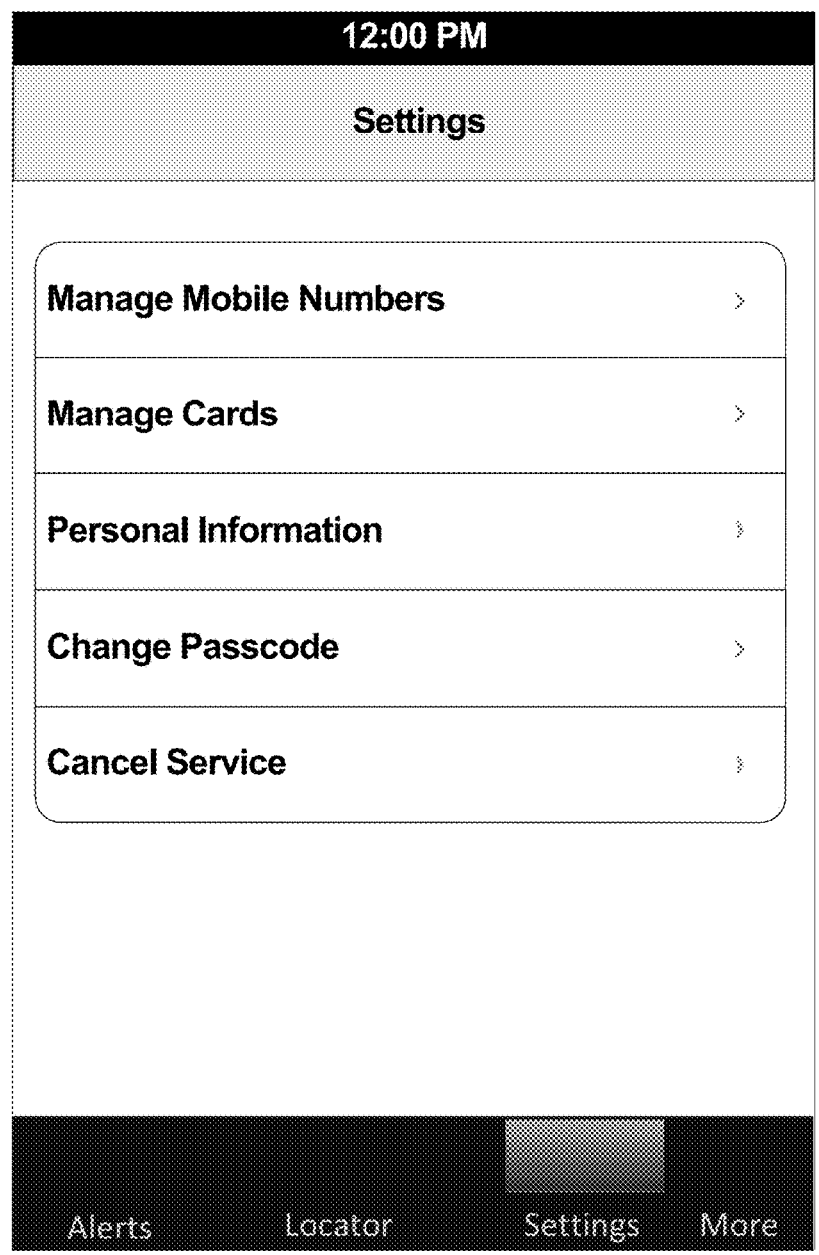
FIG. 60 illustrates another manner of adding a card to an account using a settings display.
Figure 61:
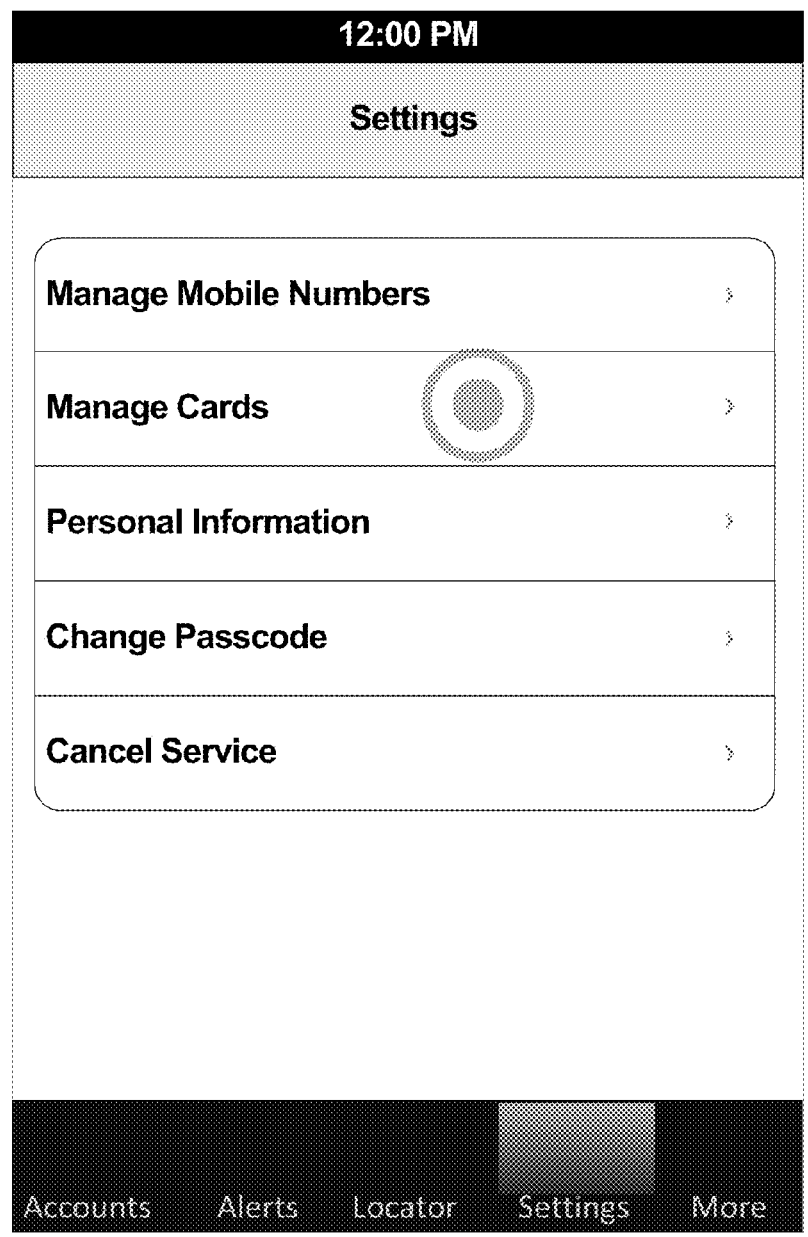
FIG. 61 illustrates selecting to manage cards from a settings display.
Figure 62:
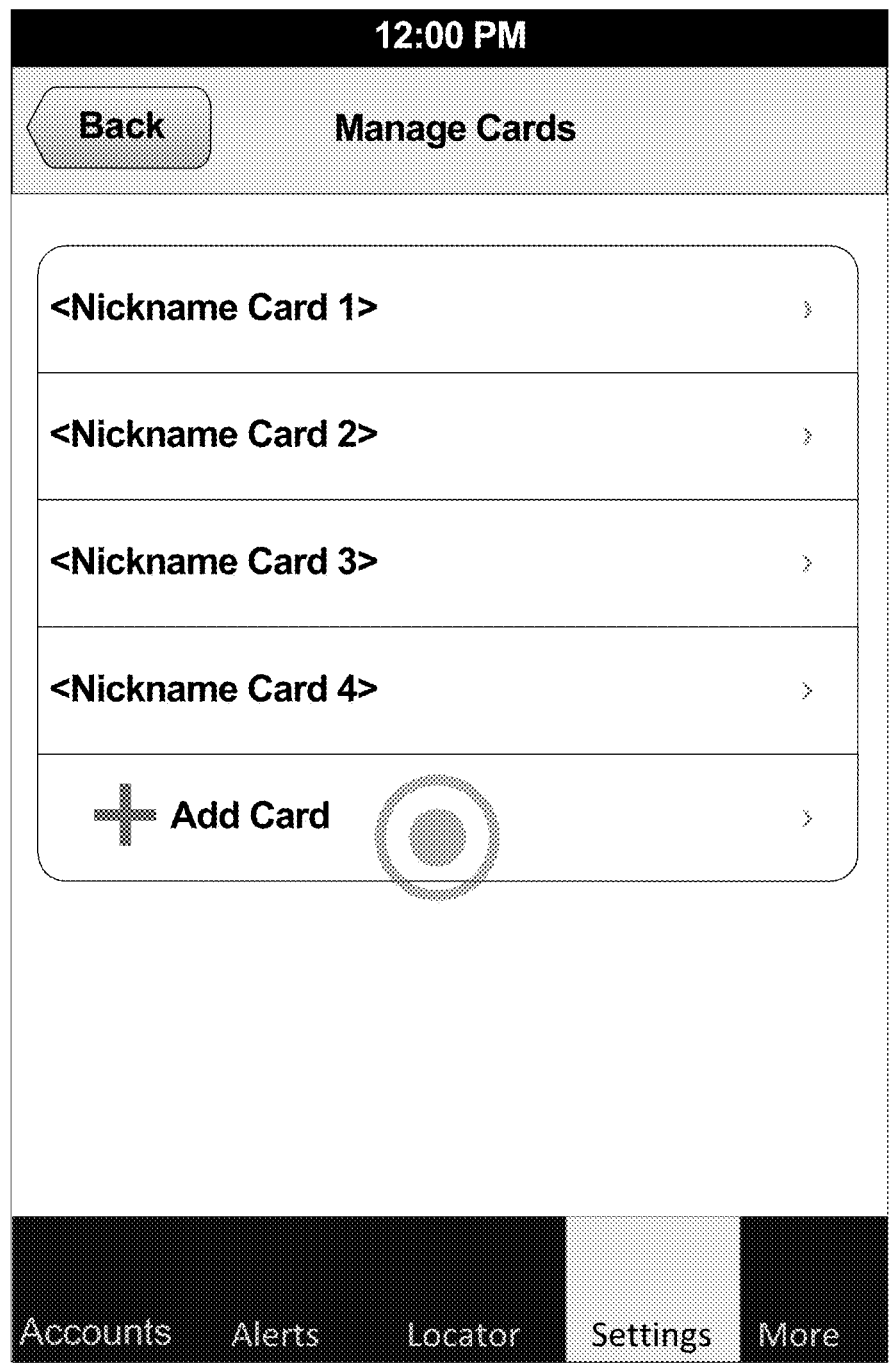
FIG. 62 illustrates selecting to manage cards from a manage card display.

FIG. 59 may illustrate an additional method to add a card (or additional account) to an account. At block 5905, a selection may be made in a settings menu (FIG. 60) to manage cards. FIG. 61 may illustrate the various options available to manage cards and FIG. 62 may illustrate the "add card" option being selected as called for in block 5910. There may be a number of limits on how many cards a user may add, such as a ten cards. In addition, each card may have a plurality of accounts linked to it. For example, a debit card may have a checking and a saving account linked to it.

Figure 63:
FIG. 63 illustrates selecting adding data for a card from a manage card display.
Figure 65:
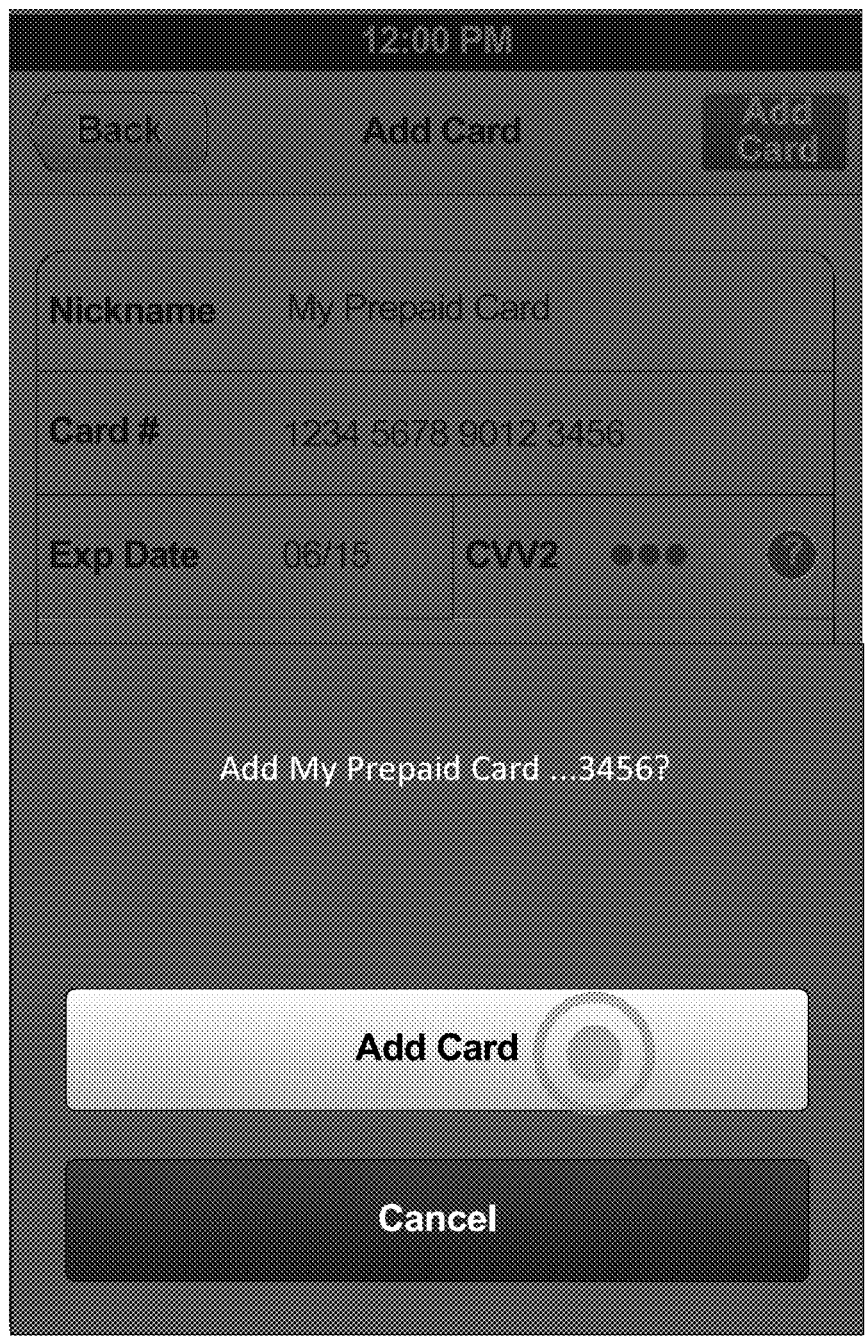
FIG. 65 illustrates adding a card confirmation display.
Figure 66:
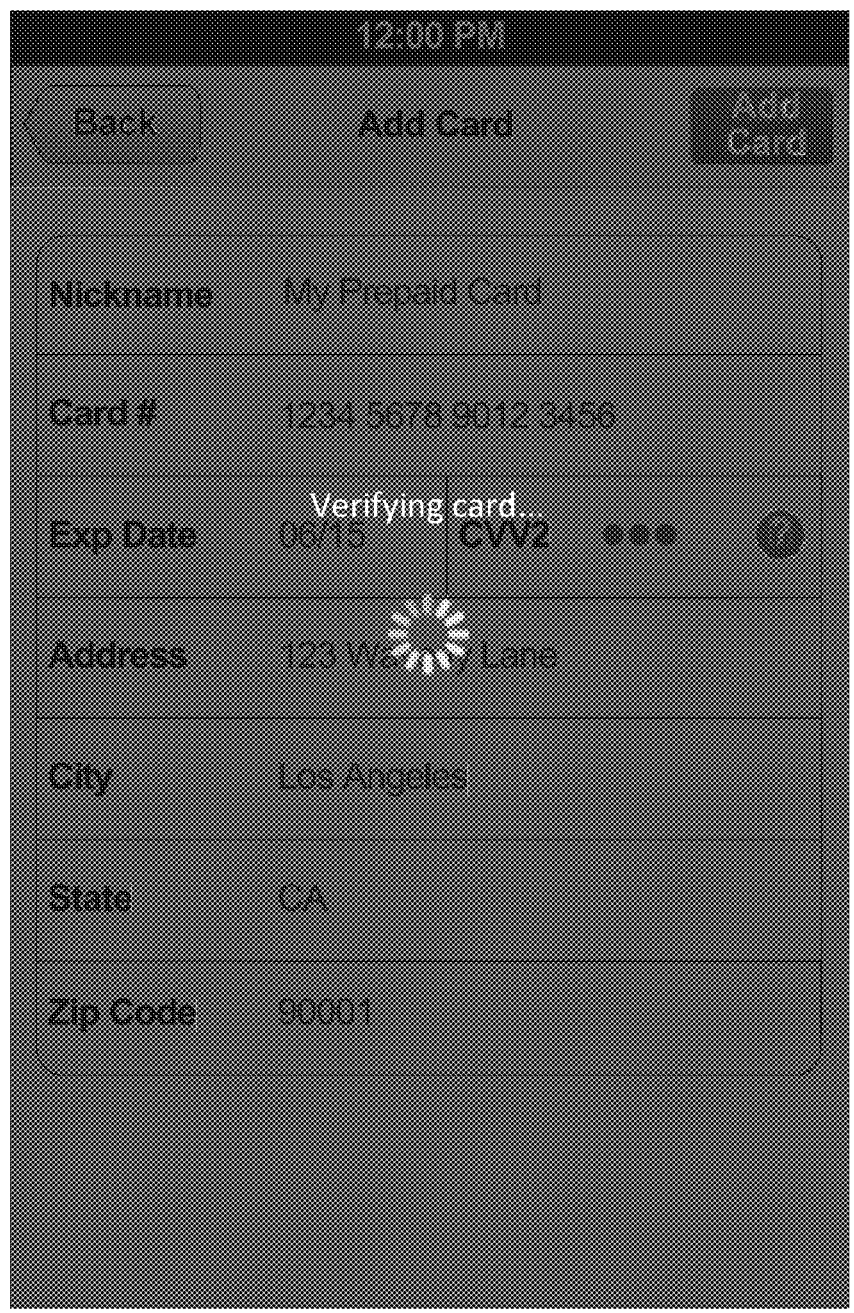
FIG. 66 illustrates verifying an added card.
Figure 67:
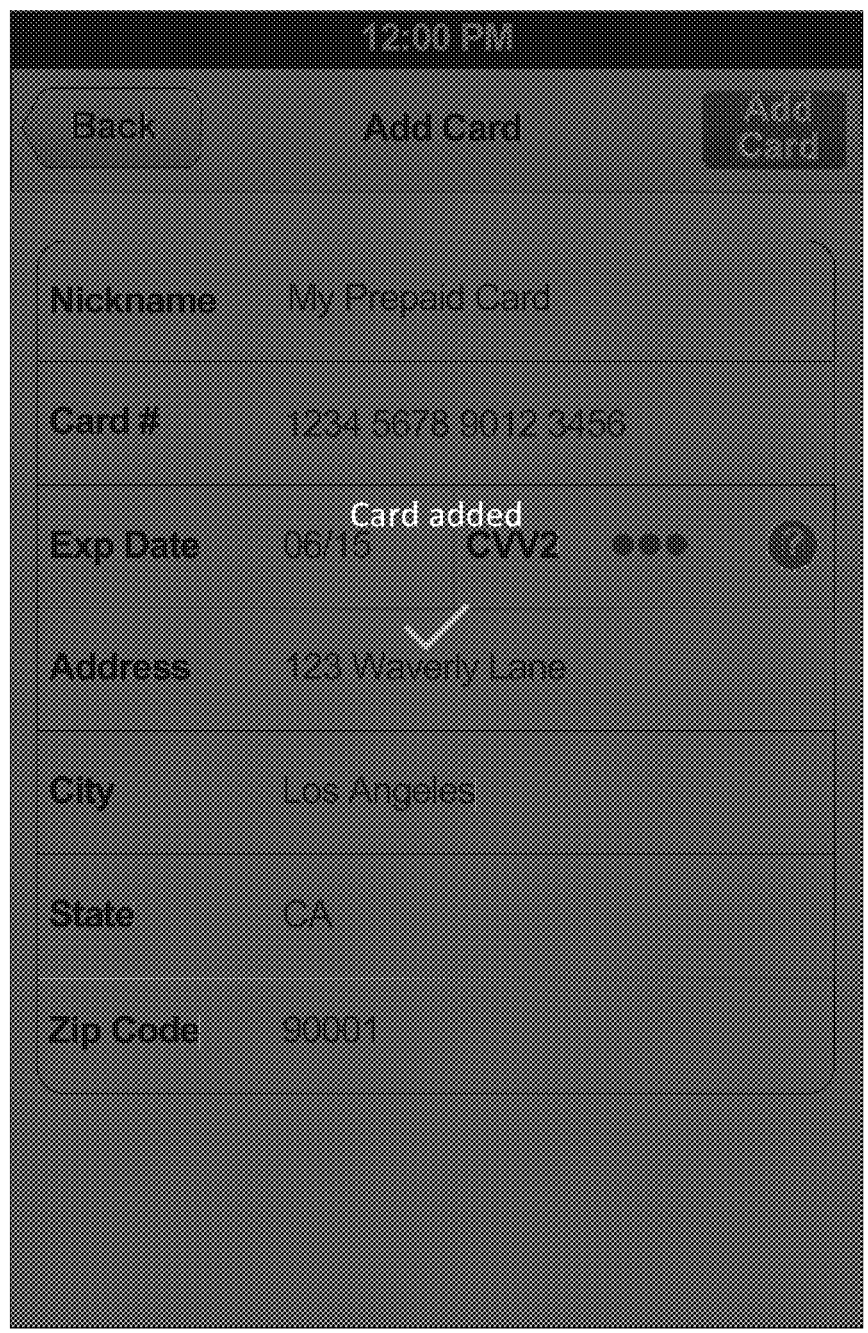
FIG. 67 illustrates a confirmation that a card has been added.
Figure 68:
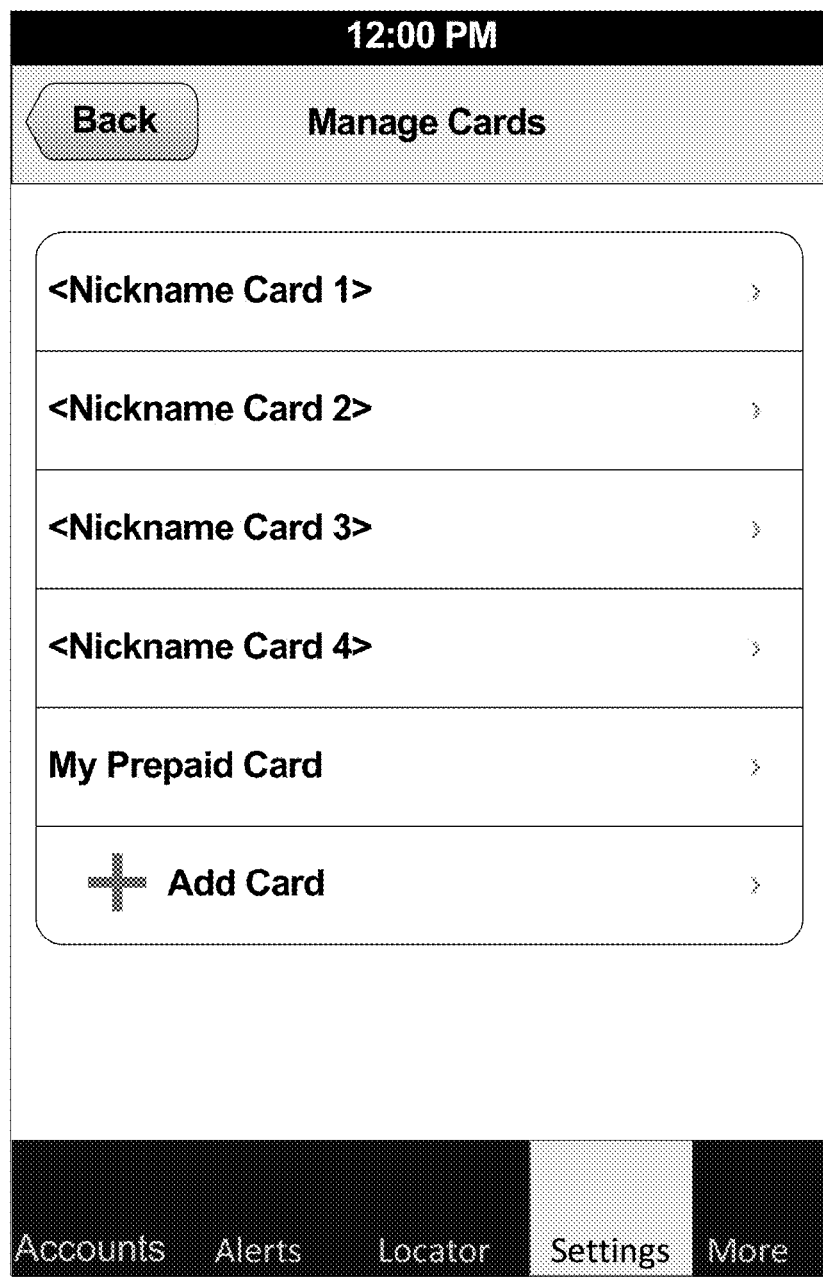
FIG. 68 illustrates that the card has been added.
Figure 69:
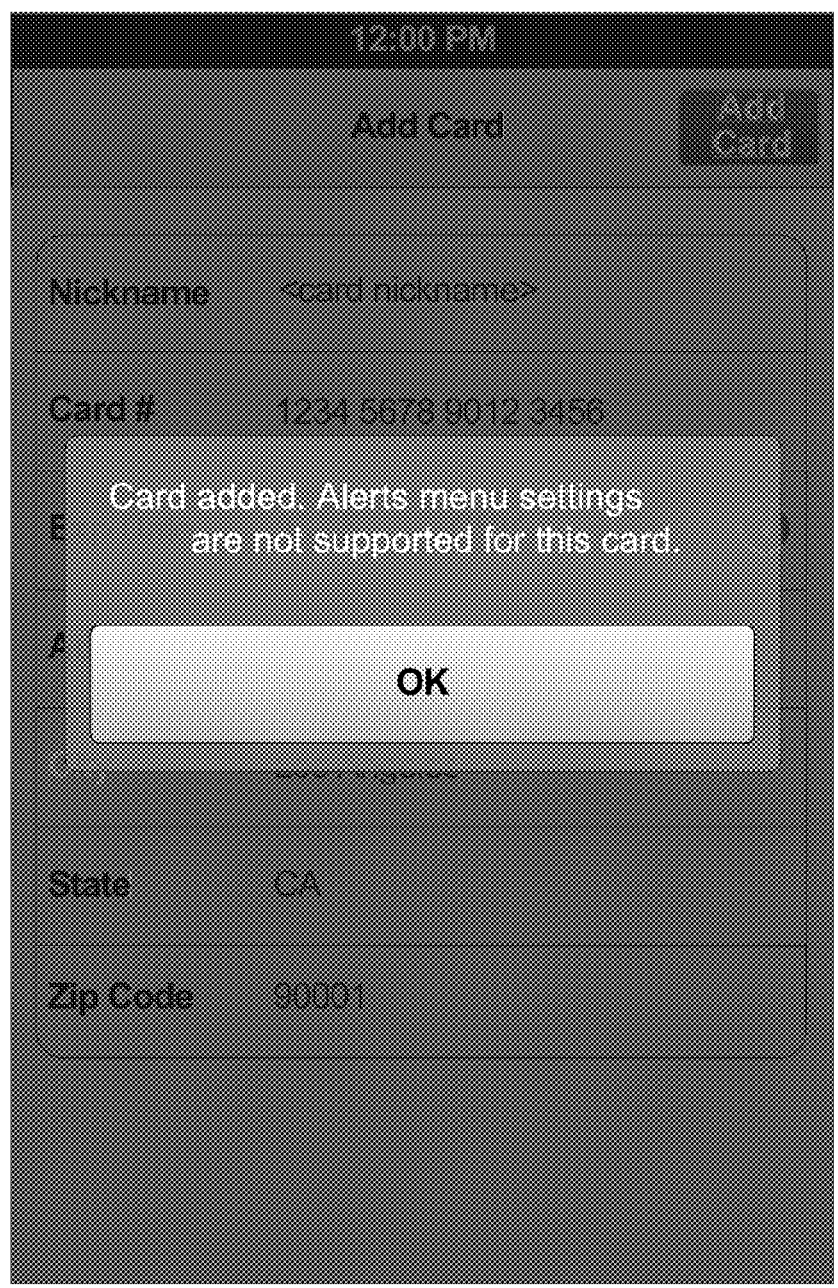
FIG. 69 illustrates that a card has been added without alerts.
Figure 70:
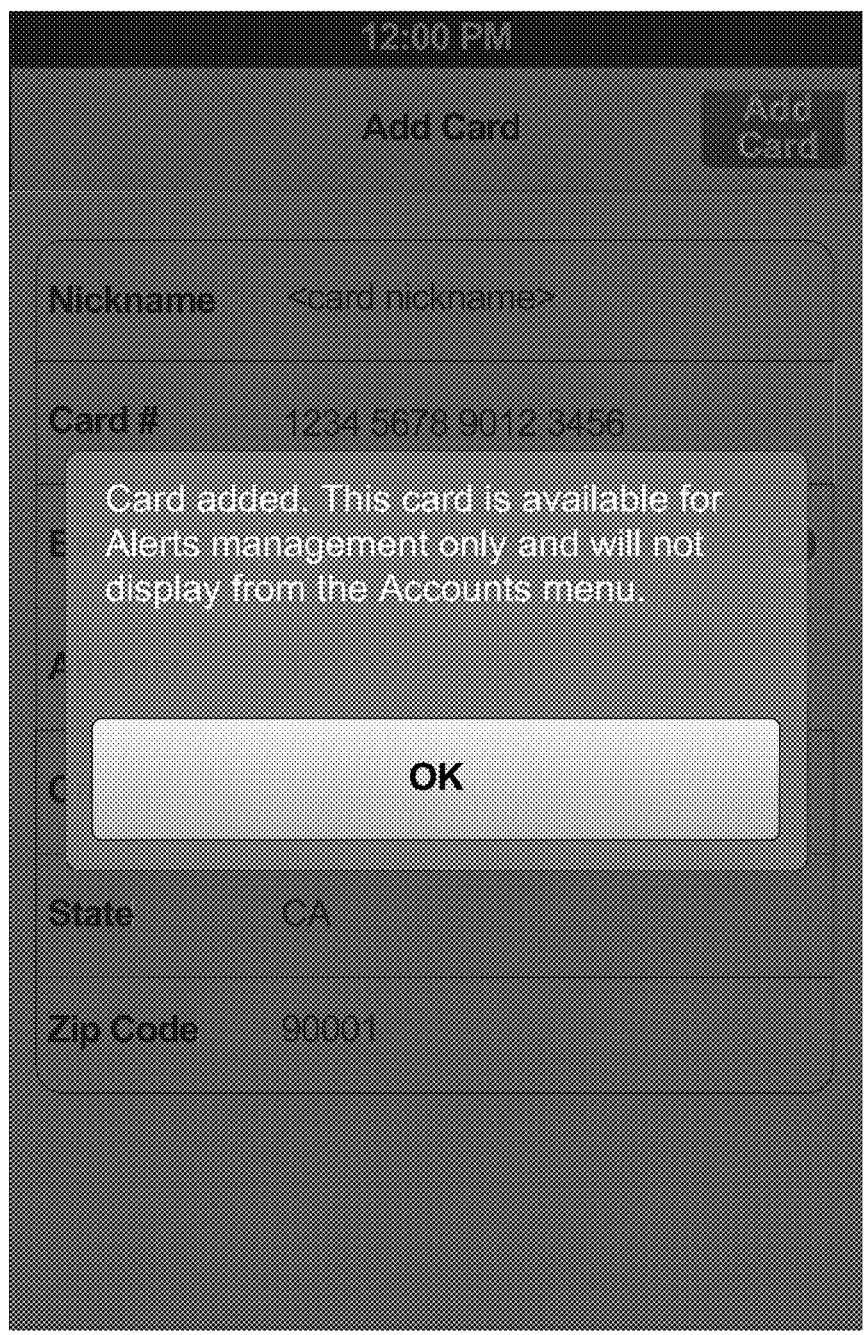
FIG. 70 illustrates that a card has been added with alerts.

At block 5915, data may be added for the new card in the data blocks as illustrated in FIG. 63. There may be a number of data blocks and there may be restrictions on the data blocks as described above. Once sufficient data has been entered, the "add card" button may be enabled as illustrated in FIG. 64. The user may have the option to confirm the data and the card addition as illustrated in FIG. 65. At block 5920, the data entered into the data entry blocks may be verified as illustrated in FIG. 66. At block 5925, if the data is verified, it may be added to the list of cards as illustrated in FIG. 67. If alerts for the card have been set up, at block 5935 the card may be added as illustrated in FIG. 69. If alerts for the card have not been set up, at block 5940, the card may be added to list of cards but not to a display carousel as indicated in FIG. 70.

Figure 71:
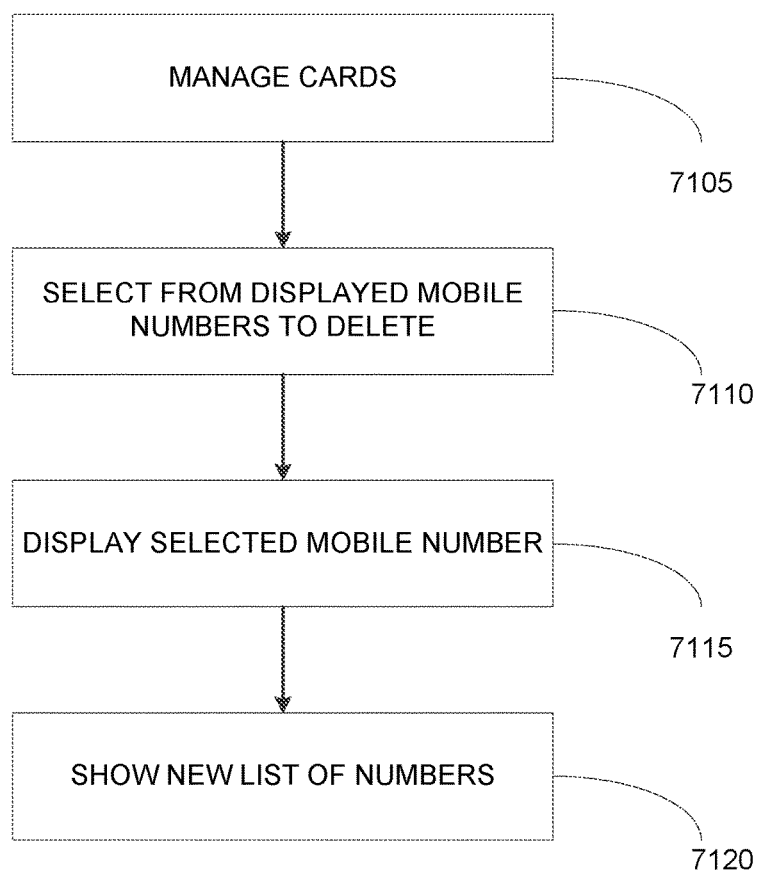
FIG. 71 illustrates a flowchart of deleting a mobile number for an account.
Figure 72:
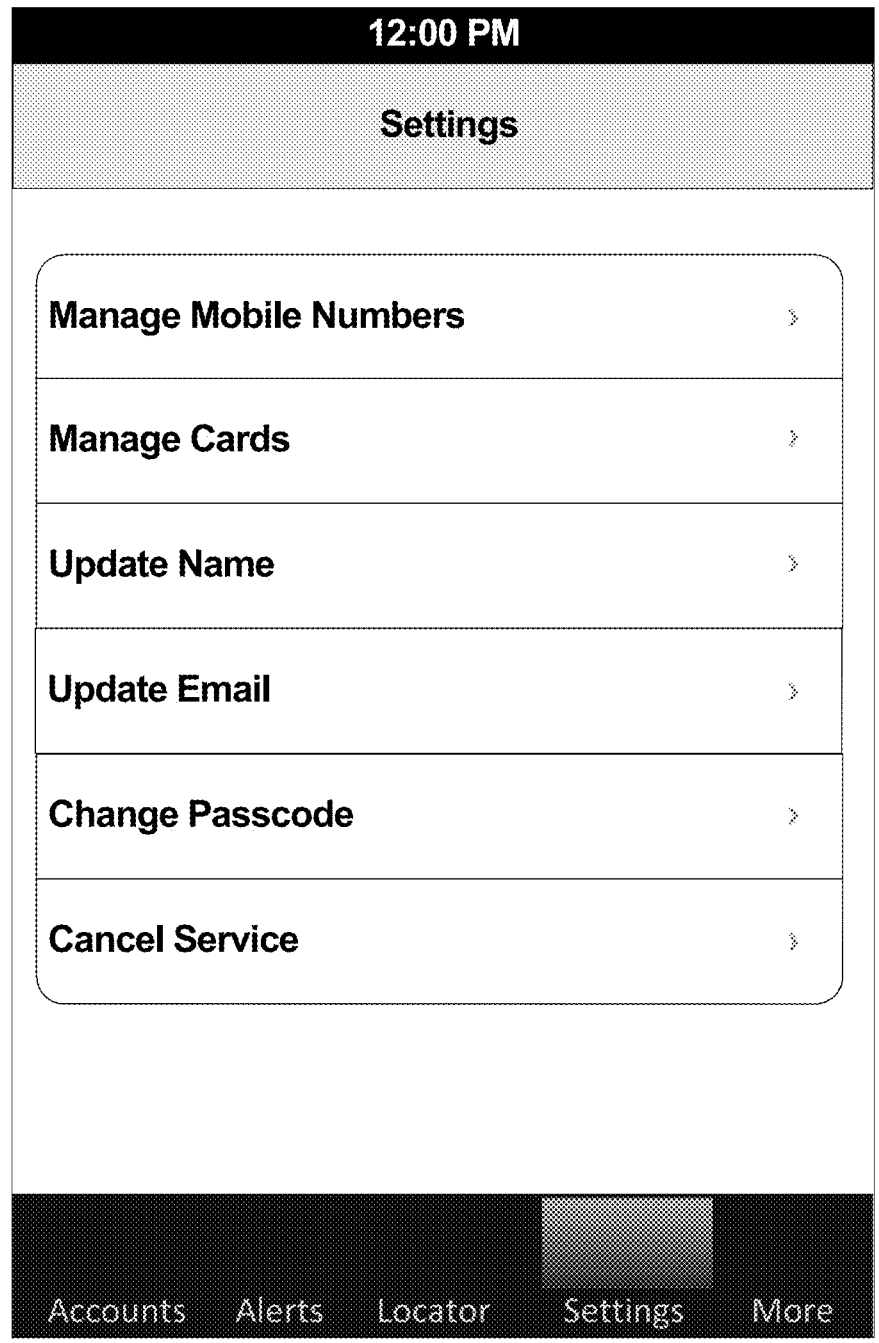
FIG. 72 illustrates selecting to manage cards from a manage card display.
Figure 73:
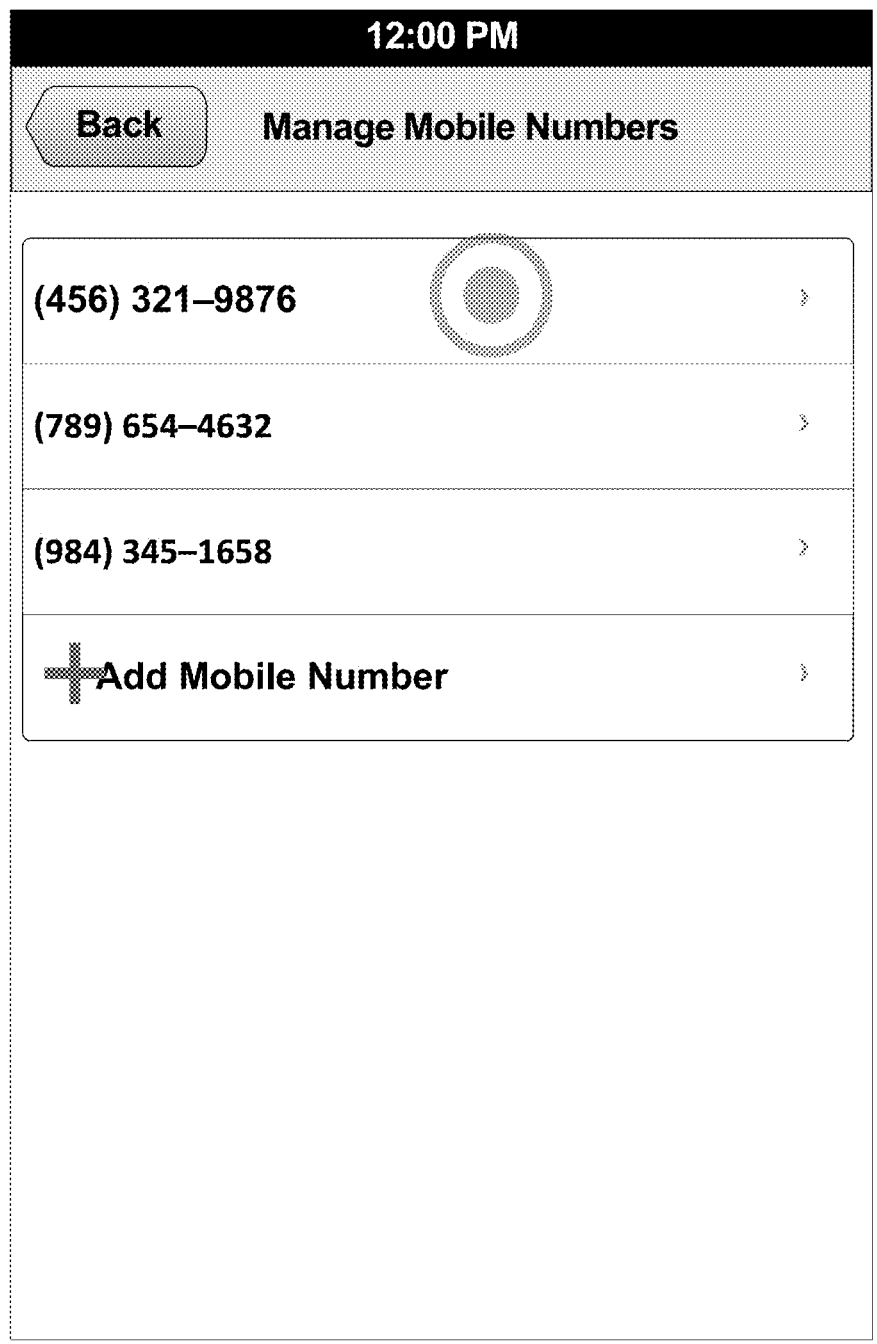
FIG. 73 illustrates selecting a number to be managed from a manage card display.
Figure 74:
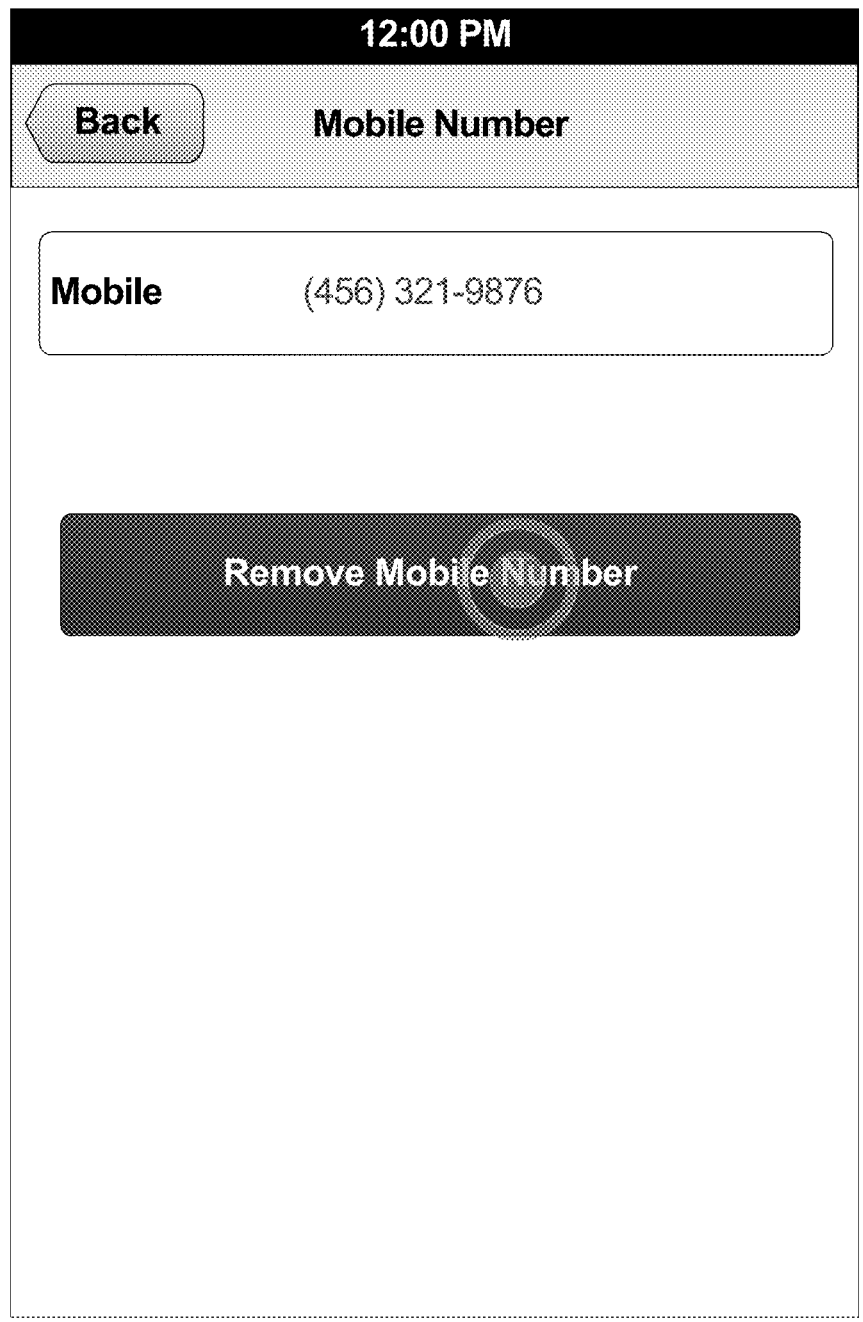
FIG. 74 illustrates selecting a number to be removed from a manage card display.
Figure 75:
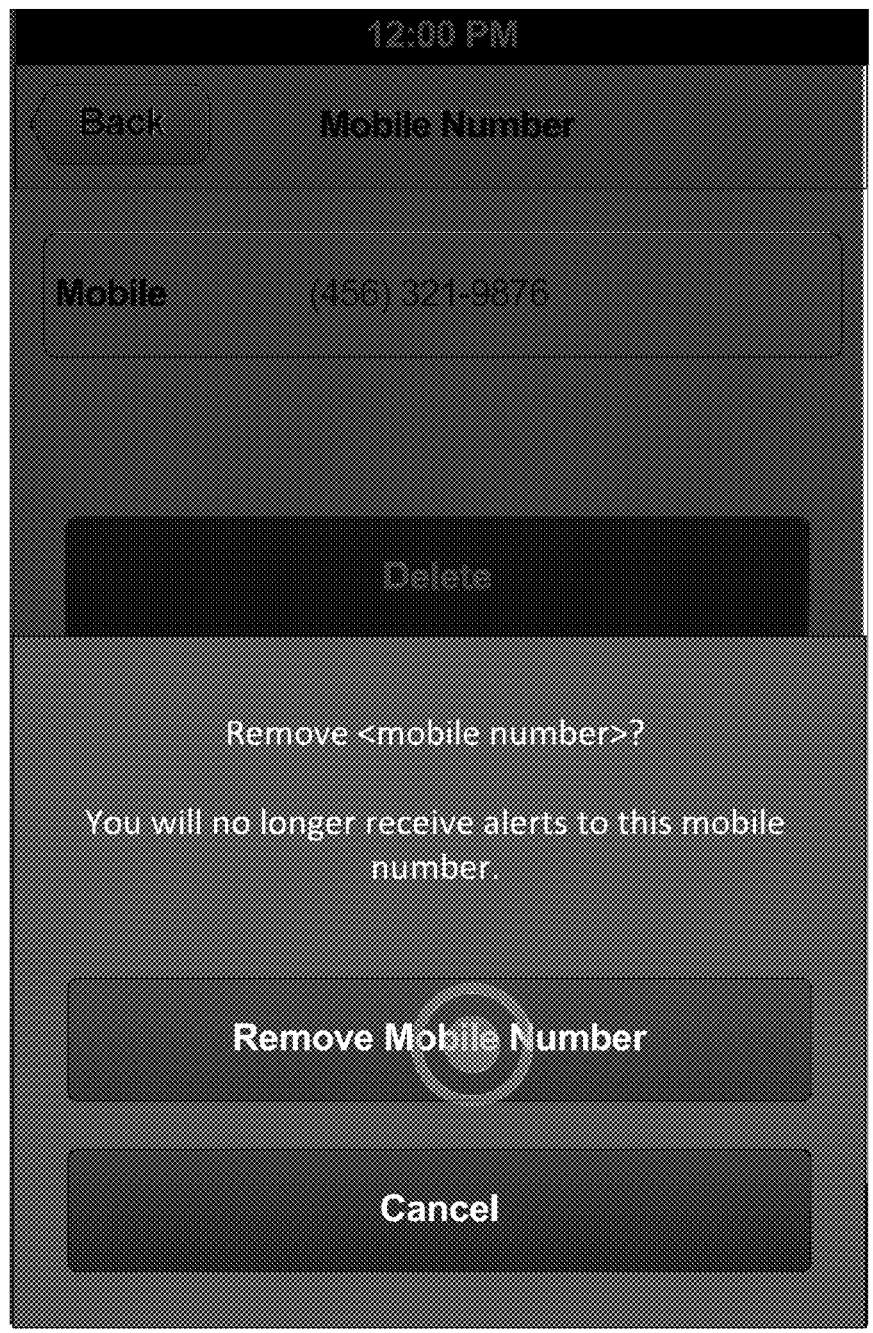
FIG. 75 illustrates confirming a number to be removed from a manage card display.

FIG. 71 may be a flowchart that illustrates removing a number from the system. At block 7015, a manage card options may be displayed as shown in FIG. 72. At block 7110, a user may select a number to remove as illustrated in FIG. 73. A user may have at least one mobile number and may have additional numbers up to a limit. At block 7115, a user may select to remove the selected number. An error may be displayed if the selected number is the user's only number. The user may be asked to confirm the removal as illustrated in FIG. 75. After deleting the number, at block 7120, the user may be returned to a display with at least one other number.

Figure 76:
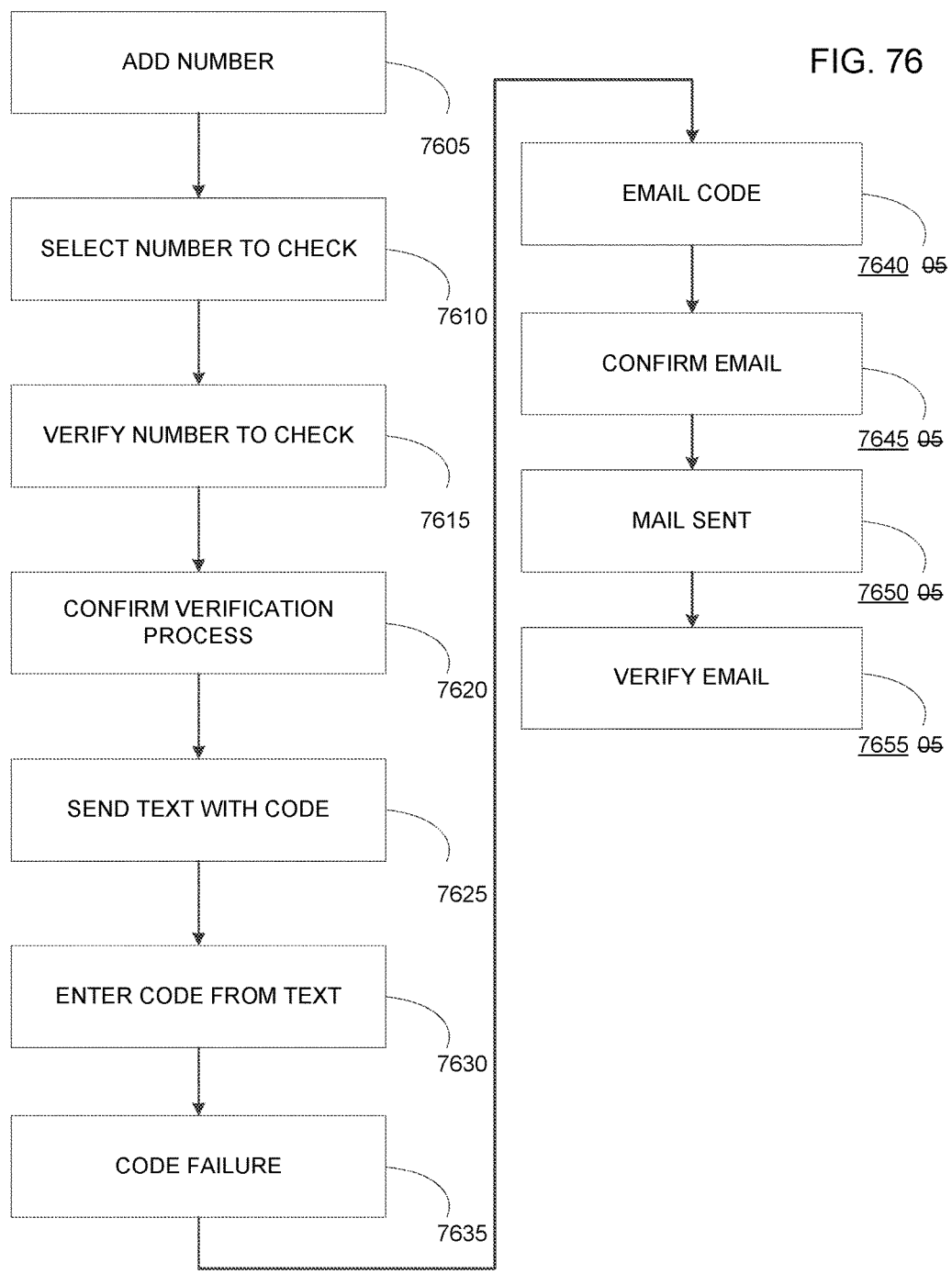
FIG. 76 illustrates a flowchart of confirming contact information for an account.
Figure 77:
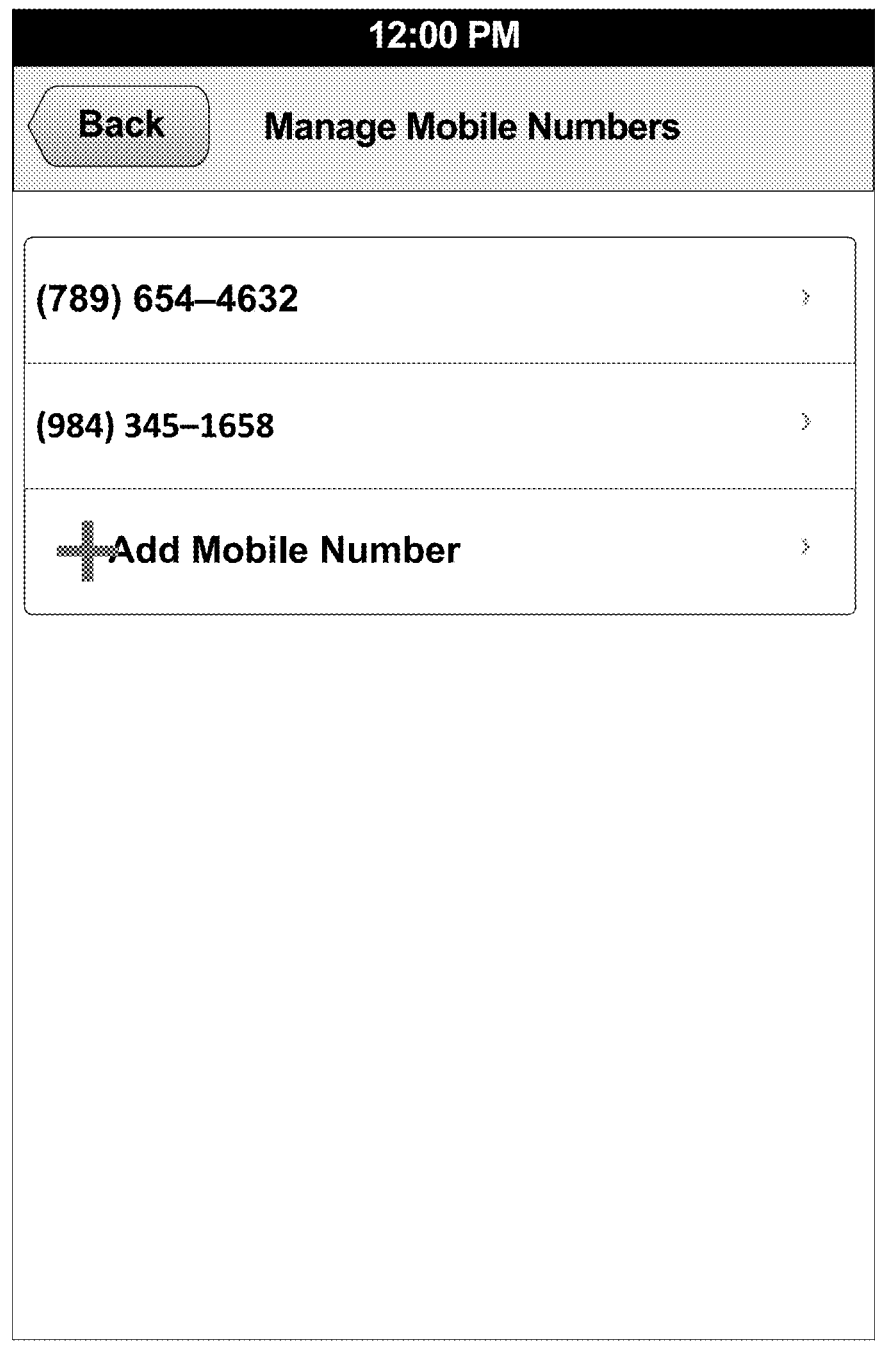
FIG. 77 illustrates selecting to add a number from a manage numbers display.
Figure 78:
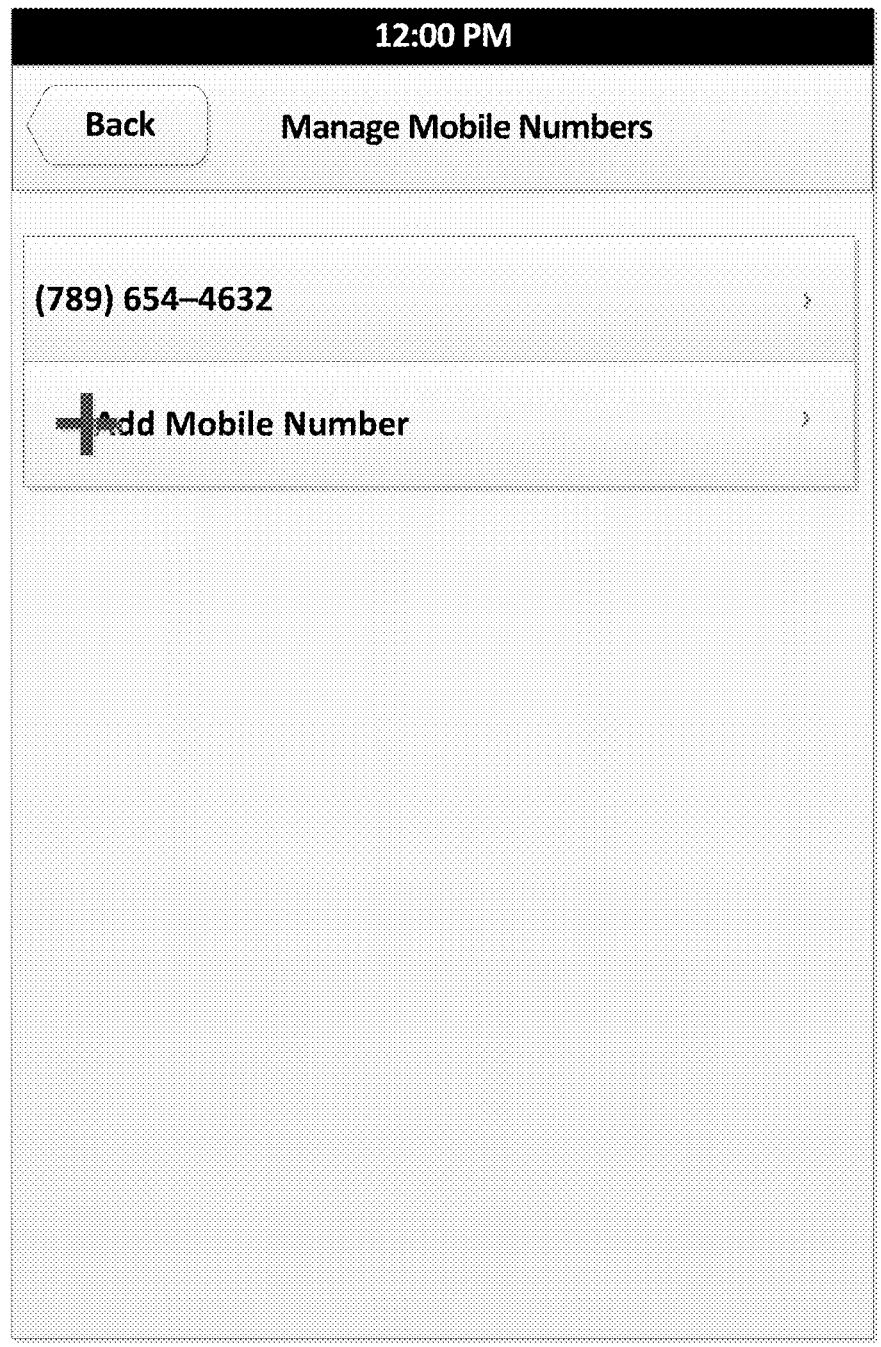
FIG. 78 illustrates selecting to add a number from a manage numbers display.
Figure 79:
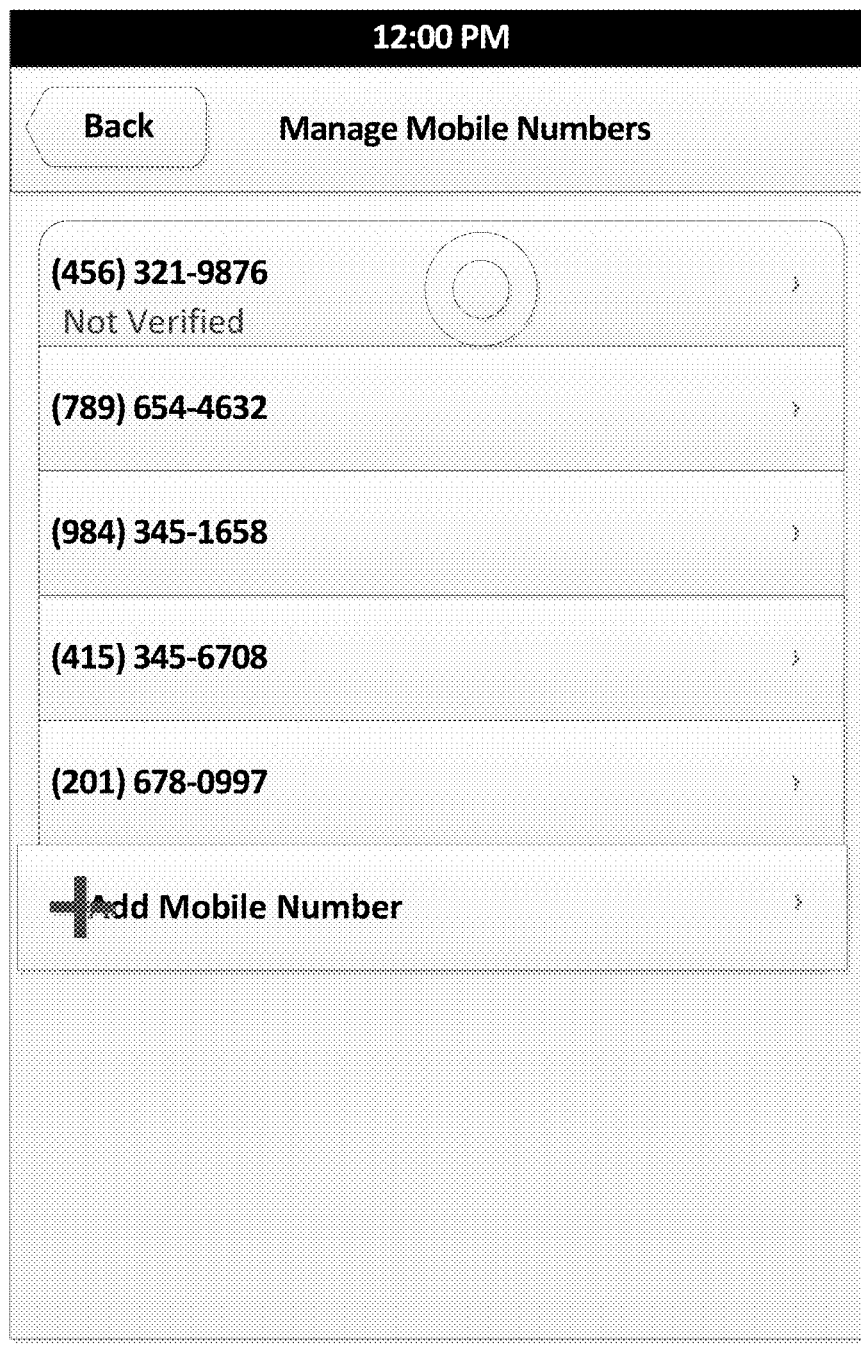
FIG. 79 illustrates selecting a number to verify from a manage numbers display.

Logically, mobile numbers also can be added to an established account in the system. FIG. 76 may illustrate a method of adding a phone number to an account. At block 7605, a user may select to add a number from a manage number display as illustrated in FIG. 77. At block 7610, an unverified mobile number may be selected as illustrated in FIG. 78. The status of mobile number being in a "unverified" state is displayed within the mobile number list view. At block 7615, a number may be verified as illustrated in FIG. 79. The verification may be as simple as looking up the number in a lookup table or may take the form of communicating a message to the number.

Figure 80:
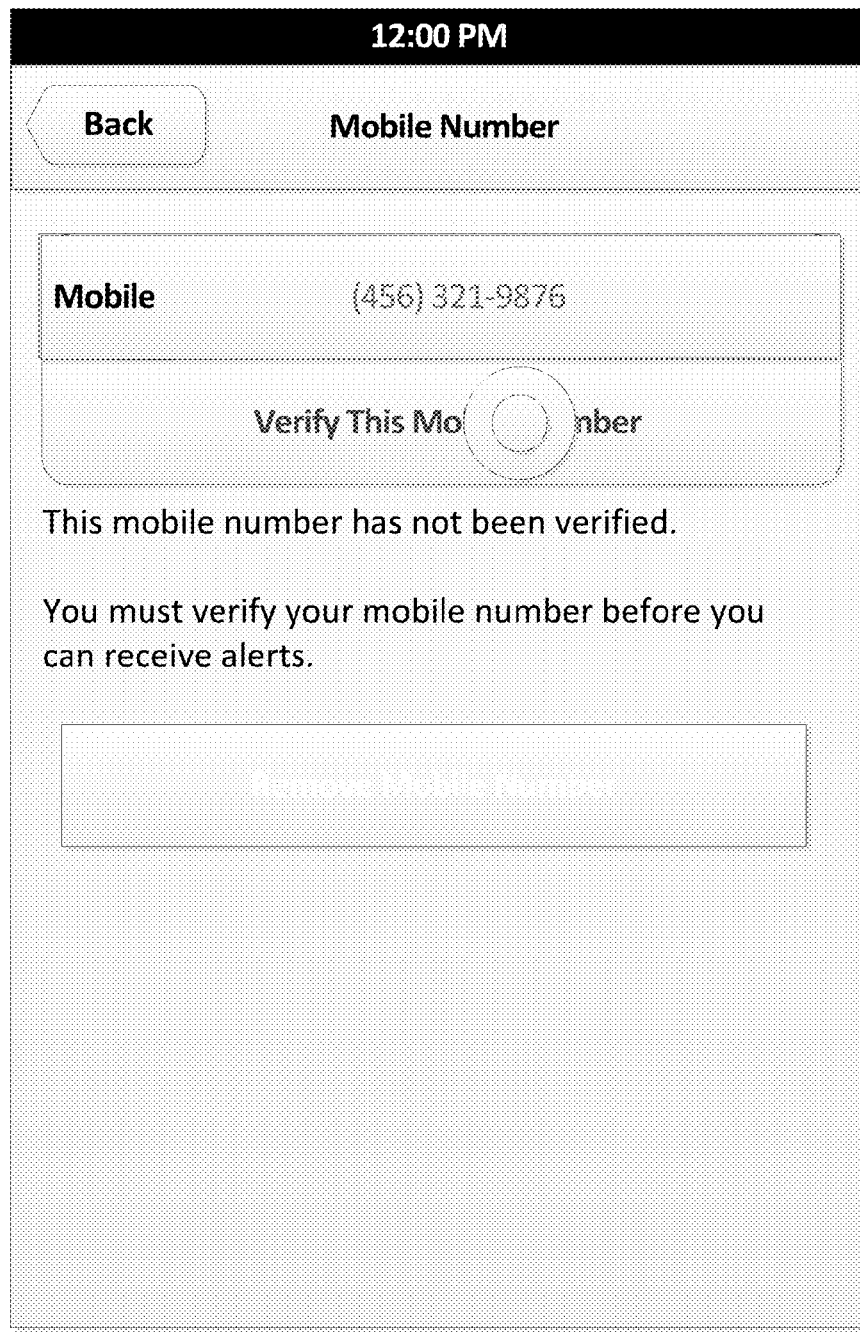
FIG. 80 illustrates selecting to verify a number from a manage numbers display.
Figure 81:
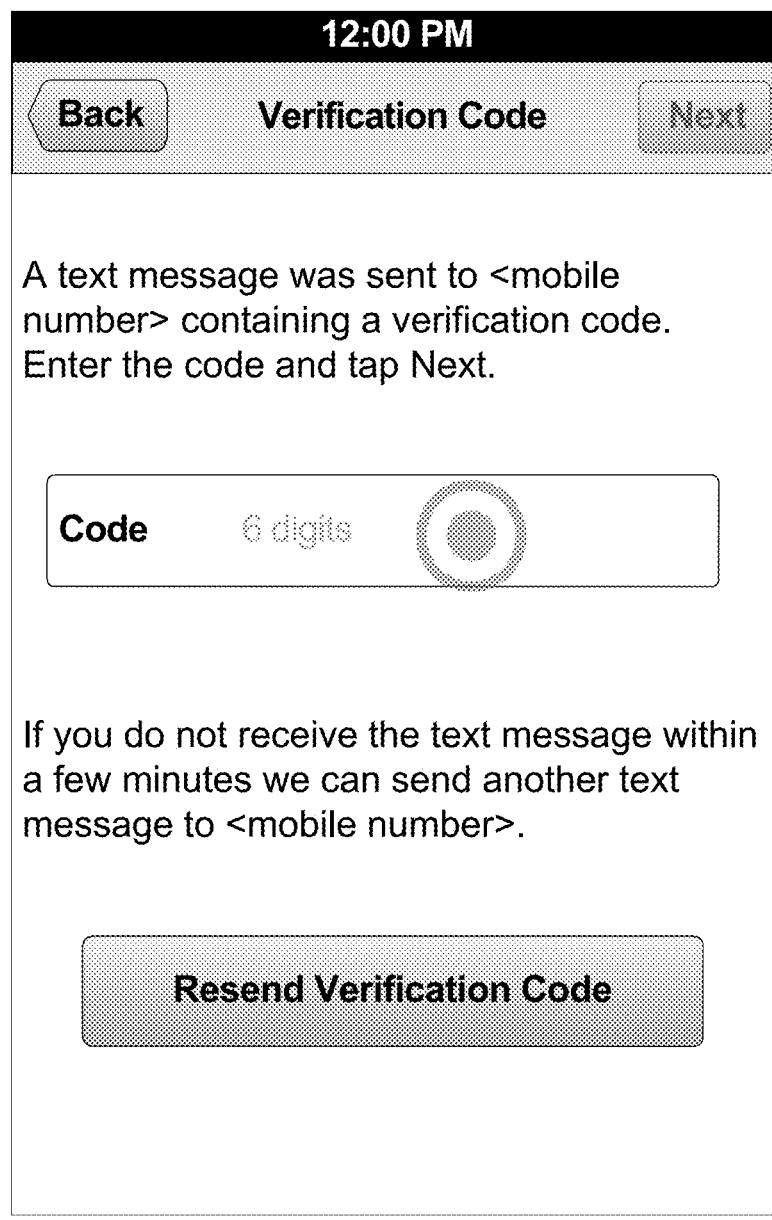
FIG. 81 illustrates a display for entering a verification code communicated to a computing device.
Figure 82:
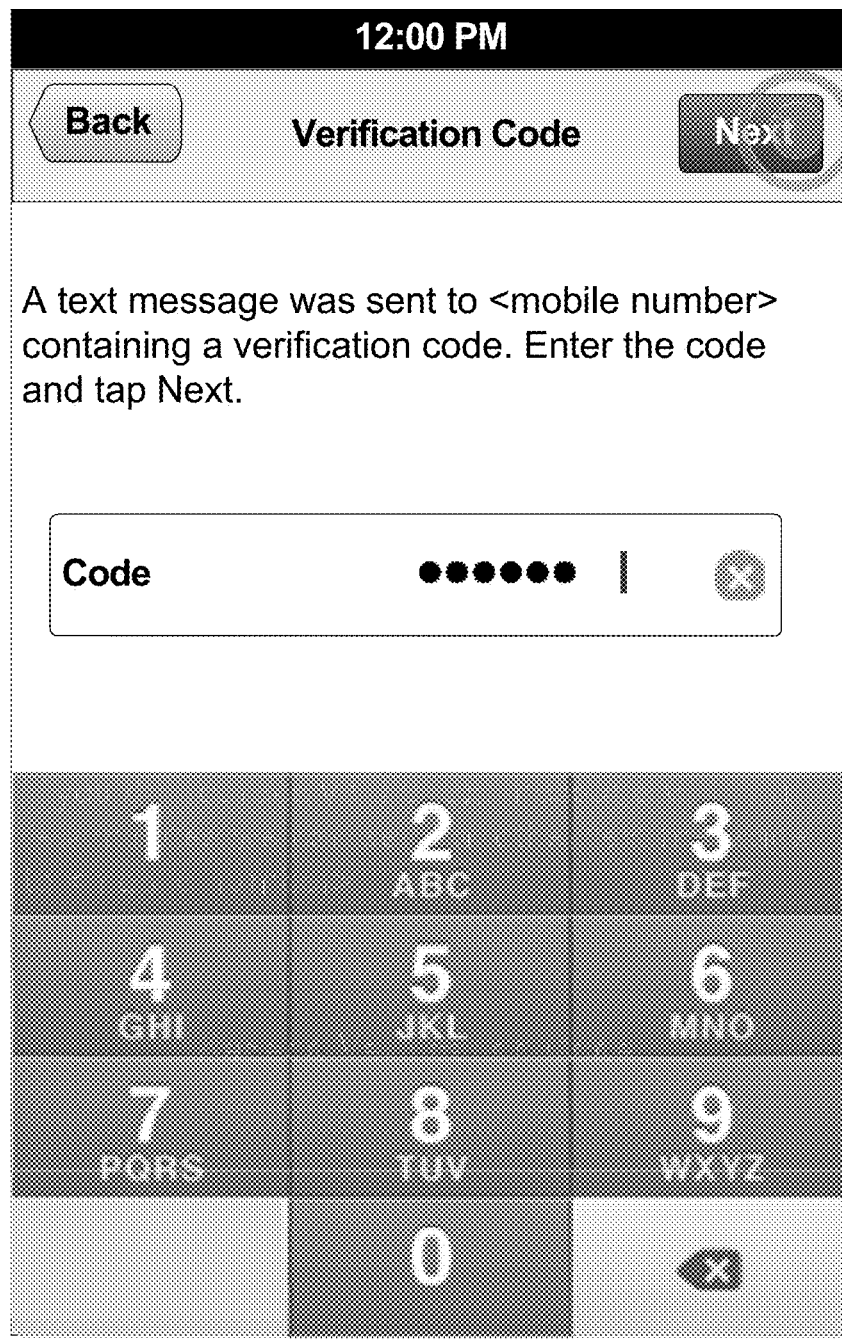
FIG. 82 illustrates a display for entering a verification code communicated to a computing device.
Figure 83:
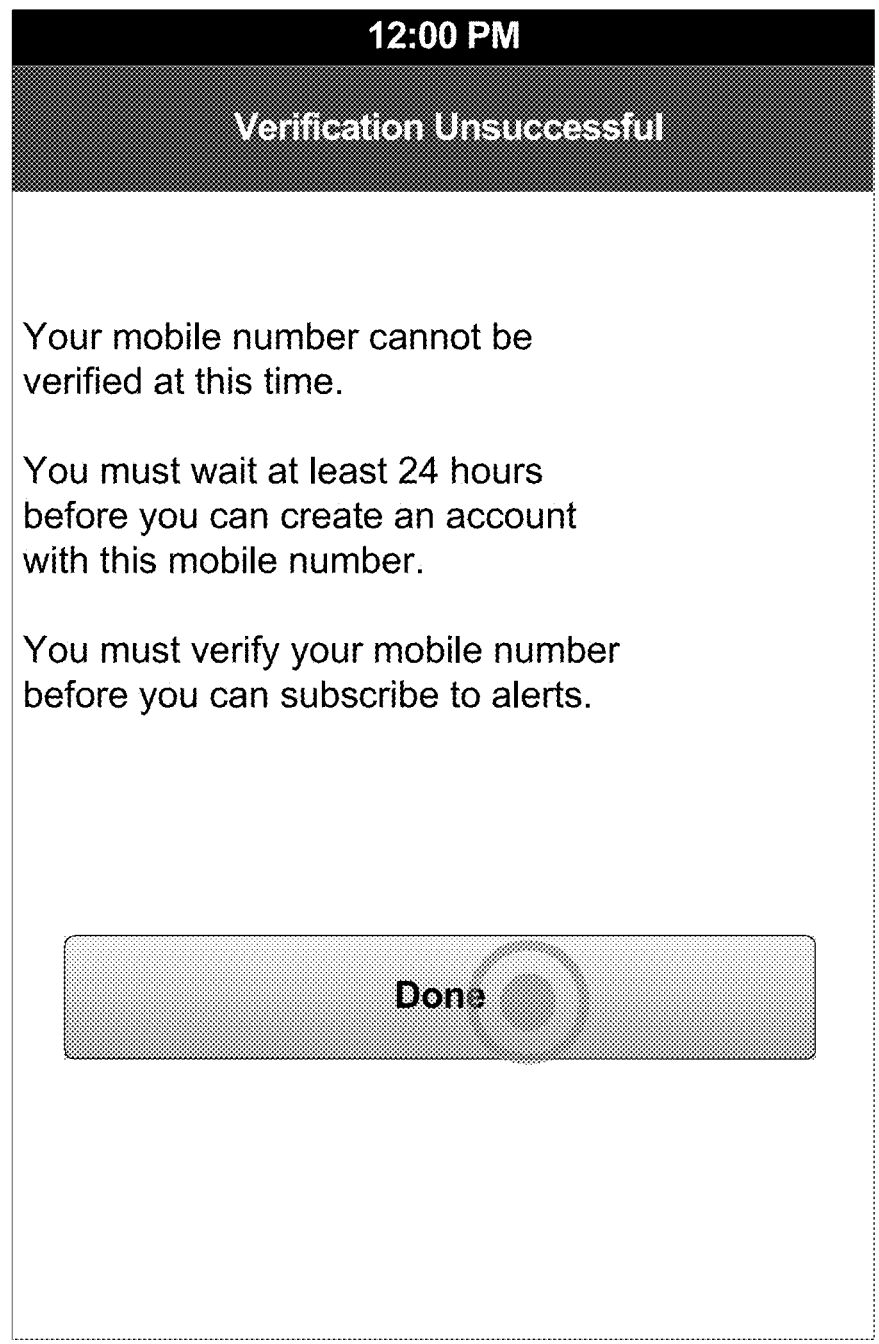
FIG. 83 illustrates a display for failing to enter a valid verification code communicated to a computing device.

The number may have a given number of digits and non-numerals may be ignored. At block 7620, the number to be verified may be confirmed as illustrated in FIG. 80. If the number is confirmed, at block 7625, a text may be sent with a code to the number. At block 7630, the user may enter the verification code as illustrated in FIG. 81. If the verification code is not received, a user may request the verification code be re-sent as illustrated in FIG. 82. If the number cannot be verified, at block 7635 the system may note that the verification was unavailable as illustrated in FIG. 83. The account may be locked if there are too many errors such as the user re-sends verification code five times or fails to enter the correct verification code five times. The mobile number associated with the failed code may not be added for a 24 hour period and after 24 hours, the user may attempt to add the same mobile number again that had failed previously.

Figure 84:
FIG. 84 illustrates a display for entering an answer to a security question communicated to a computing device.
Figure 85:
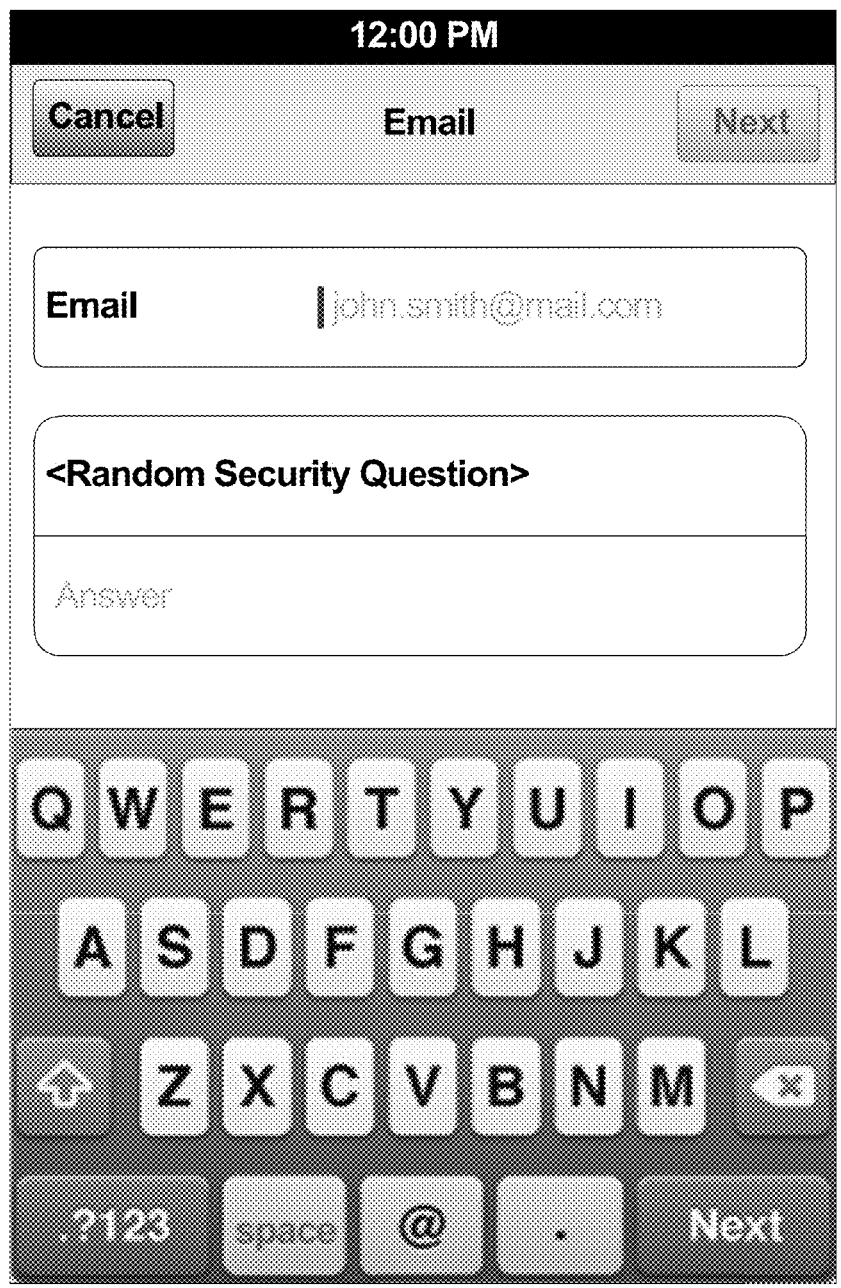
FIG. 85 illustrates a display for entering an answer to a security question communicated to an email associated with the computing device.
Figure 86:
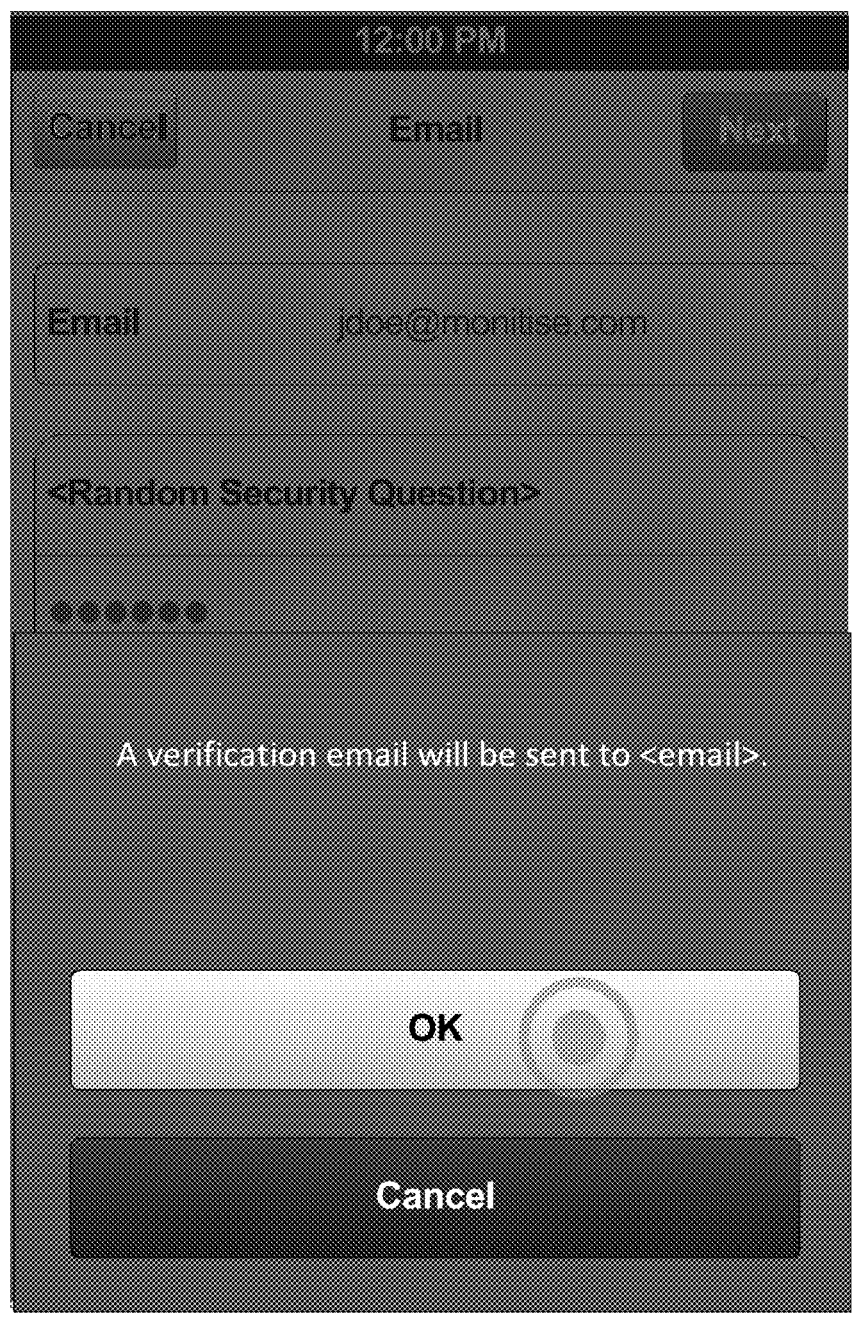
FIG. 86 illustrates a display for communicating a security question to a computing device.
Figure 87:
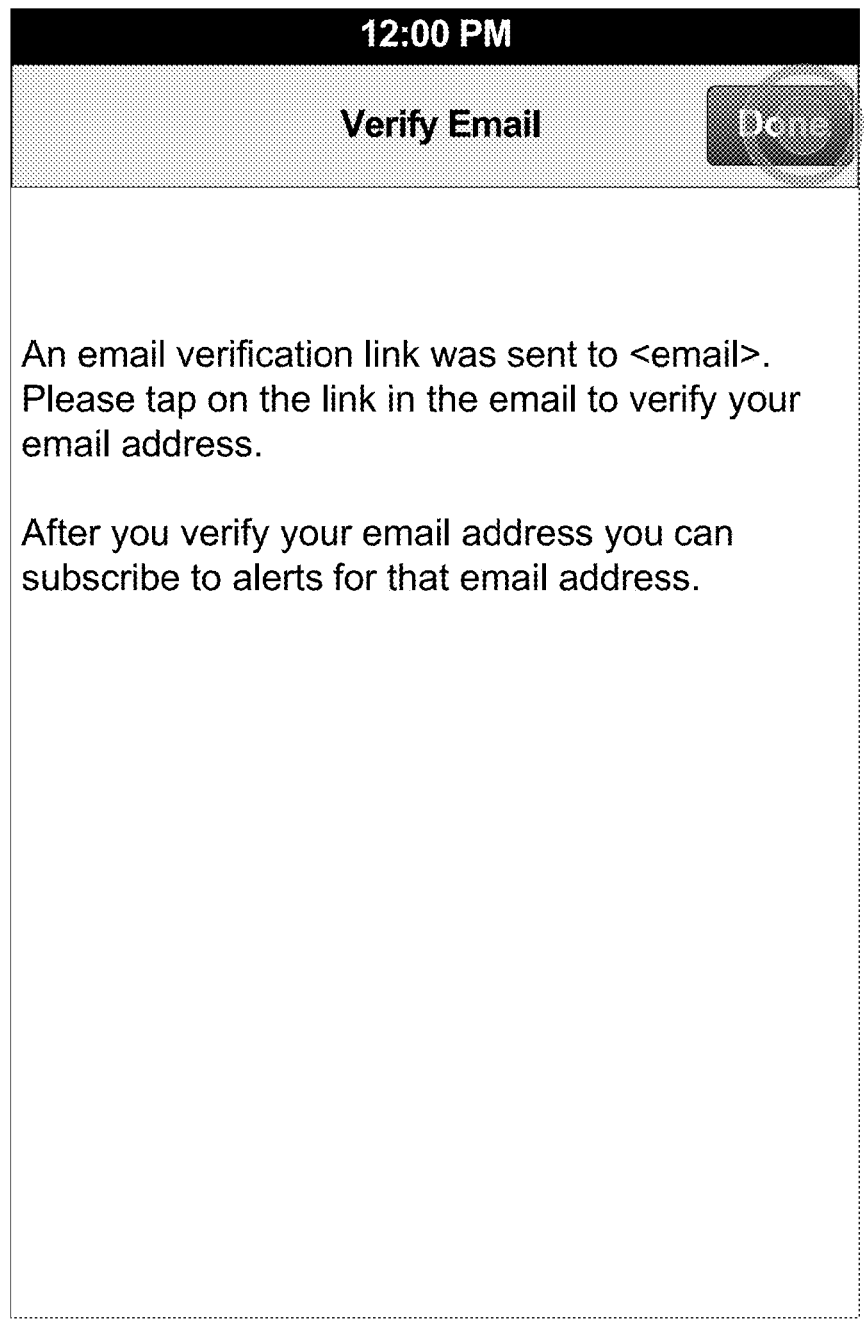
FIG. 87 illustrates a display for verifying that a security question was communicated to a computing device.

A user may want to update a contact email in the system. FIG. 84 may illustrate a sample display that a user may use to update an email address. The next button may not be enabled until the email field is changed but still filled in and the security question field is answered. FIG. 85 may illustrate the entry of an email address. A security question may also be asked. The system may select one of the three security questions a user has answered and displays it. Email addresses also may be verified. FIG. 86 may illustrate selecting that a confirmation email should be communicated and FIG. 87 may illustrate a notice screen that the verification email was communicated.

Figure 88:
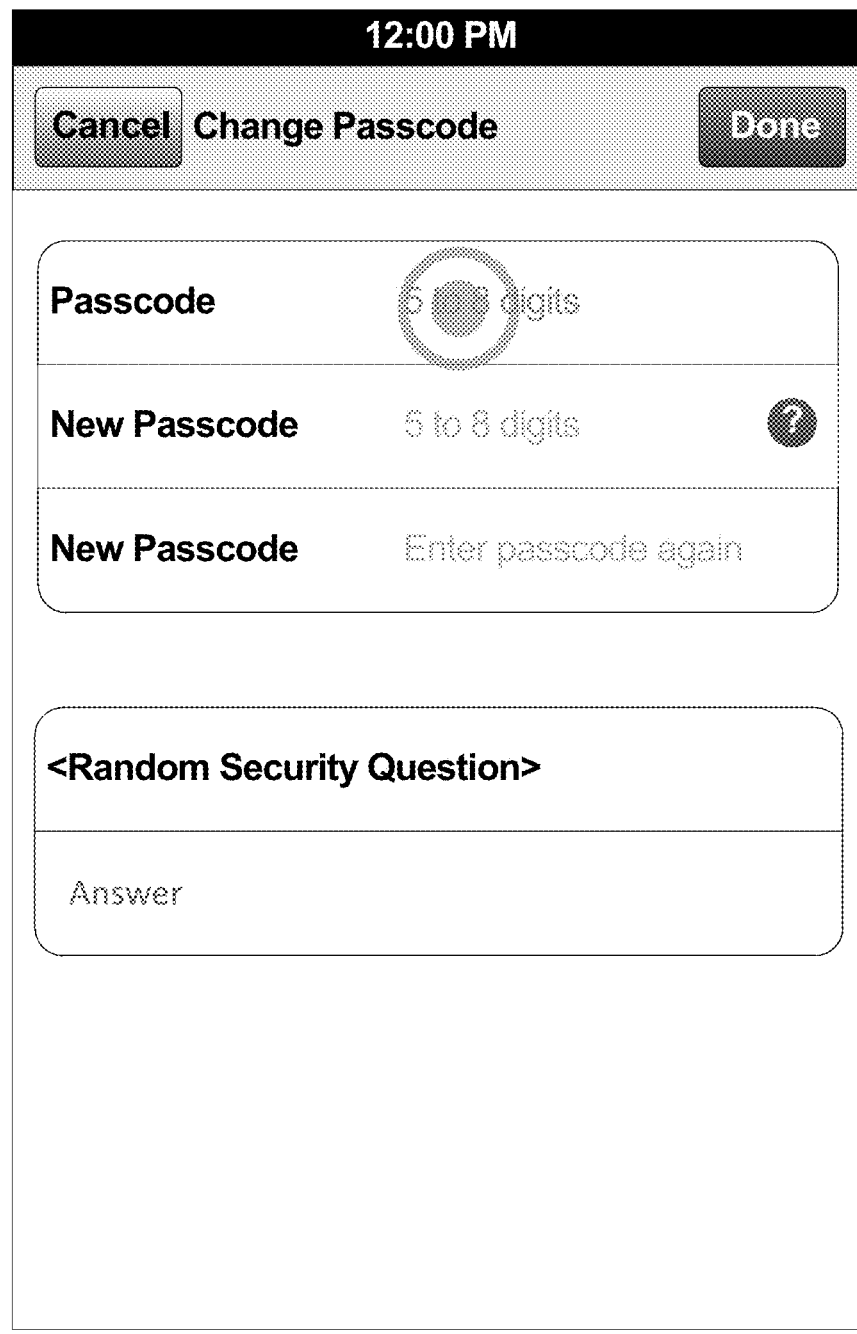
FIG. 88 illustrates a display for changing a passcode.
Figure 89:
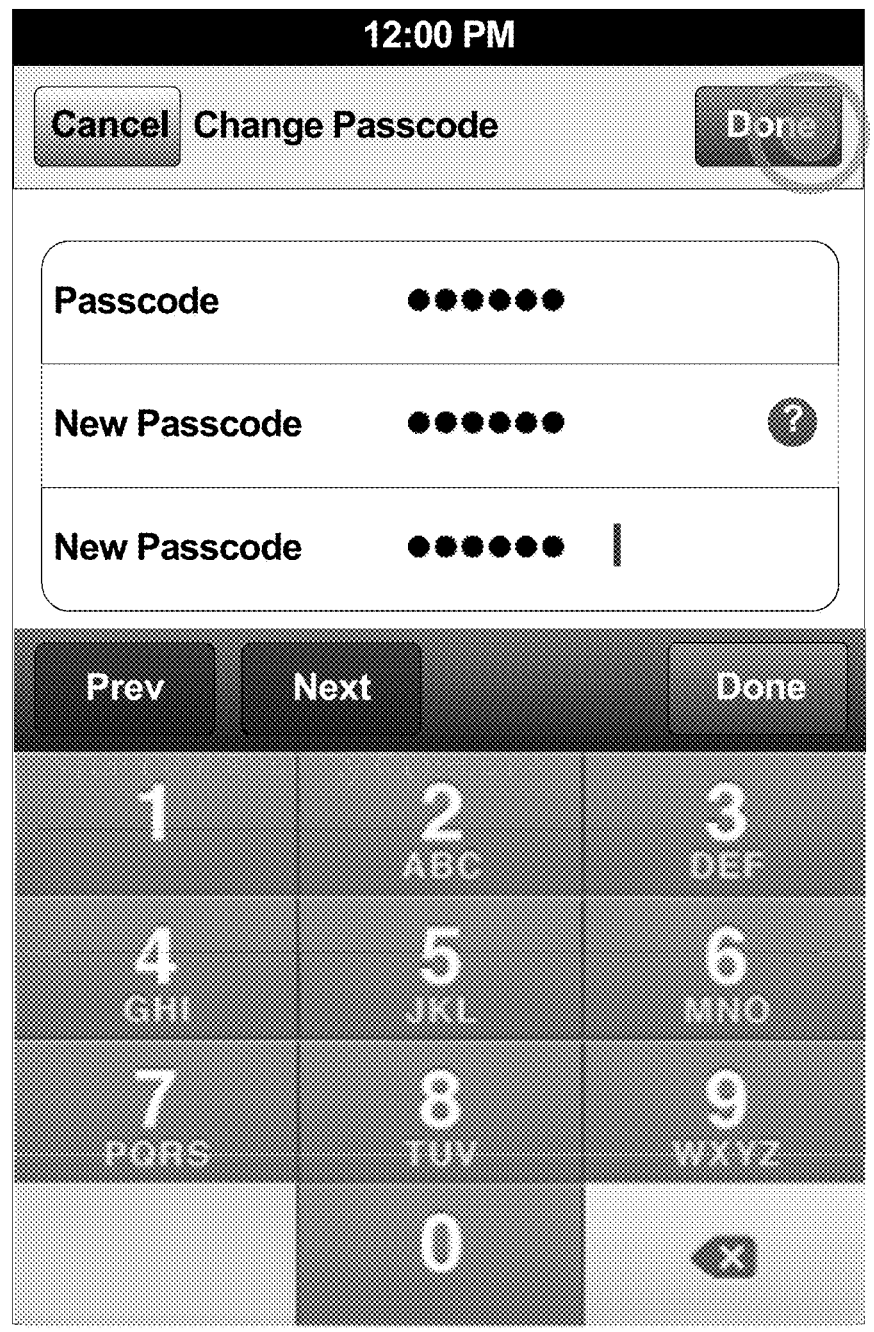
FIG. 89 illustrates a display for entering a new a passcode.

FIG. 88 may illustrate changing a passcode to use the system. As mentioned previously, passcodes may have to meet some requirements depending on the account type. The old and new passcodes may be entered using a display such as illustrated in FIG. 89. Once the codes are entered, a "Done" button directly above the keypad may be selected and may hide the keypad.

Figure 90:
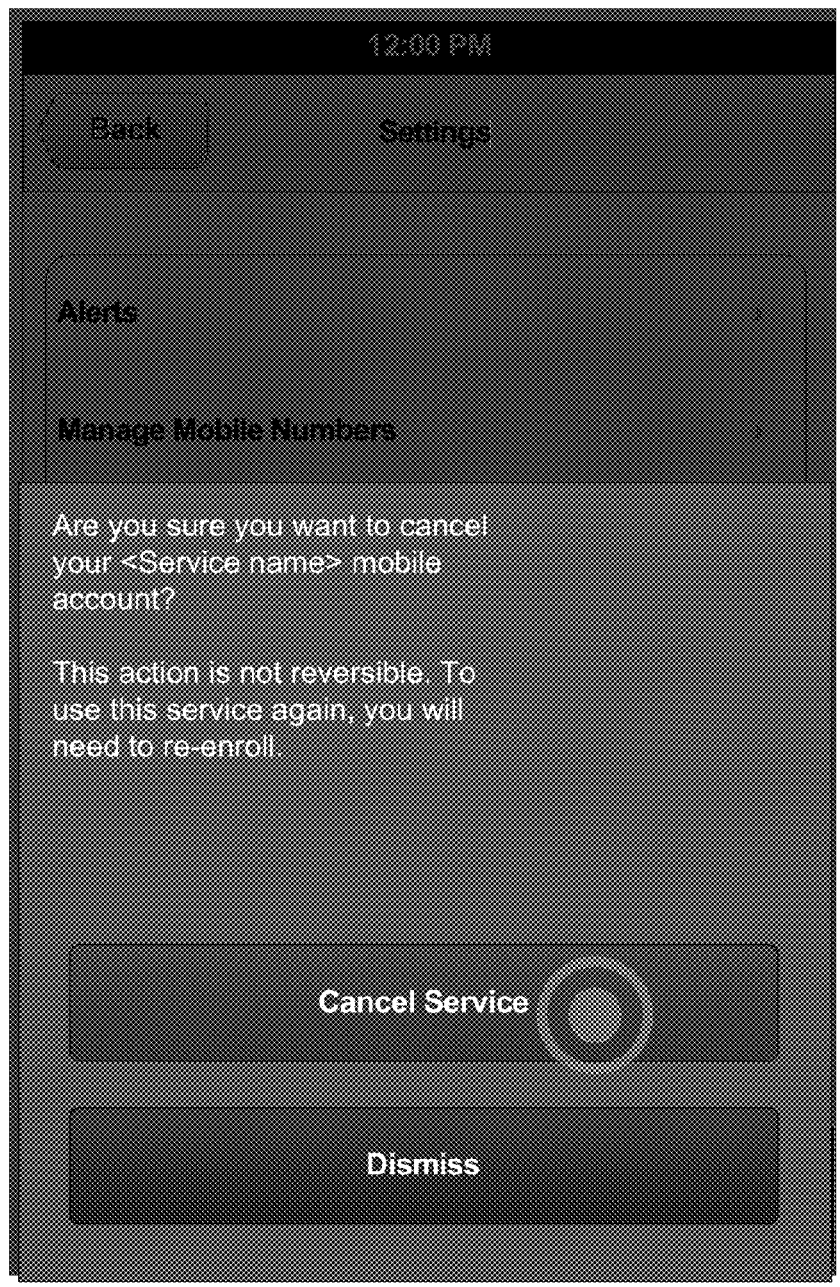
FIG. 90 illustrates a display for canceling the service.
Figure 91:
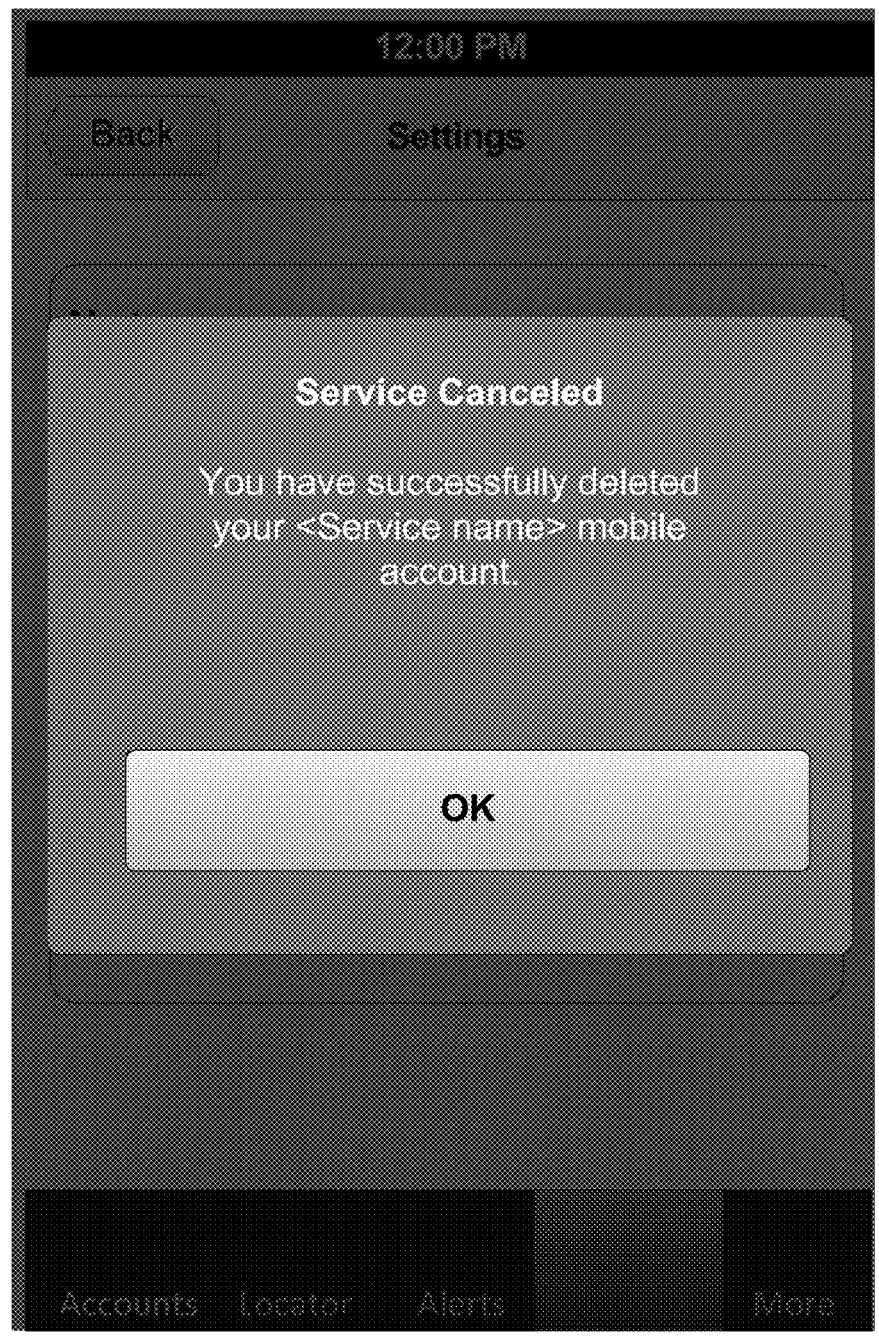
FIG. 91 illustrates a display to confirm that a service was to be canceled.

A user may also have the opportunity to cancel the service. From the setting menu, a user may select to cancel service. A confirmation display may be displayed as illustrated in FIG. 90. There also may a timing aspect to the system. If the user confirms the selection, a confirmation may be displayed that the service was canceled as illustrated in FIG. 91.

Figure 92:
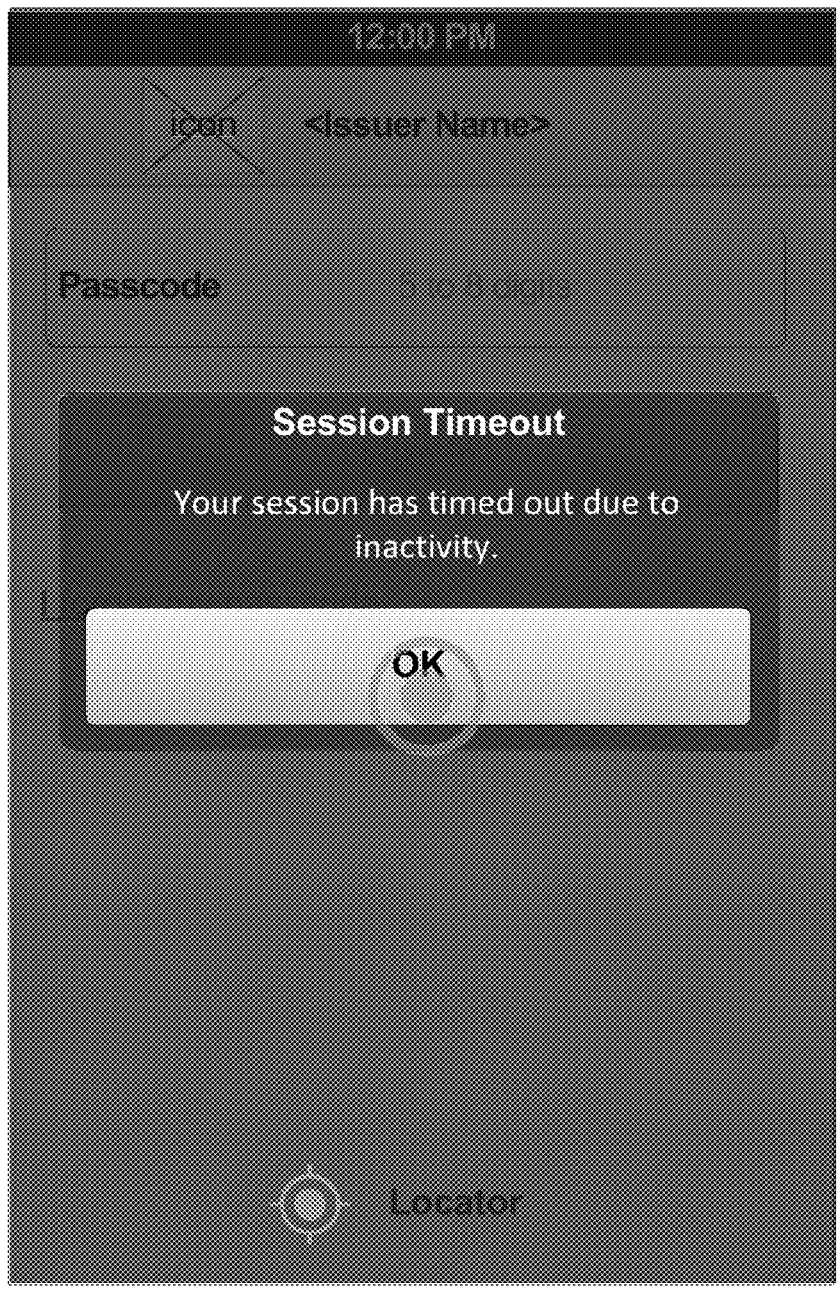
FIG. 92 illustrates a display that a session timed out.

As the transferring of funds may have great consequences, a timing aspect may ensure that the various processes are completed in a timely manner. FIG. 92 may illustrate a display indicate that a time out has occurred.

Figure 93:
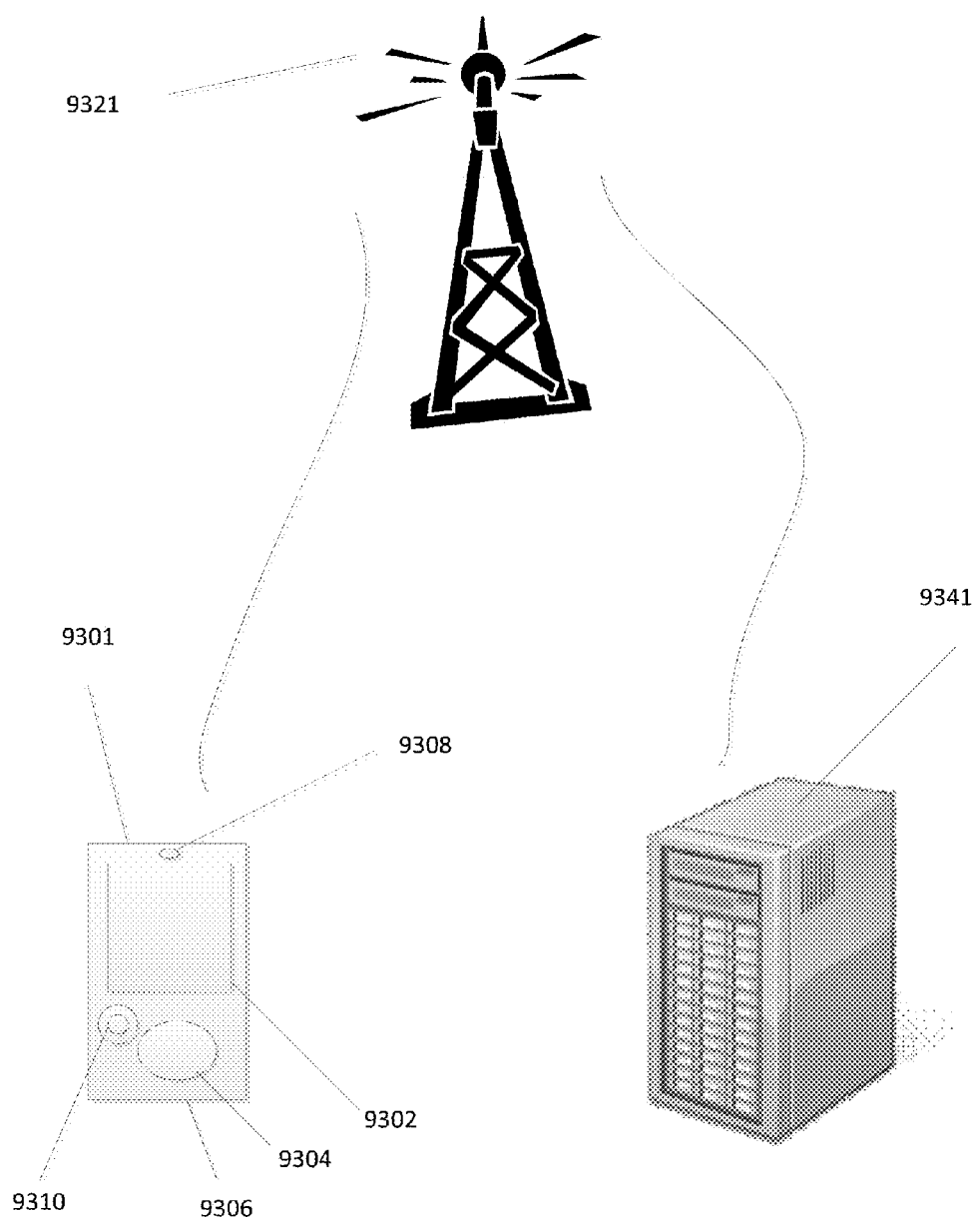
FIG. 93 illustrates elements of a sample a computing network.

FIG. 93 may be a high level illustration of some of the elements a sample computing system that may be physically configured to implement the various embodiments of the method and its logical variants. The computing system may be a dedicated computing device 9341, a dedicated portable computing device 9301, an application on the computing device 9341, an application on the portable computing device 9301 or a combination of all of these. FIG. 94 may be a high level illustration of a portable computing device 9301 communicating with a remote computing device 9341 but the application may be stored and accessed in a variety of ways. In addition, the application may be obtained in a variety of ways such as from an app store, from a web site, from a store WiFi system, etc. There may be various versions of the application to take advantage of the benefits of different computing devices, different languages and different API platforms.

In one embodiment, a portable computing device 9301 may be a device that operates using a portable power source 9355 such as a battery. The portable computing device 9301 may also have a display 9302 which may or may not be a touch sensitive display. More specifically, the display 9302 may have a capacitance sensor, for example, that may be used to provide input data to the portable computing device 9301. In other embodiments, an input pad 9304 such as arrows, scroll wheels, keyboards, etc., may be used to provide inputs to the portable computing device 9301. In addition, the portable computing device 9301 may have a microphone 9306 which may accept and store verbal data, a camera 9308 to accept images and a speaker 9310 to communicate sounds.

The portable computing device 9301 may be able to communicate with a computing device 9341 or a plurality of computing devices 9341 that make up a cloud of computing devices 9311. The portable computing device 9301 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 9341 or may be through a communication network 9321 such as cellular service, through the Internet, through a private network, through Bluetooth, etc. FIG. 94 may be a simplified illustration of the physical elements that make up a portable computing device 9301 and FIG. 95 may be a simplified illustration of the physical elements that make up a server type computing device 9341.

FIG. 94 may be a sample portable computing device 9301 that is physically configured according to be part of the system. The portable computing device 9301 may have a processor 9350 that is physically configured according to computer executable instructions. It may have a portable power supply 9355 such as a battery which may be rechargeable. It may also have a sound and video module 9360 which assists in displaying video and sound and may turn off when not in use to conserve power and battery life. The portable computing device 9301 may also have volatile memory 9365 and non-volatile memory 9370. There also may be an input/output bus 9375 that shuttles data to and from the various user input devices such as the microphone 9306, the camera 9308 and other inputs 9302, etc. It also may control of communicating with the networks, either through wireless or wired devices. Of course, this is just one embodiment of the portable computing device 9301 and the number and types of portable computing devices 9301 is limited only by the imagination.

The physical elements that make up the remote computing device 9341 may be further illustrated in FIG. 95. At a high level, the computing device 9341 may include a digital storage such as a magnetic disk, an optical disk, flash storage, non-volatile storage, etc. Structured data may be stored in the digital storage such as in a database. The server 9341 may have a processor 9500 that is physically configured according to computer executable instructions. It may also have a sound and video module 9505 which assists in displaying video and sound and may turn off when not in use to conserve power and battery life. The server 9341 may also have volatile memory 9510 and non-volatile memory 9515.

The database 9525 may be stored in the memory 9510 or 9515 or may be separate. The database 9525 may also be part of a cloud of computing device 9341 and may be stored in a distributed manner across a plurality of computing devices 9341. There also may be an input/output bus 9520 that shuttles data to and from the various user input devices such as the microphone 9306, the camera 9308, the inputs 9302, etc. The input/output bus 9520 also may control of communicating with the networks, either through wireless or wired devices. In some embodiments, the application may be on the local computing device 9301 and in other embodiments, the application may be remote 9341. Of course, this is just one embodiment of the server 9341 and the number and types of portable computing devices 9341 is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving funds transfers between accounts. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method of using a graphical user interface (GUI) for transferring value from first accounts to second accounts, the method comprising:

storing first data on first accounts wherein the first data comprises first identity data sufficient to identify one of the first accounts and at least one of first summary names that identifies a first account summary for the one of the first accounts;

storing second data on second accounts wherein the second data comprises second identity data sufficient to identify one of the second accounts and one of second summary names that identifies a second account summary for the one of the second accounts;

communicating, by a processor, on the GUI the at least one of the first summary names in a first display space wherein the first summary names being moved through the first display space, wherein the first display space is adjacent to a first previous display space and adjacent to a first next display space;

communicating, by the processor, on the GUI the at least one of the second summary names in a second display space wherein the second summary names being moved through the second display space, wherein the second display space is adjacent to a second previous display space and adjacent to a second next display space;

accepting a communication via the GUI of a transfer value from the one of the first accounts as indicated by the at least one of the first summary names in the first display space to the one of the second accounts as indicated by the at least one of the second summary names in the second display space;

accepting a first movement on the first display area via the GUI wherein the first movement indicates that the first account summary is to be moved to the first previous display space or to the first next display space;

accepting a second movement on the second display area via the GUI wherein the second movement indicates that the second account summary is to be moved to the second previous display space or to the second next display space;

wherein in response to the first movement on the first display area, the first account summary is illustrated on the GUI as moving in a sliding fashion from the first previous display space to the first display space or from the first next display space to the first display space;

wherein in response to the second movement, the second account summary is illustrated as moving in the sliding fashion from the second previous display space to the second display space or from the second next display space to the second display space; and executing, by the processor, the transfer value to move from the one of the first accounts as indicated by the at least one of the first summary names in the first display space to the one of the second accounts as indicated by the at least one of the second summary names in the second display space when the one of the first accounts in the first display space is in alignment with the one of the second accounts in the second display space.

2. The method of claim 1, wherein the first display space is in alignment with the second display space.

3. The method of claim 1, wherein an alignment indication is used to indicate that the transfer is moving from the first account to the second account.

4. The method of claim 1, further comprising obtaining first balance information for the first account and second balance information for the second account.

5. The method of claim 1, wherein the first summary name includes a first balance in the first account and wherein the second summary name includes a second balance in the second account.

6. The method of claim 1, wherein the first summary name further comprises a first transfer limit comprising a transfer limit on the first account and wherein the second summary name further comprises a second transfer limit on the second account.

7. The method of claim 1, further comprising displaying a confirmation block which displays an option for the transaction to be accepted or canceled.

8. The method of claim 1, further comprising after the transfer has been accepted and completes successfully, displaying new balances in the first account and the second account after the transfer.

9. The method of claim 1, wherein executing comprises determining whether sufficient funds are available and terminating the transfer when the determination is negative.

10. The method of claim 1, further comprising displaying a proposed conversion and allowing the user to accept the conversion in response to a balance of the first account and a balance of the second account are in different denominations.

11. The method of claim 4, further comprising displaying in the first summary in response to the first account has been suspended and displaying in the second summary in response to the second account has been suspended.

12. The method of claim 1, further comprising displaying in the first summary in response to the first account has a fraud alert and displaying in the second summary in response to the second account has a fraud alert.

13. The method of claim 1, further comprising storing additional first account summaries in order in a memory and sequentially fill in openings in any one of the first previous display space, the first display space or the first next display space and wherein first account summaries which are moved out of the first previous display space, the first display space or the first next display space are stored sequentially in the memory.

14. The method of claim 1, further comprising storing additional second account summaries in order in a memory and sequentially fill in openings in any second previous display space, second display space or second next display space and wherein second account summaries which are moved out of the second previous display space, the second display space or the second next display space are stored sequentially in the memory.

15. The method of claim 13, wherein the first account summaries move through the first account display space in a decelerating fashion and wherein the second account summaries move through the second account display space in a decelerating fashion.

16. The method of claim 15, wherein the first account summaries snap into the first account display space and wherein the second account summaries snap into the second account display space.

17. The method of claim 1, further comprising storing additional first account summaries in order in a memory and sequentially fill in openings in the first display space and wherein first account summaries which are moved out of the first display space are stored sequentially in the memory.

18. The method of claim 1, further comprising storing additional second account summaries in a memory and sequentially fill in openings in the second display space wherein second account summaries which are moved out of the second the second display space are stored sequentially in the memory.

19. The method of claim 1, further comprising searching, by the processor, a database for at least one incentive associated with one of the second accounts.

20. The method of claim 19, wherein the searching of the database is based on at least one search criterion comprising one or more of user interest data, demographic data, and geographic data.

21. The method of claim 19, further comprising: communicating the at least one incentive for display relative to the one of the second accounts; receiving user selection of the at least one incentive; and linking the one of the second accounts with the at least one incentive.

22. The method of claim 21, wherein the at least one incentive is associated with a merchant.

23. The method of claim 22, further comprising: determining that a purchase attempt is being made at the merchant; determining, by the processor, whether the purchase attempt satisfies a restriction associated with the at least one incentive; communicating, by the processor, the second summary name of the one of the second accounts, the at least one incentive, and a result of whether the purchase attempt satisfies the restriction for display; and receiving a request message for requesting authorization to complete a purchase.

24. The method of claim 23, further comprising: authorizing the purchase; and applying an account credit to the one of the second accounts associated with the at least one incentive in response to the purchase satisfying the restriction.

25. The method of claim 23, further comprising: authorizing the purchase; and causing shipment of a physical product to a predetermined location in response to the purchase satisfying the restriction.

26. A computer-implemented system of transferring value from first accounts to second accounts, the system comprising:
a memory storing first data on the first accounts wherein the first data comprises first identity data sufficient to identify one of the first accounts and at least one of first summary names that identifies a first account summary for the one of the first accounts;
wherein the memory stores second data on the second accounts wherein the second data comprises second identity data sufficient to identify one of the second account and at least one of second summary names that identifies a second account summary for the one of the second accounts;
a processor, coupled to the memory, to execute computer-executable instructions, the computer-executable instructions comprising:
communicating on graphical user interface (GUI) on a display the at least one of the first summary names in a first display space wherein the first summary names being moved through the first display space, wherein the first display space is adjacent to a first previous display space and adjacent to a first next display space;
communicating on the GUI the at least one of the second summary names in a second display space wherein the second summary names being moved through the second display space, wherein the second display space is adjacent to a second previous display space and adjacent to a second next display space;
accepting a communication via the GUI of a transfer value from the one of the first accounts as indicated by the at least one of the first summary names in the first display space to the at least one of the second accounts as indicated by the at least one of the second summary names in the second display space;
accepting a first movement on the first display area on the GUI wherein the first movement indicates that the first account summary is to be moved to the first previous display space or to the first next display space;
wherein in response to the first movement on the first display area, the first account summary is illustrated as moving in a sliding fashion from the first previous display space to the first display space or from the first next display space to the first display space;
accepting a second movement on the second display area on the GUI wherein the second movement indicates that the second account summary is to be moved to the second previous display space or to the second next display space,
wherein in response to the second movement, the second account summary is illustrated as moving in a sliding fashion from the second previous display space to the second display space or from the second next display space to the second display space; and
executing the transfer value to move from the one of the first accounts as indicated by the at least one of the first summary names in the first display space to the one of the second accounts as indicated by the at least one of the second summary names in the second account space when the one of the first accounts in the first display space is in alignment with the one of the second accounts in the second display space.

27. A computer-executable apparatus having a display for presenting graphical user interface (GUI) for transferring value from first accounts to second accounts, the apparatus comprising:
an electronic storage for storing first data on the first accounts wherein the first data comprises first identity data sufficient to identify one of the first account and at least one first summary names that identifies a first account summary for the one of the first accounts;
wherein the electronic storage stores second data on the second accounts wherein the second data comprises second identity data sufficient to identify one of the second account and at least one of second summary names that identifies a second account summary for the one of the second accounts;
a processor, coupled to the electronic storage, executes computer-executable instructions, wherein the computer-executable instructions comprising:
communicating on graphical user interface (GUI) on a display the at least one of the first summary names in a first display space wherein the first summary names being moved through the first display space, wherein the first display space is adjacent to a first previous display space and adjacent to a first next display space;
communicating on the GUI the at least one of the second summary names in a second display space wherein the second summary names being moved through the second display space, wherein the second display space is adjacent to a second previous display space and adjacent to a second next display space;
accepting a communication via the GUI of a transfer value from the one of the first accounts as indicated by the at least one of the first summary names in the first display space to the at least one of the second accounts as indicated by the at least one of the second summary names in the second display space;
accepting a first movement on the first display area on the GUI wherein the first movement indicates that the first account summary is to be moved to the first previous display space or to the first next display space;
wherein in response to the first movement on the first display area, the first account summary is illustrated as moving in a sliding fashion from the first previous display space to the first display space or from the first next display space to the first display space;

accepting a second movement on the second display area on the GUI wherein the second movement indicates that the second account summary is to be moved to the second previous display space or to the second next display space, wherein in response to the second movement, the second account summary is illustrated as moving in a sliding fashion from the second previous display space to the second display space or from the second next display space to the second display space; and executing the transfer value to move from the one of the first accounts as indicated by the at least one of the first summary names in the first display space to the one of the second accounts as indicated by the at least one of the second summary names in the second account space when the one of the first accounts in the first display space is in alignment with the one of the second accounts in the second display space.

28. The computer-executable apparatus of claim 27, wherein the processor stores additional second account summaries in order in a memory and sequentially fill in openings in any of the second previous display space, the second display space or the second next display space and wherein the additional second account summaries which are moved out of the second previous display space, the second display space or the second next display space are stored sequentially in the memory.

* * * * *